United States Patent
Amerasinghe et al.

(10) Patent No.: US 11,065,906 B2
(45) Date of Patent: Jul. 20, 2021

(54) ASSEMBLIES AND PROCESSES FOR PRODUCING OPTICAL EFFECT LAYERS COMPRISING ORIENTED NON-SPHERICAL OBLATE MAGNETIC OR MAGNETIZABLE PIGMENT PARTICLES

(71) Applicant: SICPA HOLDING SA, Prilly (CH)

(72) Inventors: Cédric Amerasinghe, Les Cullayes (CH); Edgar Mueller, Lausanne (CH); Evgeny Loginov, Renens (CH); Mathieu Schmid, Lausanne (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/641,942

(22) PCT Filed: Aug. 23, 2018

(86) PCT No.: PCT/EP2018/072753
§ 371 (c)(1),
(2) Date: Feb. 25, 2020

(87) PCT Pub. No.: WO2019/038371
PCT Pub. Date: Feb. 28, 2019

(65) Prior Publication Data
US 2020/0247173 A1    Aug. 6, 2020

(30) Foreign Application Priority Data
Aug. 25, 2017 (EP) .................... 17187930

(51) Int. Cl.
*B42D 25/369* (2014.01)
*B41M 3/14* (2006.01)
(Continued)

(52) U.S. Cl.
CPC ........... *B42D 25/369* (2014.10); *B05D 3/207* (2013.01); *B05D 5/065* (2013.01); *B41M 3/144* (2013.01); *B41M 3/148* (2013.01)

(58) Field of Classification Search
CPC ..... B42D 25/369; B41M 3/148; B41M 3/144; B41M 3/14; B05D 3/027; B05D 5/065; B05D 3/00; B05D 5/06
(Continued)

(56) References Cited

U.S. PATENT DOCUMENTS 2,570,856 A   10/1951  Pratt et al.
3,676,273 A   7/1972   Graves
(Continued)

FOREIGN PATENT DOCUMENTS

EP    0686675    2/1998
EP    1666546    6/2006
(Continued)

OTHER PUBLICATIONS

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.
(Continued)

*Primary Examiner* — Justin V Lewis
(74) *Attorney, Agent, or Firm* — Muncy, Geissler, Olds & Lowe, P.C.

(57) ABSTRACT

The present invention relates to the field of optical effect layers (OEL) comprising magnetically oriented non-spherical oblate magnetic or magnetizable pigment particles on a substrate, spinneable magnetic assemblies and processes for producing said optical effect layers (OEL). In particular, the present invention relates to spinneable magnetic assemblies
(Continued)

and processes for producing said OELs as anti-counterfeit means on security documents or security articles or for decorative purposes.

17 Claims, 25 Drawing Sheets

(51) Int. Cl.
  *B05D 3/00* (2006.01)
  *B05D 5/06* (2006.01)
(58) Field of Classification Search
  USPC ............ 283/67, 72, 82, 85, 94, 98, 99, 901; 412/1, 9; 101/93.29, 93.42, 93.43, 93.46, 101/489
  See application file for complete search history.

(56) References Cited

U.S. PATENT DOCUMENTS

| | | | |
|---|---|---|---|
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 8,343,615 | B2 | 1/2013 | Raksha et al. |
| 2013/0084411 | A1 | 4/2013 | Raksha et al. |
| 2017/0232727 | A1* | 8/2017 | Loginov ................. B41F 13/10 427/128 |

FOREIGN PATENT DOCUMENTS

| | | |
|---|---|---|
| EP | 1710756 | 10/2006 |
| EP | 2306222 | 4/2011 |
| EP | 2325677 | 5/2011 |
| EP | 2402401 | 1/2012 |
| WO | 2002073250 | 9/2002 |
| WO | 2003000801 | 1/2003 |
| WO | 2006063926 | 6/2006 |
| WO | 2007131833 | 11/2007 |
| WO | 2011092502 | 8/2011 |
| WO | 2014108303 | 7/2014 |
| WO | 2014108404 | 7/2014 |
| WO | 2015082344 | 6/2015 |
| WO | 2016026896 | 2/2016 |

OTHER PUBLICATIONS

"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.
Handbook of Physics, Springer 2002, pp. 463-464.
International Search Report and Written Opinion issued with respect to application No. PCT/EP2018/072753.

\* cited by examiner

Fig. 5A1
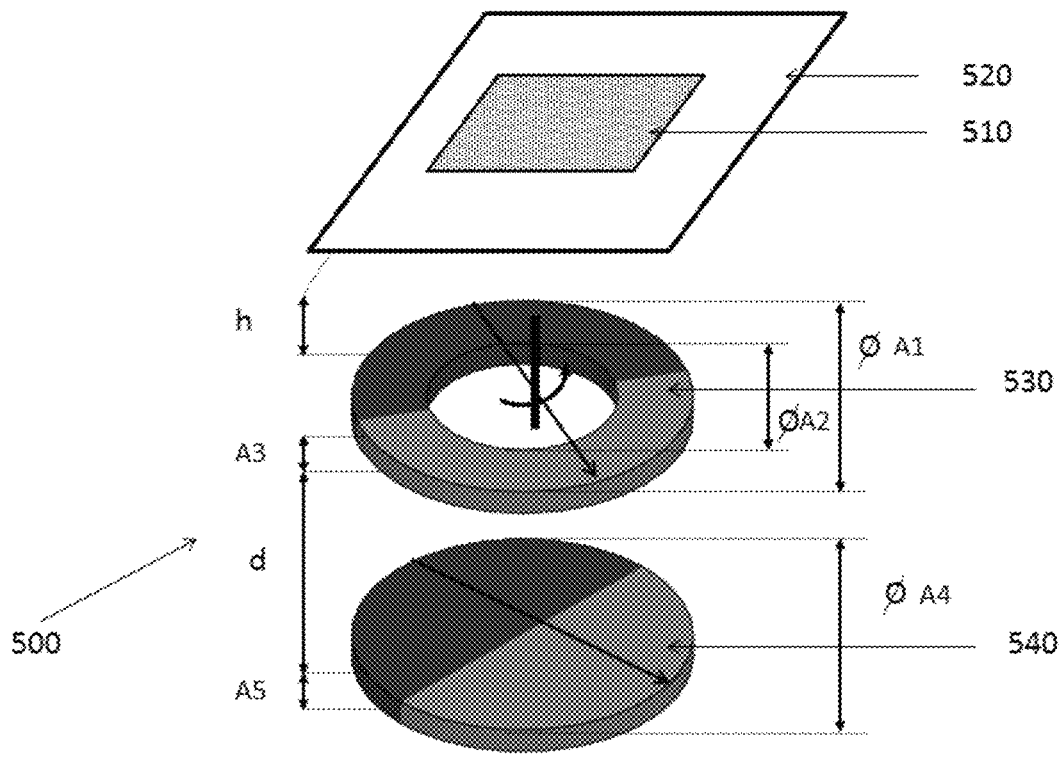
Fig. 5A2
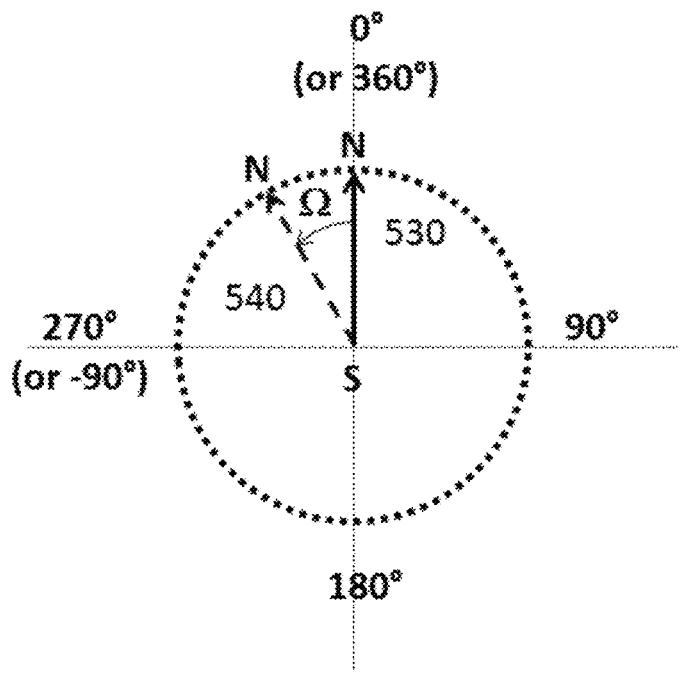

Fig. 6A1
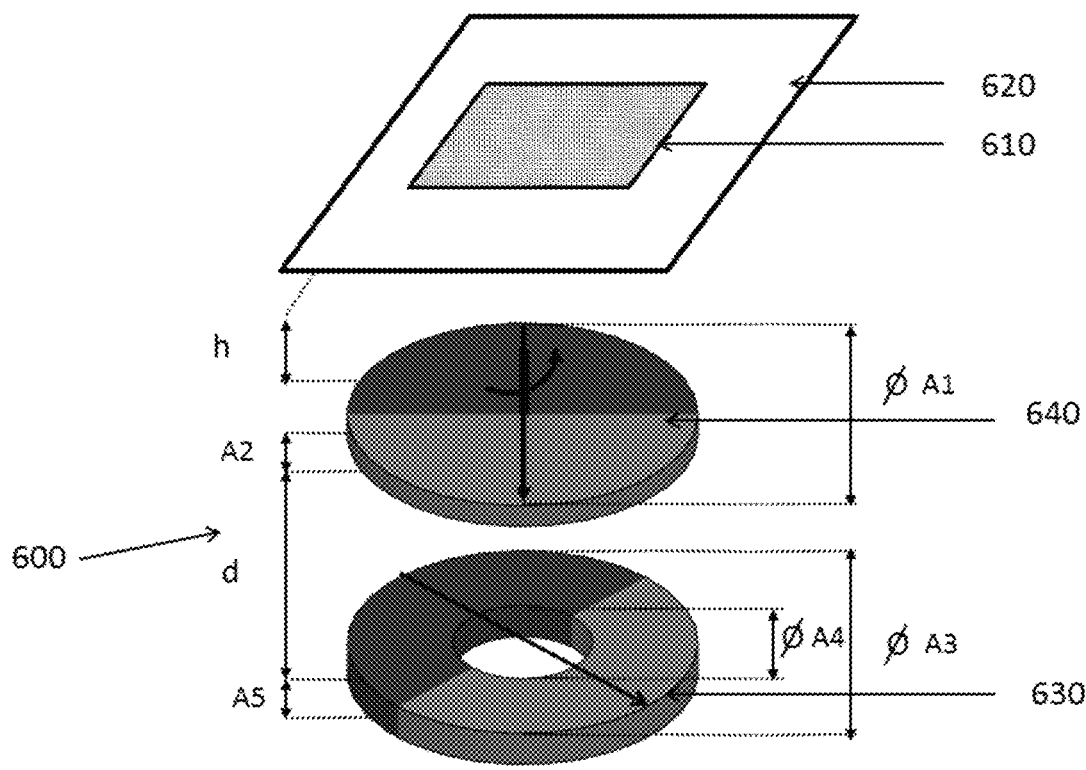
Fig. 6A2
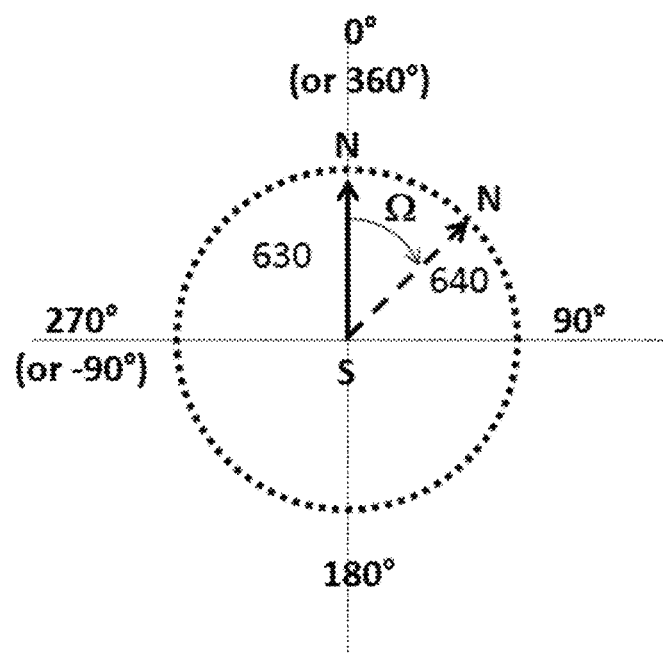

-30°  -20°  -10°  0°  +10°  +20°  +30°

Fig. 7A1
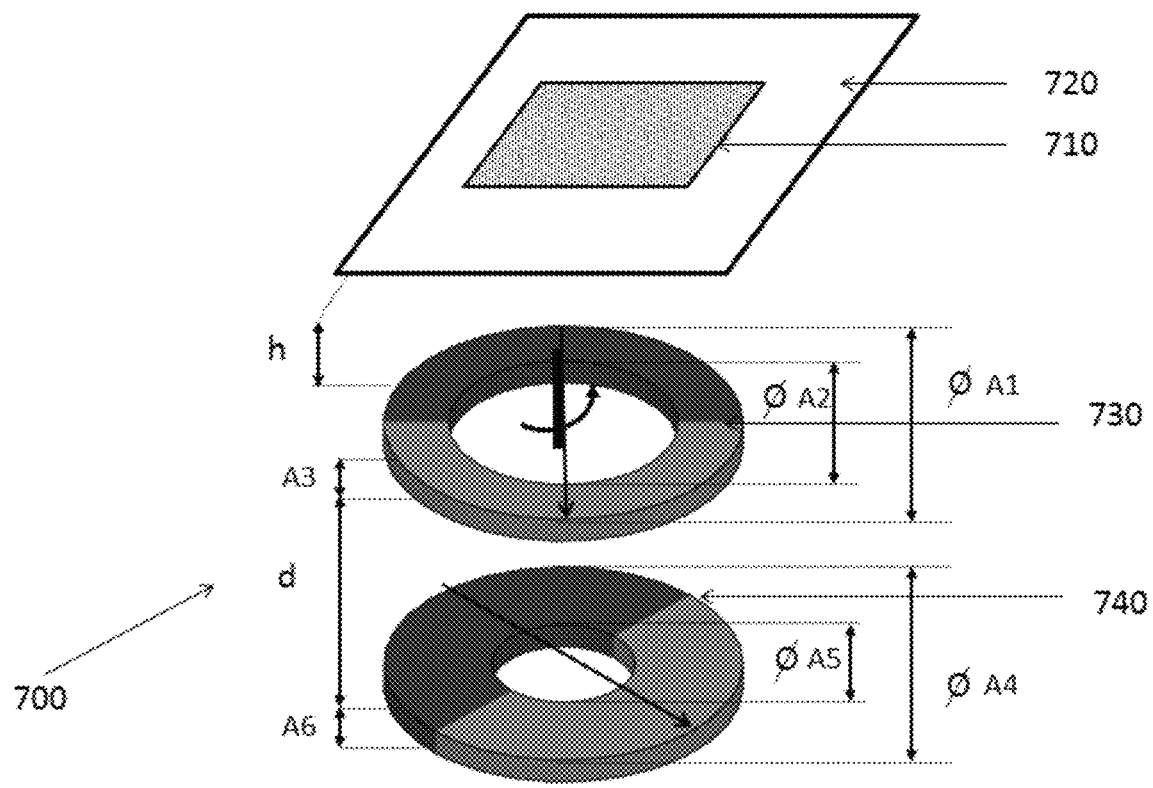
Fig. 7A2
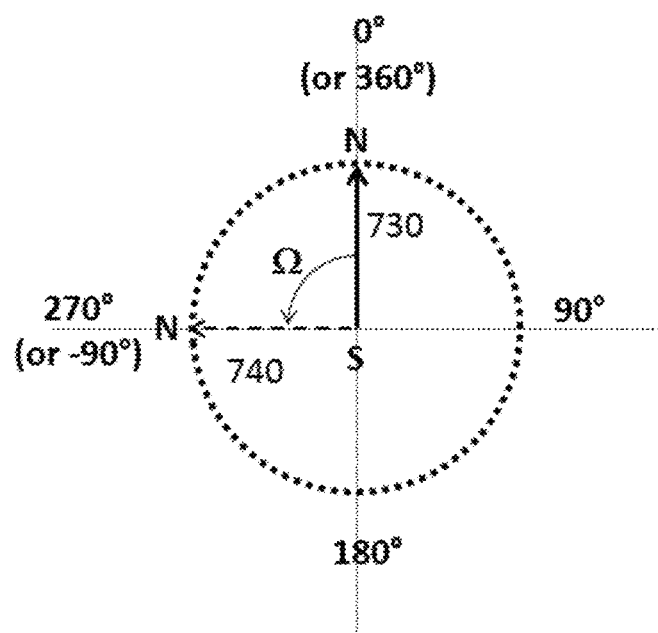

Fig. 8A1
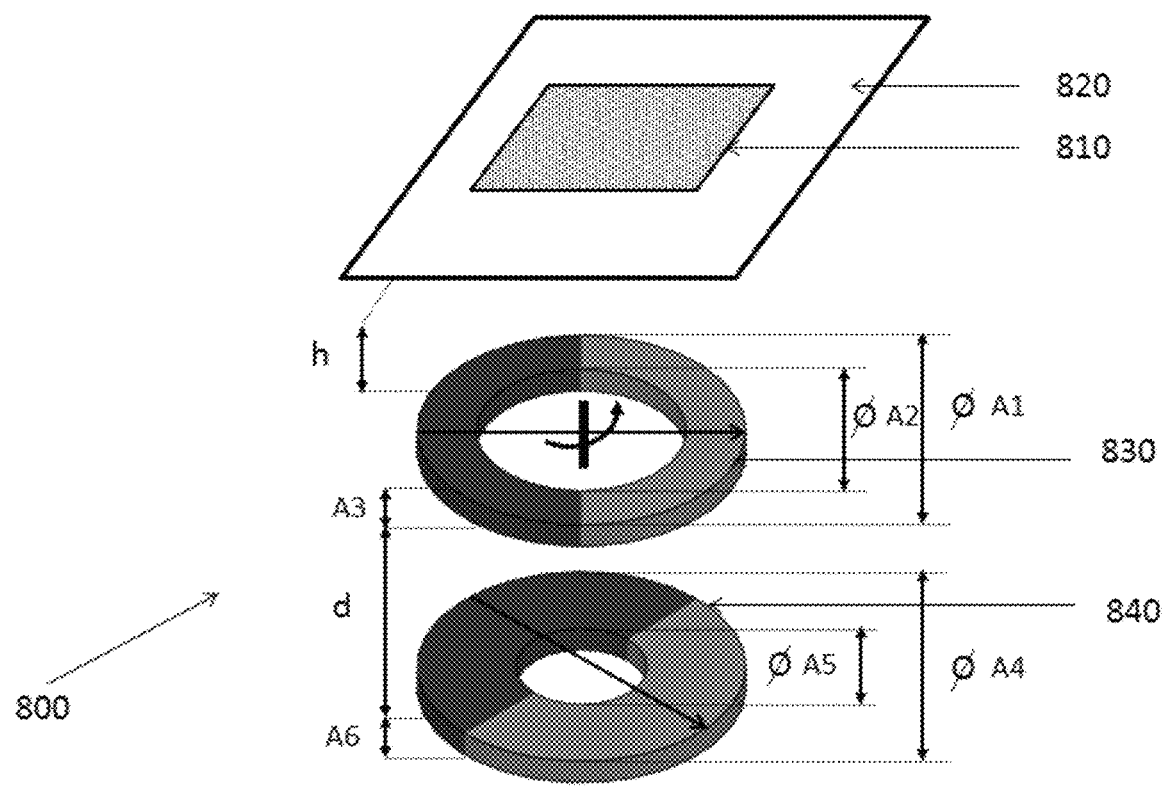
Fig. 8A2
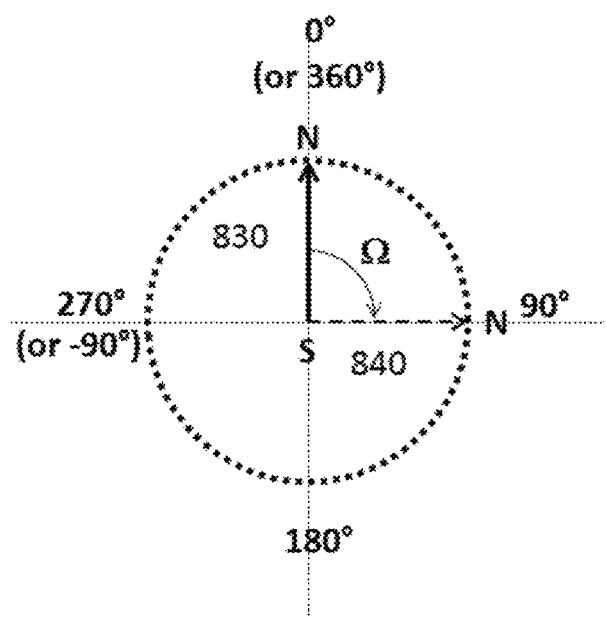

Fig. 9A1
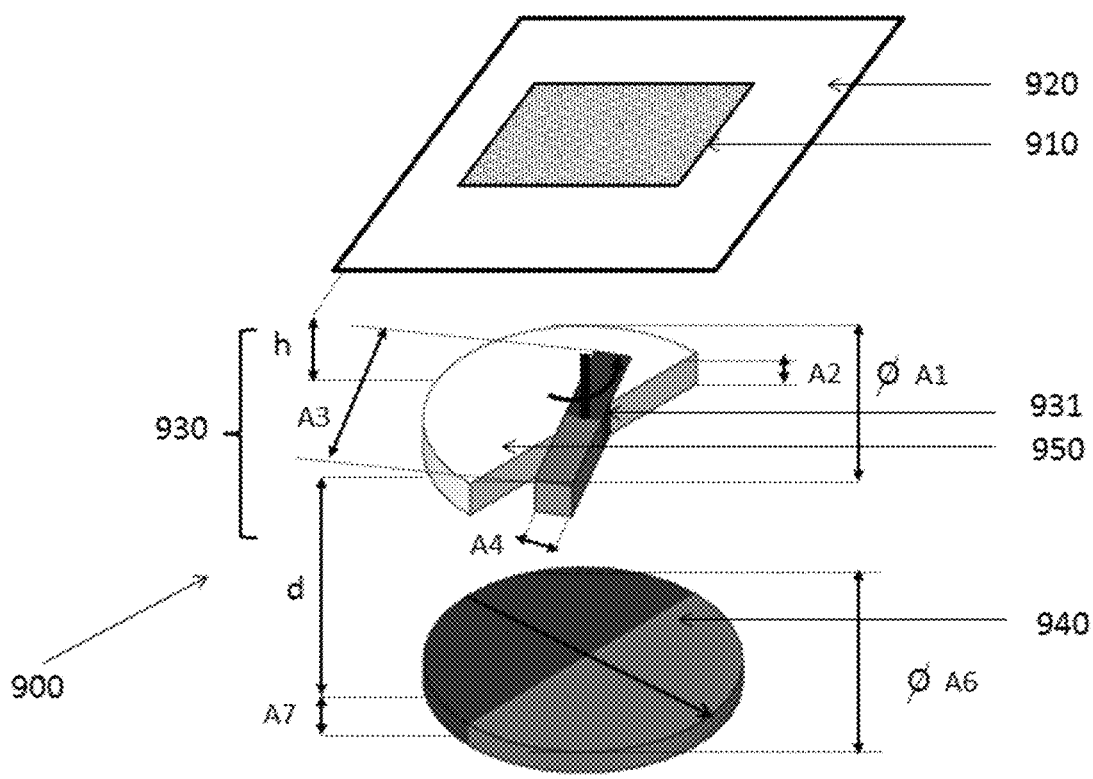
Fig. 9A2
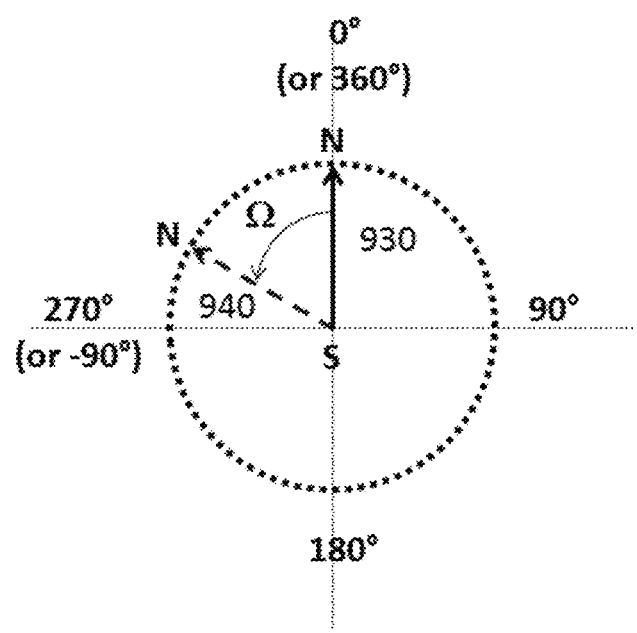

Fig. 9B1
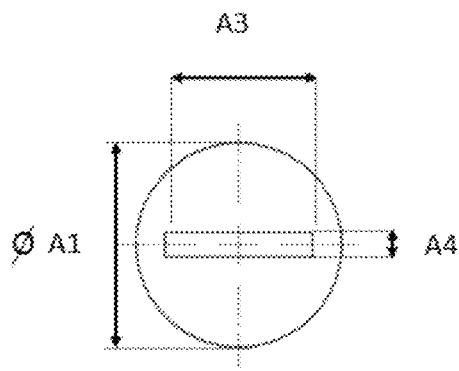
Fig. 9B2
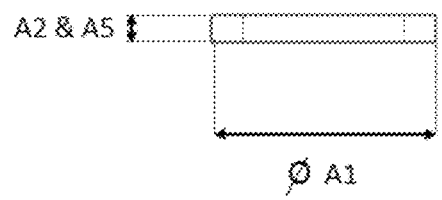
Fig. 9C
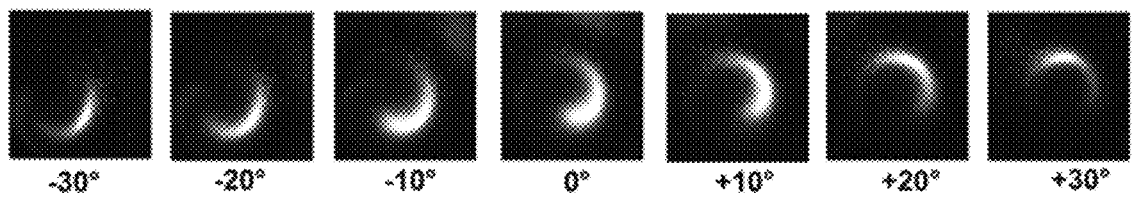
Fig. 9D
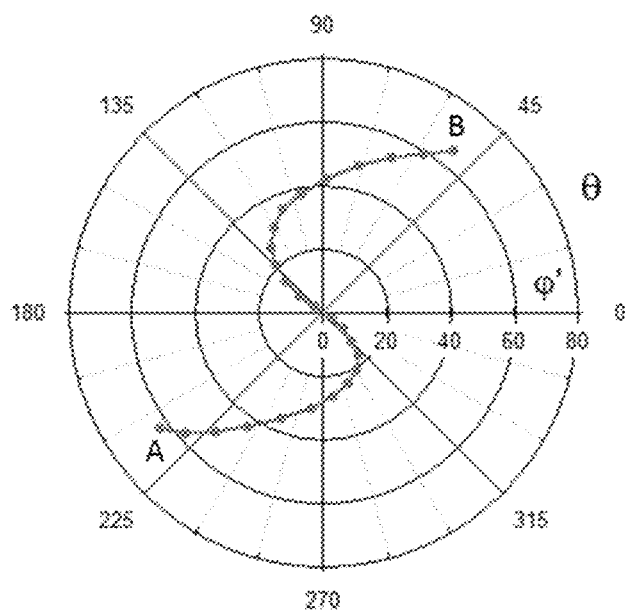

Fig. 10A1
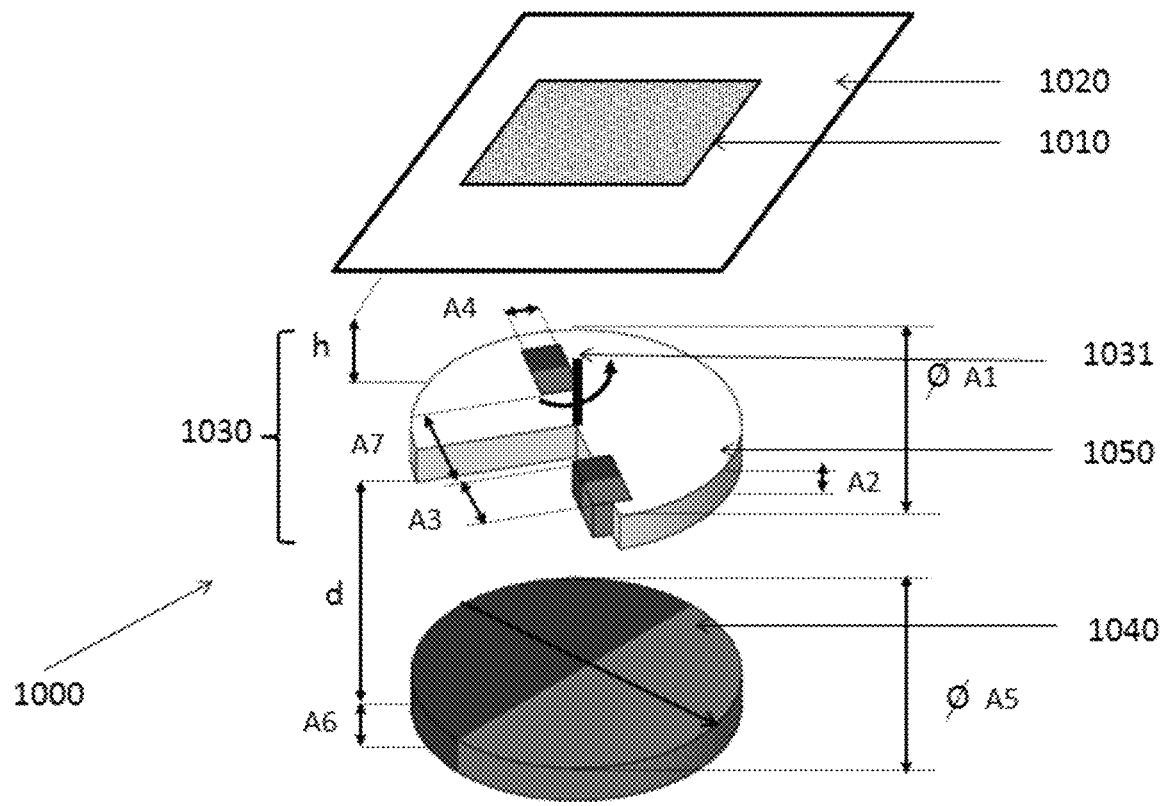
Fig. 10A2
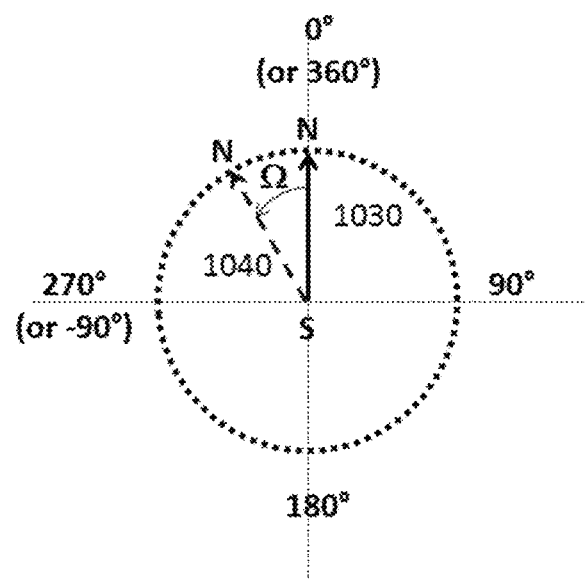

Fig. 10B1
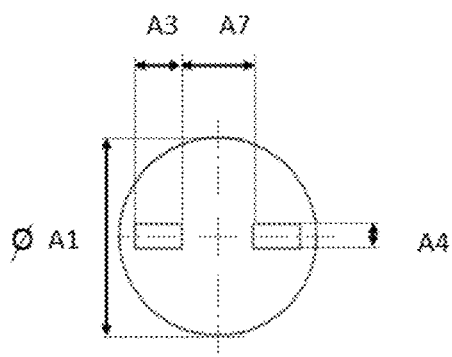
Fig. 10B2
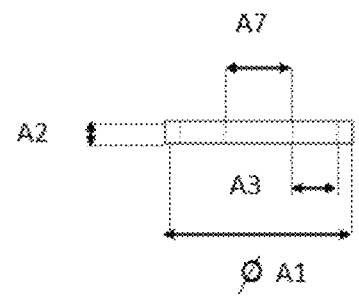
Fig. 10C
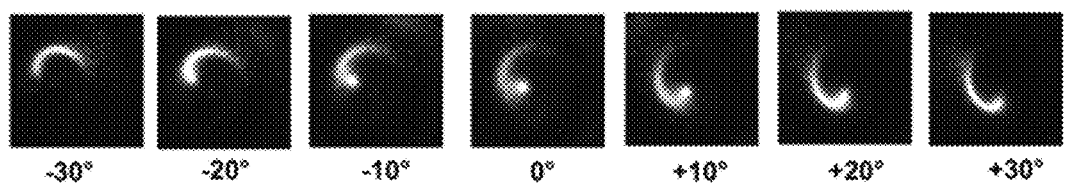
Fig. 10D
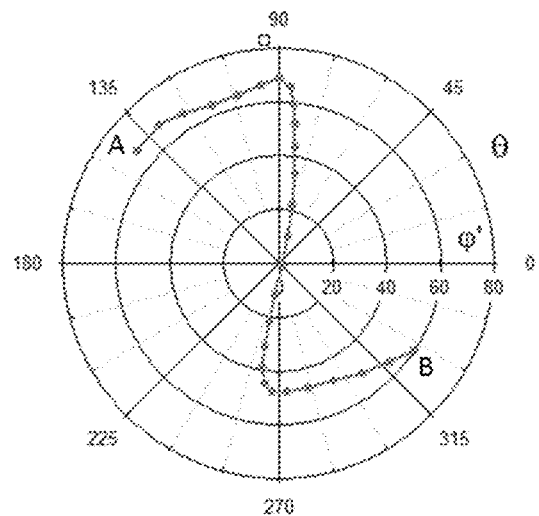

Fig. 11A1
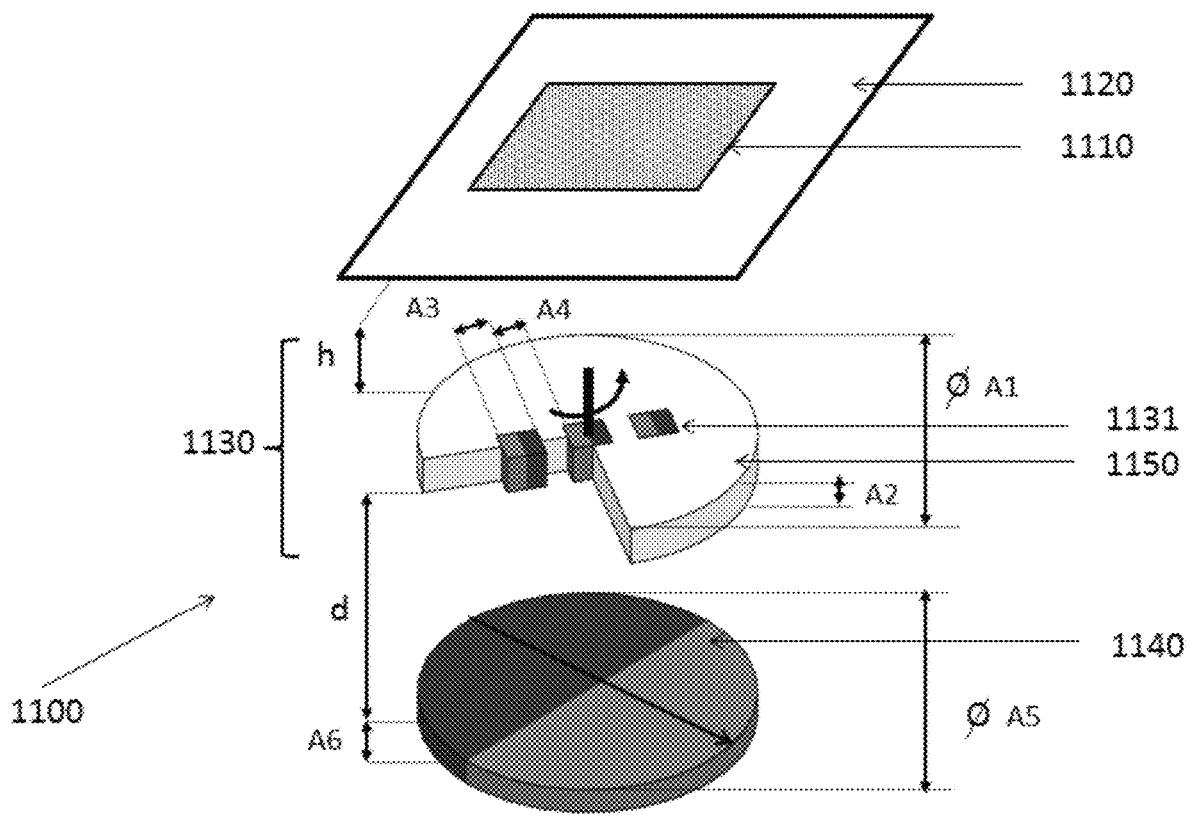
Fig. 11A2
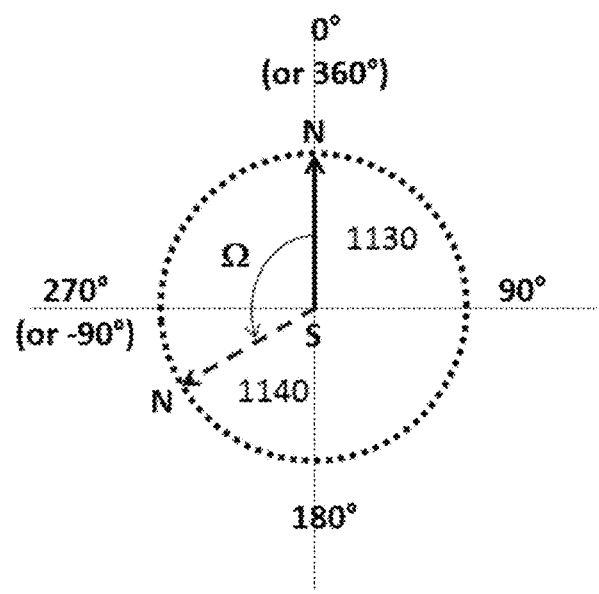

Fig. 11B1
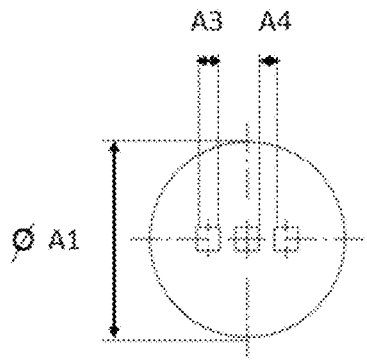
Fig. 11B2
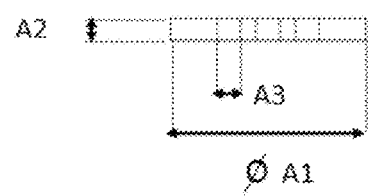
Fig. 11C
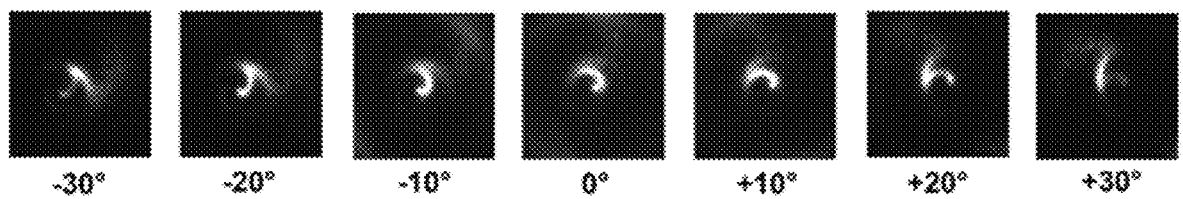
-30°  -20°  -10°  0°  +10°  +20°  +30°
Fig. 11D
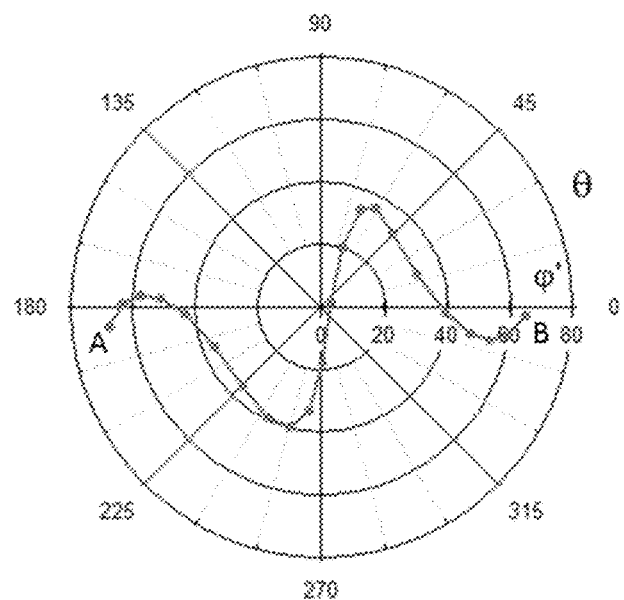

Fig. 15A1
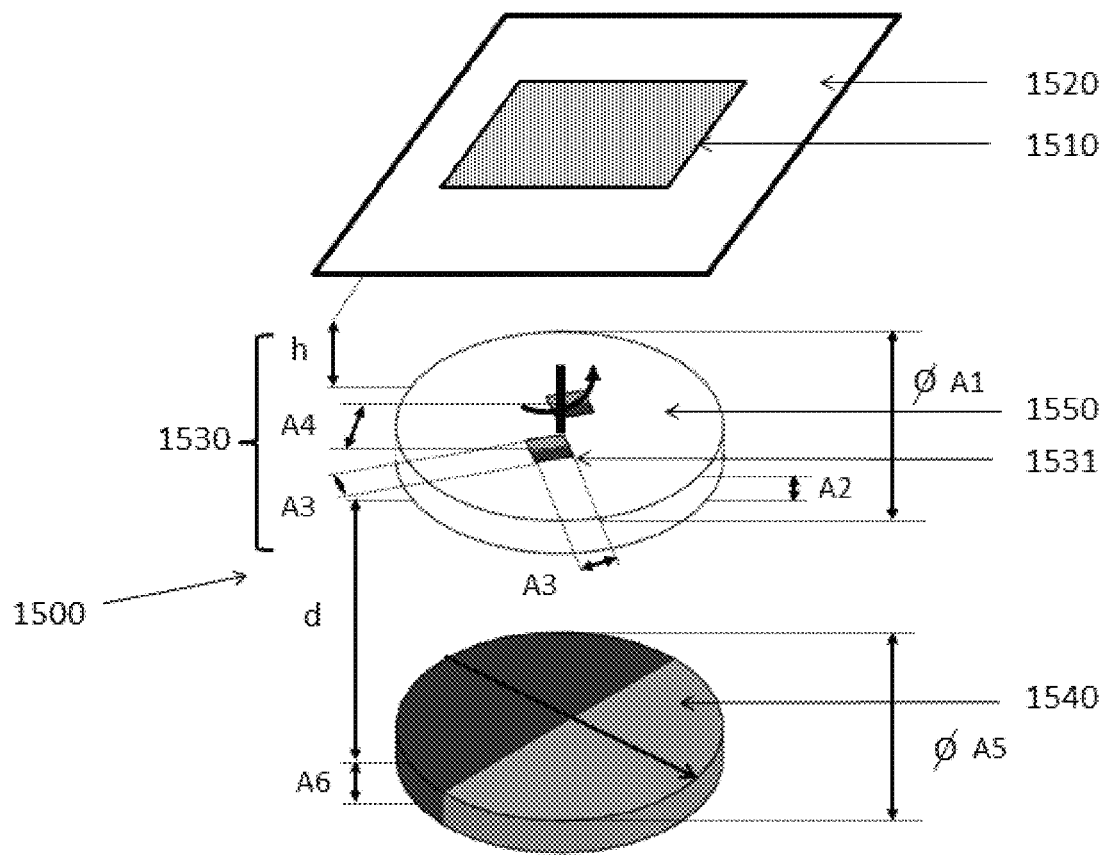
Fig. 15A2
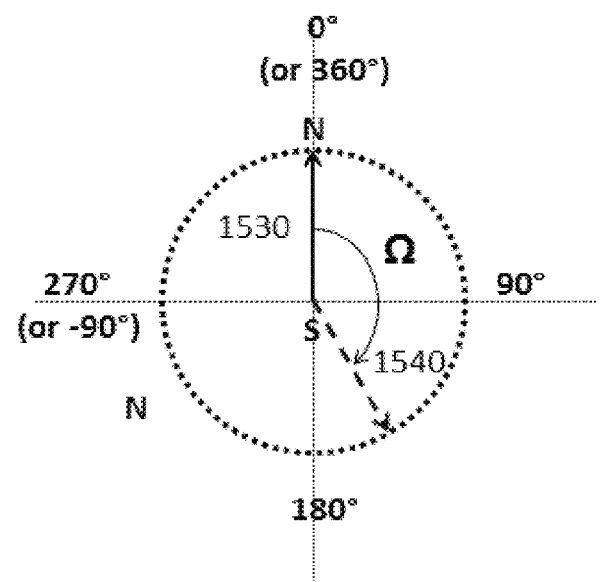

Fig. 15B1
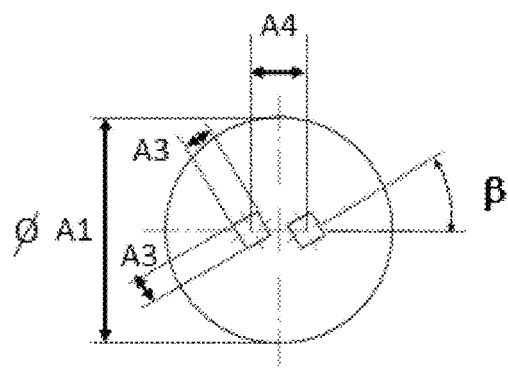
Fig. 15B2
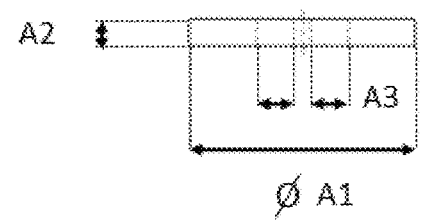
Fig. 15C
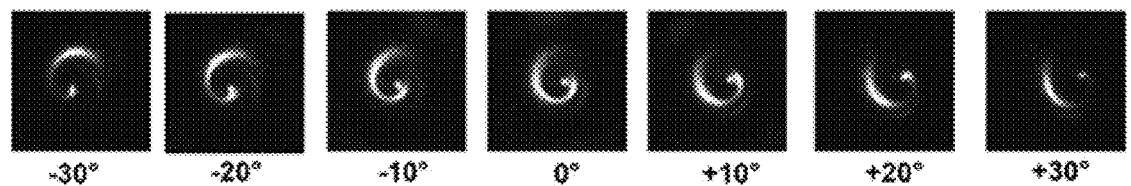
Fig. 15D
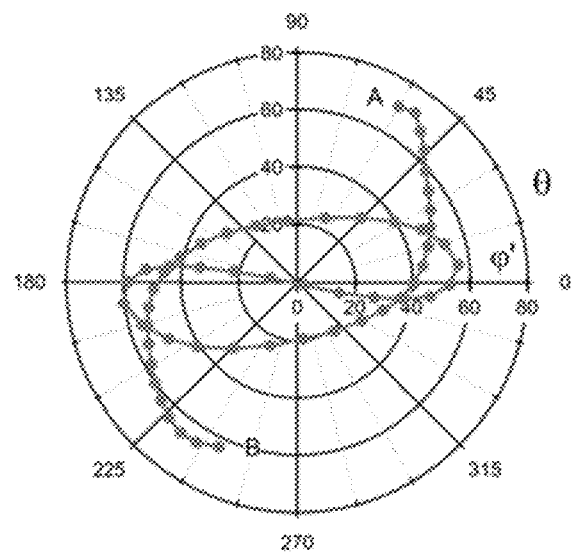

~ -30°  ~ 0°

~ -30°  ~ 0°

~ -30°  ~ 0°

ASSEMBLIES AND PROCESSES FOR PRODUCING OPTICAL EFFECT LAYERS COMPRISING ORIENTED NON-SPHERICAL OBLATE MAGNETIC OR MAGNETIZABLE PIGMENT PARTICLES

FIELD OF THE INVENTION

The present invention relates to the field of the protection of value documents and value or branded commercial goods against counterfeit and illegal reproduction. In particular, the present invention relates to optical effect layers (OELs) showing a viewing-angle dynamic appearance and optical effect, spinneable magnetic assemblies and processes for producing said OELs, as well as to uses of said OELs as anti-counterfeit means on documents and articles.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features for security documents and articles can be classified into "covert" and "overt" security features. The protection provided by covert security features relies on the concept that such features are hidden to the human senses, typically requiring specialized equipment and knowledge for their detection, whereas "overt" security features are easily detectable with the unaided human senses. Such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local orientation of the magnetic or magnetizable pigment particles in the unhardened coating, followed by hardening the latter to fix the particles in their positions and orientations. This results in specific optical effects, i.e. fixed magnetically induced images, designs or patterns which are highly resistant to counterfeiting. The security elements based on oriented magnetic or magnetizable pigment particles can only be produced by having access to both, the magnetic or magnetizable pigment particles or a corresponding ink or coating composition comprising said particles, and the particular technology employed for applying said ink or coating composition and for orienting said pigment particles in the applied ink or coating composition, followed by hardening said ink or composition.

"Moving-ring" effects have been developed as efficient security elements. Moving-ring effects consist of optically illusive images of objects such as funnels, cones, bowls, circles, ellipses, and hemispheres that appear to move in any x-y direction in the plane of the coating as a function of the chosen illumination or observation angles, i.e. of the tilt angles of said optical effect layer. Means and methods for producing moving-ring effects are disclosed for example in EP 1 710 756 A1, U.S. Pat. No. 8,343,615, EP 2 306 222 A1, EP 2 325 677 A2, and US 2013/084411.

WO 2011/092502 A2 discloses an apparatus for producing moving-ring images displaying an apparently moving ring with changing viewing angle. The disclosed moving-ring images can be obtained or produced with the help of a magnetic field produced by the combination of a soft-magnetic sheet and a spherical magnet having its magnetic axis perpendicular to the plane of the coating layer and disposed below said soft-magnetic sheet.

A need remains for different security features based on oriented magnetic particles in inks or coating compositions, displaying bright eye-catching optical effects, which are easily verified by the unaided eye, which are difficult to produce on a mass-scale with the equipment available to a counterfeiter, but can be provided in a large number of different shapes and colors using a same equipment at the security printer.

SUMMARY OF THE INVENTION

Accordingly, it is an object of the present invention to provide an optical effect layer (OEL) which exhibits a viewing-angle dependent apparent motion and viewing-angle dynamic appearance. It is particularly desirable to provide such OEL as an improved easy-to-detect overt security feature, or in addition or alternatively as a covert security feature, e.g. in the field of document security. According to a further object, such OEL is also suitable for decorative purposes.

The present invention provides optical effect layers (x10; OEL) comprising non-spherical oblate magnetic or magnetizable pigment particles, said non-spherical oblate magnetic or magnetizable pigment particles being oriented according to an orientation pattern,
wherein the orientation pattern is circularly symmetric around a center of rotation,
wherein the non-spherical oblate magnetic or magnetizable pigment particles at at least two, preferably four, distinct locations $x_i$ along any selected diameter of the OEL have an average zenithal deflection angle $\varphi'$ at location $x_i$ and an average azimuth angle $\theta$ with respect to the selected diameter at the same location $x_i$ that satisfy the condition $|\varphi' \sin(\theta)| \geq 10°$, preferably $\geq 15°$,
and said optical effect layer providing an optical impression of at least one circularly moving spot or at least one comet-shaped spot rotating around said center of rotation upon tilting said OEL.

Also described herein are uses of the optical effect layer (OEL) described herein for the protection of a security document or article against counterfeiting or fraud or for a decorative application.

Also described herein are security documents or decorative elements or objects comprising one or more of the optical effect layers (OELs) described herein.

Also described herein are spinneable magnetic assemblies (x00) for producing the optical effect layer (OEL) (x10) described herein and uses of said spinneable magnetic assemblies (x00) for producing the optical effect layer (OEL) (x10) on the substrate (x20) described herein. In particular, the non-spherical oblate magnetic or magnetizable pigment particles are oriented with the magnetic field of a spinning magnet assembly (x00), wherein the surface of the substrate provided with the OEL is substantially perpendicular to the axis of spinning of the magnet assembly (X00). The spinneable magnetic assemblies (x00) described herein comprise at least a) first magnetic-field generating device (x30) and b) a second magnetic-field generating device (x40), wherein said first magnetic-field generating device (x30) and said second magnetic-field generating device (x40) have mutually skew magnetic axis, wherein said first magnetic-field generating device (x30) has its magnetic axis substantially perpendicular to the axis of spinning and said second magnetic-field generating device (x40) has its magnetic axis substantially perpendicular to the axis of spinning and wherein the projection of the magnetic axis of the first magnetic-field generating device (x30) and the projection of the magnetic axis of the second magnetic-field generating device (x40) along the axis of spinning onto a plane perpendicular to the axis of spinning form an angle (Ω) either in the range from about 5° to about 175° or in the range from about −5° to about −175°, preferably in the range from about 15° to about 165° or in the range from about −15° to about −165°. The spinneable magnetic assemblies (x00) for producing the optical effect layer (OEL) (x10) described herein comprise:

a) a first magnetic-field generating device (x30) comprising a bar dipole magnet having its North-South magnetic axis substantially perpendicular to the axis of spinning, or two or more bar dipole magnets, each of said two or more bar dipole magnets having its North-South magnetic axis substantially perpendicular to the axis of spinning and all of said two or more bar dipole magnets having a same magnetic field direction, or a loop-shaped, preferably a ring-shaped, dipole magnet having its North-South magnetic axis substantially perpendicular to the axis of spinning, or a disc-shaped dipole magnet being nested inside a loop-shaped, preferably a ring-shaped, dipole magnet, each of the disc-shaped dipole magnet and the loop-shaped, preferably the ring-shaped, dipole magnet having their North-South magnetic axis substantially perpendicular to the axis of spinning and having a same magnetic field direction, or two or more nested loop-shaped, preferably two or more nested ring-shaped, dipole magnets, each of said two or more nested loop-shaped, preferably two or more nested ring-shaped, dipole magnets having its North-South magnetic axis substantially perpendicular to the axis of spinning and all of said two or more nested loop-shaped, preferably two or more nested ring-shaped, dipole magnets having a same magnetic field direction; and b) the second magnetic-field generating device (x40) comprising a disc-shaped dipole magnet having its North-South magnetic axis substantially perpendicular to the axis of spinning, a loop-shaped, preferably a ring-shaped, dipole magnet having its North-South magnetic axis substantially perpendicular to the axis of spinning, or a bar dipole magnet having its North-South magnetic axis substantially perpendicular to the axis of spinning.

Also described herein are printing apparatuses for producing the optical effect layer (OEL) described herein on a substrate such as those described herein, wherein said printing apparatuses comprise at least one of the spinneable magnetic assemblies (x00) described herein. The printing apparatus described herein comprises a rotating magnetic cylinder comprising at least one of the spinneable magnetic assemblies (x00) described herein or a flatbed printing unit comprising at least one of the spinneable magnetic assemblies (x00) described herein.

Also described herein are uses of the printing apparatus described herein for producing the optical effect layer (OEL) described herein on a substrate such as those described herein.

Also described herein are processes for producing the optical effect layer (OEL) described herein on a substrate (x20) and optical effect layers (OEL) obtained thereof, said processes comprising the steps of:

i) applying on the substrate (x20) surface the radiation curable coating composition comprising non-spherical oblate magnetic or magnetizable pigment particles described herein, said radiation curable coating composition being in a first state;

ii) exposing the radiation curable coating composition to a magnetic field of the spinning magnetic assembly (x00) described herein or the printing apparatus described herein so as to orient at least a part of the non-spherical oblate magnetic or magnetizable pigment particles; and iii) at least partially curing the radiation curable coating composition of step ii) to a second state so as to fix the non-spherical oblate magnetic or magnetizable pigment particles in their adopted positions and orientations.

Also described herein are methods of manufacturing a security document or a decorative element or object, comprising a) providing a security document or a decorative element or object, and b) providing an optical effect layer such as those described herein, in particular such as those obtained by the process described herein, so that it is comprised by the security document or decorative element or object.

The present invention provides reliable means and methods to protect security documents and articles as to their authenticity. The security features described herein have an aesthetic appearance, can be produced in a wide variety of embodiments and forms, so as to integrate well into design specifications, and are easily recognized with the unaided human eye. On the other hand, they are not easily produced, requiring a dedicated set-up at the security printer for their production, which is integrated into the printing machine and which runs at full production speed.

BRIEF DESCRIPTION OF DRAWINGS

FIG. 5A1 schematically illustrates a spinneable magnetic assembly (500) for producing an optical effect layer (OEL) (510) on a substrate (520) surface, wherein said spinneable magnetic assembly (500) has an axis of spinning (arrow) which, upon use to produce the OEL, is substantially perpendicular to the substrate (520) surface, wherein the spinneable magnetic assembly comprises a first magnetic-field generating device (530) being a ring-shaped dipole magnet having its North-South magnetic axis substantially perpendicular to the axis of spinning and substantially parallel to the substrate (520) surface and being diametrically magnetized and a second magnetic-field generating device (540) being a disc-shaped dipole magnet having its North-South magnetic axis substantially perpendicular to the axis of spinning and substantially parallel to the substrate (520) surface and being diametrically magnetized, wherein the first magnetic-field generating device (530) is coaxially placed on top of the second magnetic-field generating device (540) and wherein the projection of the magnetic axis of the ring-shaped dipole magnet (530) and the projection of the magnetic axis of the disc-shaped dipole magnet (540) along the axis of spinning onto a plane perpendicular to the axis of spinning form an angle ($\Omega$).

FIG. 5A2 schematically illustrates the angle $\Omega$ between the projection of the magnetic axis of the ring-shaped dipole magnet (530) and the projection of the magnetic axis of the disc-shaped dipole magnet (540) along the axis of spinning onto a plane perpendicular to the axis of spinning.

FIG. 6A1 schematically illustrates a spinneable magnetic assembly (600) for producing an optical effect layer (OEL) (610) on a substrate (620) surface, wherein said spinneable magnetic assembly (600) has an axis of spinning (arrow) which, upon use to produce the OEL, is substantially perpendicular to the substrate (620) surface, wherein the spinneable magnetic assembly comprises a first magnetic-field generating device (630) being a ring-shaped dipole magnet having its North-South magnetic axis substantially perpendicular to the axis of spinning and substantially parallel to the substrate (620) surface and being diametrically magnetized and a second magnetic-field generating device (640) being a disc-shaped dipole magnet having its North-South magnetic axis substantially perpendicular to the axis of spinning and substantially parallel to the substrate (620) surface and being diametrically magnetized, wherein the second magnetic-field generating device (640) is coaxially placed on top of the first magnetic-field generating device (630) and wherein the projection of the magnetic axis of the ring-shaped dipole magnet (630) and the projection of the magnetic axis of the disc-shaped dipole magnet (640) along the axis of spinning onto a plane perpendicular to the axis of spinning form an angle ($\Omega$).

FIG. 6A2 schematically illustrates the angle $\Omega$ between the projection of the magnetic axis of the ring-shaped dipole magnet (630) and the projection of the magnetic axis of the disc-shaped dipole magnet (640) along the axis of spinning onto a plane perpendicular to the axis of spinning.

FIG. 7-8A1 schematically respectively illustrate a spinneable magnetic assembly (700, 800) for producing an optical effect layer (OEL) (710, 810) on a substrate (720, 820) surface, wherein said spinneable magnetic assembly (700, 800) has an axis of spinning (arrow) which upon use to produce the OEL is substantially perpendicular to the substrate (720 820) surface, wherein the spinneable magnetic assembly comprises a first magnetic-field generating device (730, 830) being a ring-shaped dipole magnet having its North-South magnetic axis substantially perpendicular to the axis of spinning and substantially parallel to the substrate (720, 820) surface and being diametrically magnetized and a second magnetic-field generating device (740, 840) being a ring-shaped dipole magnet having its North-South magnetic axis substantially perpendicular to the axis of spinning and substantially parallel to the substrate (720, 820) surface and being diametrically magnetized, wherein the first magnetic-field generating device (730, 830) is coaxially placed on top of the second magnetic-field generating device (740, 840) and wherein the projection of the magnetic axis of the ring-shaped dipole magnet (730, 830) and the projection of the magnetic axis of the disc-shaped dipole magnet (740, 840) along the axis of spinning onto a plane perpendicular to the axis of spinning form an angle ($\Omega$).

FIG. 7-8A2 schematically and respectively illustrate the angle $\Omega$ between the projection of the magnetic axis of the ring-shaped dipole magnet (730, 830) and the projection of the magnetic axis of the disc-shaped dipole magnet (740, 840) along the axis of spinning onto a plane perpendicular to the axis of spinning.

FIG. 7-8B respectively show pictures of an OEL obtained by using the magnetic assembly illustrated in FIG. 7-8A1, as seen from a fixed position as the sample is tilted from −30° to +30°.

FIG. 7-8C gives, in ($\varphi'$,$\theta$) graphical representation, measured particle orientations at several locations $x_i$ along a selected diameter through the origin of the OEL obtained with the spinning magnet assembly depicted in FIG. 7-8A1.

FIG. 9A1, 9B1-B2 schematically illustrate a spinneable magnetic assembly (900) for producing an optical effect layer (OEL) (910) on a substrate (920) surface, wherein said spinneable magnetic assembly (900) has an axis of spinning (arrow) which upon use to produce the OEL is substantially perpendicular to the substrate (920) surface, wherein the spinneable magnetic assembly comprises a first magnetic-field generating device (930) being a bar dipole magnet (931) embedded in a supporting matrix (950) and having its North-South magnetic axis substantially perpendicular to the axis of spinning and substantially parallel to the substrate (920) surface and a second magnetic-field generating device (940) being a disc-shaped dipole magnet having its North-South magnetic axis substantially perpendicular to the axis of spinning and substantially parallel to the substrate (920) surface and being diametrically magnetized, wherein the first magnetic-field generating device (930) is coaxially placed on top of the second magnetic-field generating device (940) and wherein the projection of the magnetic axis of the bar dipole magnet (930) and the projection of the magnetic axis of the disc-shaped dipole magnet (940) along the axis of spinning onto a plane perpendicular to the axis of spinning form an angle ($\Omega$).

FIG. 9A2 schematically illustrates the angle $\Omega$ between the projection of the magnetic axis of the bar dipole magnet (930) and the projection of the magnetic axis of the disc-shaped dipole magnet (940) along the axis of spinning onto a plane perpendicular to the axis of spinning.

FIG. 9C shows pictures of an OEL obtained by using the magnetic assembly illustrated in FIG. 9A1, as seen from a fixed position as the sample is tilted from −30° to +30°.

FIG. 9D gives, in ($\varphi'$,$\theta$) graphical representation, measured particle orientations at several locations $x_i$ along a selected diameter through the origin of the OEL obtained with the spinning magnet assembly depicted in FIG. 9A1.

FIG. 10A1, 10B1-B2 schematically illustrate a spinneable magnetic assembly (1000) for producing an optical effect layer (OEL) (1010) on a substrate (1020) surface, wherein said spinneable magnetic assembly (1000) has an axis of spinning (arrow) which upon use to produce the OEL is substantially perpendicular to the substrate (1020) surface, wherein the spinneable magnetic assembly comprises a first magnetic-field generating device (1030) comprising a centered arrangement of two bar dipole magnets (1031) embedded in a supporting matrix (1050), each having its North-South magnetic axis substantially perpendicular to the axis of spinning and substantially parallel to the substrate (1020) surface and having their magnetic axis pointing in the same direction and a second magnetic-field generating device (1040) being a disc-shaped dipole magnet having its North-South magnetic axis substantially perpendicular to the axis of spinning and substantially parallel to the substrate (1020) surface and being diametrically magnetized, wherein the first magnetic-field generating device (1030) is coaxially placed on top of the second magnetic-field generating device (1040) and wherein the projection of the magnetic axis of the two bar dipole magnets (1031) and the projection of the magnetic axis of the disc-shaped dipole magnet (1040) along the axis of spinning onto a plane perpendicular to the axis of spinning form an angle ($\Omega$).

FIG. 10A2 schematically illustrates the angle $\Omega$ between the projection of the magnetic axis of the two bar dipole magnets (1031) of the first magnetic-field generating device (1030) and the projection of the magnetic axis of the disc-shaped dipole magnet (1040) along the axis of spinning onto a plane perpendicular to the axis of spinning.

FIG. 10C shows pictures of an OEL obtained by using the magnetic assembly illustrated in FIG. 10A1, as seen from a fixed position as the sample is tilted from −30° to +30°.

FIG. 10D gives, in ($\varphi'$,$\theta$) graphical representation, measured particle orientations at several locations $x_i$ along a selected diameter through the origin of the OEL obtained with the spinning magnet assembly depicted in FIG. 10A1.

FIG. 11A1, 11B1-B2 schematically illustrate a spinneable magnetic assembly (1100) for producing an optical effect layer (OEL) (1110) on a substrate (1120) surface, wherein said spinneable magnetic assembly (1100) has an axis of spinning (arrow) which upon use to produce the OEL is substantially perpendicular to the substrate (1120) surface, wherein the spinneable magnetic assembly comprises a first magnetic-field generating device (1130) comprising a centered arrangement of three collinear bar dipole magnets (1131) embedded in a supporting matrix (1132), having its North-South magnetic axis substantially perpendicular to the axis of spinning and substantially parallel to the substrate (1120) surface and having their magnetic axis pointing in the same direction and a second magnetic-field generating device (1140) being a disc-shaped dipole magnet having its North-South magnetic axis substantially perpendicular to the axis of spinning and substantially parallel to the substrate (1120) surface and being diametrically magnetized, wherein the first magnetic-field generating device (1130) is coaxially placed on top of the second magnetic-field generating device (1140) and wherein the projection of the magnetic axis of the three bar dipole magnets (1131) of the first magnetic-field generating device (1130) and the projection of the magnetic axis of the disc-shaped dipole magnet (1140) along the axis of spinning onto a plane perpendicular to the axis of spinning form an angle ($\Omega$).

FIG. 11A2 schematically illustrates the angle $\Omega$ between the projection of the magnetic axis of the three bar dipole magnets (1131) and the projection of the magnetic axis of the disc-shaped dipole magnet (1140) along the axis of spinning onto a plane perpendicular to the axis of spinning.

FIG. 11C shows pictures of an OEL obtained by using the magnetic assembly illustrated in FIG. 11A1, as seen from a fixed position as the sample is tilted from −30° to +30°.

FIG. 11D gives, in ($\varphi'$,$\theta$) graphical representation, measured particle orientations at several locations $x_i$ along a selected diameter through the origin of the OEL obtained with the spinning magnet assembly depicted in FIG. 11A1.

and of the ring-shaped dipole magnet (1231-b) and the projection of the magnetic axis of the disc-shaped dipole magnet (1240) form an angle (Ω).

Figure 13:
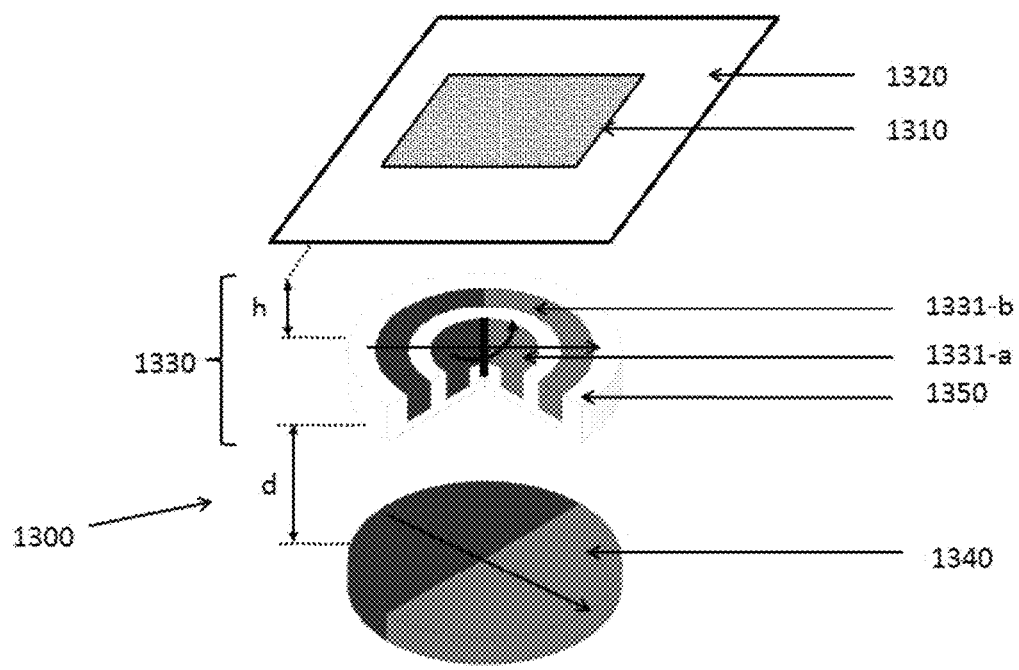

FIG. 13 schematically illustrates a spinneable magnetic assembly (1300) for producing an optical effect layer (OEL) (1310) on a substrate (1320) surface, wherein said spinneable magnetic assembly (1300) has an axis of spinning (arrow) which upon use to produce the OEL is substantially perpendicular to the substrate (1320) surface, wherein the spinneable magnetic assembly comprises a first magnetic-field generating device (1330) comprising two nested ring-shaped magnets (1331-a, 1131-b) embedded in a supporting matrix (1350), each of said two or more nested ring-shaped magnets (1331-a, 1331-b) having its North-South magnetic axis substantially perpendicular to the axis of spinning and substantially parallel to the substrate (1320) surface and being diametrically magnetized and all of said two or more nested ring-shaped magnets (1331-a, 1331-b) pointing in the same direction and a second magnetic-field generating device (1340) being a disc-shaped dipole magnet having its North-South magnetic axis substantially perpendicular to the axis of spinning and substantially parallel to the substrate (1320) surface and being diametrically magnetized, wherein the first magnetic-field generating device (1330) is coaxially placed on top of the second magnetic-field generating device (1340) and wherein the projection of the magnetic axis of the two nested ring-shaped magnets (1331-a, 1331-b) and the projection of the magnetic axis of the disc-shaped dipole magnet (1340) form an angle (Ω).

Figure 14A:
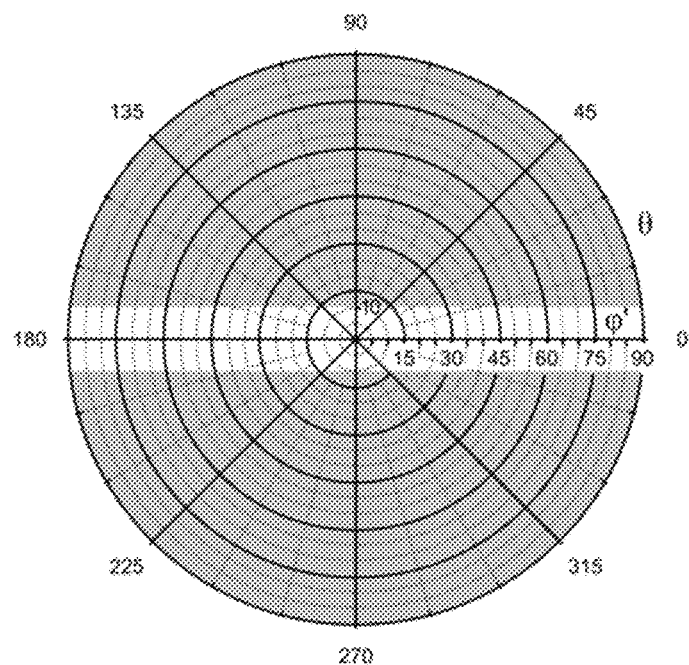
Figure 14B:
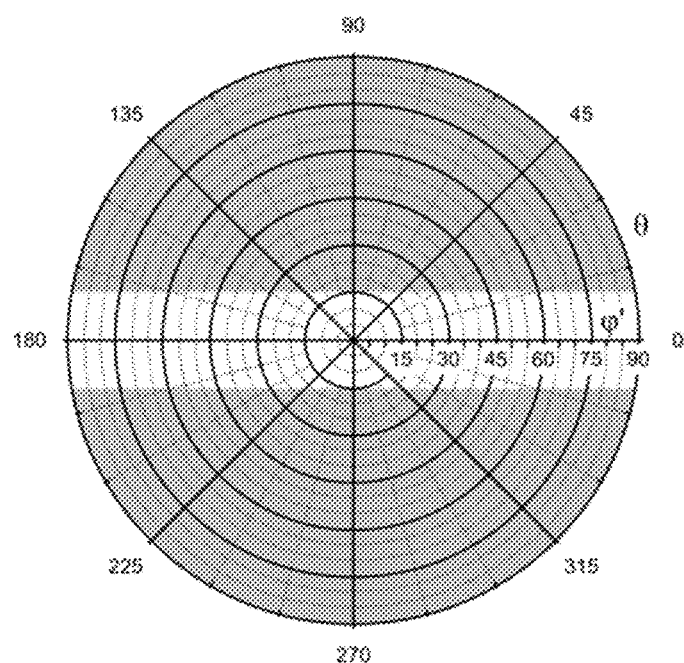

FIG. 14A-B shows as shaded areas in ($\varphi'$, $\theta$) graphical representation, the range of non-spherical oblate magnetic or magnetizable pigment particle orientations that have a zenithal deflection angle $\varphi'$ and an azimuth angle $\theta$ satisfying the condition $|\varphi' \sin(\theta)| \geq 10°$ (FIG. 14A) or the condition $|\varphi' \sin(\theta)| \geq 15°$ (FIG. 14B).

FIG. 15A1, 15B1-B2 schematically illustrate a spinneable magnetic assembly (1500) for producing an optical effect layer (OEL) (1510) on a substrate (1520) surface, wherein said spinneable magnetic assembly (1500) has an axis of spinning (arrow) which upon use to produce the OEL is substantially perpendicular to the substrate (1520) surface, wherein the spinneable magnetic assembly comprises a first magnetic-field generating device (1530) comprising a centered arrangement of two bar dipole magnets (1531) embedded in a supporting matrix (1550), each having its North-South magnetic axis substantially perpendicular to the axis of spinning and substantially parallel to the substrate (1520) surface and having their magnetic axis pointing in the same direction and being tilted by a specific angle from the diameter of the supporting matrix (1550) crossing the center of the top face of the two bar dipole magnets (1531) and a second magnetic-field generating device (1540) being a disc-shaped dipole magnet having its North-South magnetic axis substantially perpendicular to the axis of spinning and substantially parallel to the substrate (1520) surface and being diametrically magnetized, wherein the first magnetic-field generating device (1530) is coaxially placed on top of the second magnetic-field generating device (1540) and wherein the projection of the magnetic axis of the two bar dipole magnets (1531) and the projection of the magnetic axis of the disc-shaped dipole magnet (1540) along the axis of spinning onto a plane perpendicular to the axis of spinning form an angle (Ω).

FIG. 15A2 schematically illustrates the angle Ω between the projection of the magnetic axis of the two bar dipole magnets (1531) of the first magnetic-field generating device (1530) and the projection of the magnetic axis of the disc-shaped dipole magnet (1540) along the axis of spinning onto a plane perpendicular to the axis of spinning.

FIG. 15C shows pictures of an OEL obtained by using the magnetic assembly illustrated in FIG. 15A1, as seen from a fixed position as the sample is tilted from −30° to +30°.

FIG. 15D gives, in ($\varphi'$,$\theta$) graphical representation, measured particle orientations at several locations $x_i$ along a selected diameter through the origin of the OEL obtained with the spinning magnet assembly depicted in FIG. 15A1.

Figure 16A:
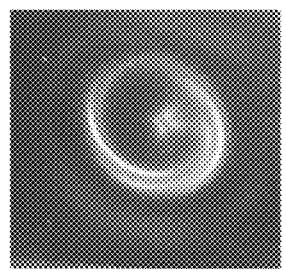
Figure 16A:
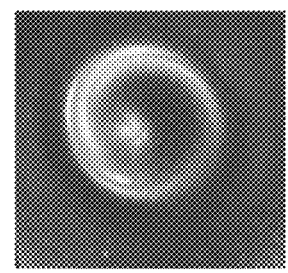
Figure 16B:
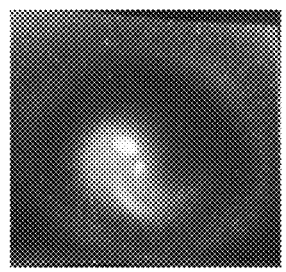
Figure 16B:
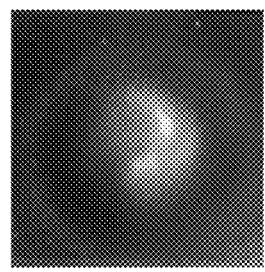
Figure 16C:
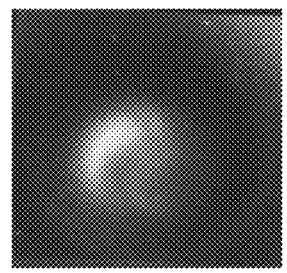
Figure 16C:
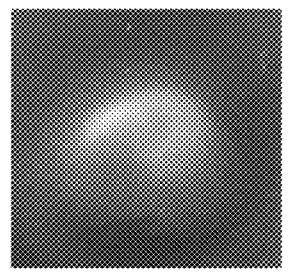

FIG. 16A-C show pictures of OELs by tilting said OELs from at −30° and 0° obtained by using the magnetic assembly illustrated in FIG. 5A1, except that the distance (d) between the lower surface of the ring-shaped dipole magnet (530) and the upper surface of the disc-shaped dipole magnet (540) is changed and/or the distance (h) between the upper surface of the ring-shaped dipole magnet (530) and the surface of the substrate (520) facing the spinneable magnetic assembly (500) is changed.

DETAILED DESCRIPTION

Definitions

The following definitions apply to the meaning of the terms employed in the description and recited in the claims.

As used herein, the indefinite article "a" indicates one as well as more than one, and does not necessarily limit its referent noun to the singular.

As used herein, the term "about" means that the amount or value in question may be the specific value designated or some other value in its neighborhood. Generally, the term "about" denoting a certain value is intended to denote a range within ±5% of that value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

The term "substantially parallel" refers to deviating not more than 10° from parallel alignment and the term "substantially perpendicular" refers to deviating not more than 10° from perpendicular alignment.

As used herein, the term "and/or" means that either both or only one of the elements linked by the term is present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance solution composition comprising a compound A may include other compounds besides A.

However, the term "comprising" also covers, as a particular embodiment thereof, the more restrictive meanings of "consisting essentially of" and "consisting of", so that for instance "a composition comprising A, B and optionally C" may also (essentially) consist of A and B, or (essentially) consist of A, B and C.

In a composition, the term "containing" is to be interpreted as being non-exclusive. A "coating composition containing A" means that A should be present, but does not exclude B, C, etc. from also being present.

The term "coating composition" refers to any composition which is capable of forming a coating, in particular an optical effect layer (OEL) of the present invention, on a solid substrate, and which can be applied, preferably but not exclusively, by a printing method. The coating composition of the present invention comprises at least a plurality of non-spherical oblate magnetic or magnetizable pigment particles and a binder.

The term "optical effect layer (OEL)" as used herein denotes a layer that comprises at least a plurality of magnetically oriented non-spherical oblate magnetic or magnetizable pigment particles and a binder, wherein the non-spherical oblate magnetic or magnetizable pigment particles are fixed or frozen (fixed/frozen) in position and orientation within said binder.

A "pigment particle", in the context of the present disclosure, designates a particulate material, which is insoluble in the ink or coating composition, and which provides the latter with a determined spectral transmission/reflection response.

The term "magnetic axis" denotes a theoretical line connecting the magnetic centers of the North- and South-pole faces of a magnet and extending through said pole faces. This term does not include any specific magnetic field direction.

The term "magnetic field direction" denotes the direction of the magnetic field vector along a magnetic field line pointing, at the exterior of a magnet, from its North pole to its South pole (see Handbook of Physics, Springer 2002, pages 463-464).

The term "curing" denotes a process which increases the viscosity of a coating composition as a reaction to a stimulus, to convert the coating composition into a state where the therein comprised magnetic or magnetizable pigment particles are fixed/frozen in their positions and orientations and can no longer move nor rotate (i.e. a cured, hardened or solid state).

As used herein, the term "at least" defines a determined quantity or more than said quantity, for example "at least one" means one, two or three, etc.

The term "security document" refers to a document which is protected against counterfeit or fraud by at least one security feature. Examples of security documents include, without limitation, currency, value documents, identity documents, etc.

The term "security feature" denotes an overt or a covert image, pattern, or graphic element that can be used for the authentication of the document or article carrying it.

Where the present description refers to "preferred" embodiments/features, combinations of these "preferred" embodiments/features shall also be deemed to be disclosed as preferred, as long as this combination of "preferred" embodiments/features is technically meaningful.

The present invention provides an optical effect layer (OEL), said OEL comprising a plurality of non-randomly oriented non-spherical oblate magnetic or magnetizable pigment particles, said pigment particles being dispersed within a hardened binder material. Thanks to the orientation pattern being circularly symmetric around a center of rotation as described herein, the optical effect layer (OEL) described herein provides a visual impression of at least one circularly moving spot rotating around said center of rotation upon tilting and rotating said OEL so that a normal to the surface of the OEL sweeps a cone. According to another embodiment, the optical effect layer (OEL) described herein provides a visual impression of at least one circularly moving comet-shaped spot rotating around the center of rotation upon tilting and rotating said OEL so that a normal to the surface of the OEL sweeps a cone. Moreover, the OEL described herein is that, upon tilting said OEL back and forth, said moving spot or comet-shaped moving spot will at least appear to move left to right or right to left, whereas when tilting said OEL side to side, said moving spot or comet-shaped moving spot appears to at least move back and forth. Examples of OEL providing the visual impression of at least one circularly moving comet-shaped spot rotating around the center of rotation upon tilting said OEL are shown in FIGS. 5B-8B and 9C-11C. The reflection pattern of the OEL described herein is circularly symmetric around its center of rotation, i.e. the orientation pattern of the reflective non-spherical oblate magnetic or magnetizable pigment particles comprised in the OEL described herein is circularly symmetric around its origin (x11). The present invention provides the visual impression of at least one circularly moving spot or at least one comet-shaped spot rotating around the center of rotation, wherein said spot or comet-shaped spot is not only moving back and forth (or up and down) when the OEL is tilted but also moving left and right as described hereabove.

As the OEL (x10) is circularly symmetric, the orientation pattern of the non-spherical oblate magnetic or magnetizable pigment particles comprised in the OEL can be fully described as a function of a radius emanating from the origin (x11). Two angle values (azimuth θ, inclination φ) can be used to express the orientation of a non-spherical oblate magnetic or magnetizable pigment particle, and hence, an orientation pattern according to the present invention is completely determined by indicating these two angle values along a radius emanating from the origin (x11) of the OEL (x10). As explained further below, the zenithal deflection angle φ', can be used in place of φ to describe the orientation of the particle, as it is easier to measure optically, provided the index of refraction of the OEL binder is substantially constant, which is usually the case. In the examples provided herein, the orientation of the non-spherical oblate magnetic or magnetizable pigment particles is measured along a selected diameter crossing the origin (x11). This yields two times the minimum necessary information require to describe the orientation pattern, and shows, within experimental error, that the patterns are circularly symmetric.

In the following, the reflecting, by oriented pigment particles in the optical effect layer, of incident light into particular directions in space, shall be understood as meaning a more or less directed reflecting, which may add more or less angular broadening to the incident beam of light, due to imperfect alignment or scattering by impurities or defects, but which shall exclude a complete diffuse reflecting, as would be obtained from a random pigment particle arrangement.

Figure 1A:
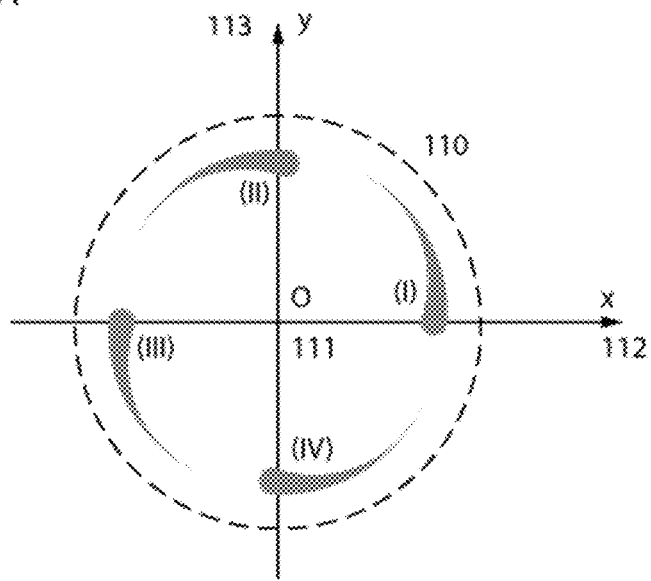
FIG. 1A-B schematically illustrates the visual appearance of an optical effect layer (OEL) (110) exhibiting a circularly moving comet-shaped spot according to the present invention, wherein said OEL as seen under orthogonal view when said OEL is sequentially illuminated from each of the four cardinal points (N, E, S and W) with four illumination sources as illustrated in FIG. 1B.
Figure 1B:
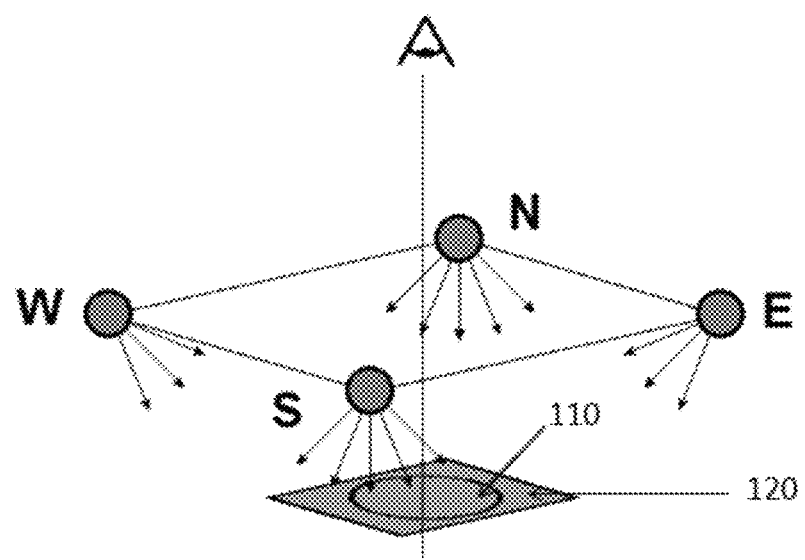

FIG. 1A schematically illustrates the visual appearance of an optical effect layer (OEL) (110) according to the present invention and providing a visual impression of at least one circularly moving comet-shaped spot rotating upon tilting said OEL, with origin 0 (111) and in-plane axes x and y (112, 113), as seen under orthogonal viewing conditions when said OEL is sequentially illuminated from each of the four cardinal points (N, E, S and W, where the y axis points to the north, and the x axis points to the east) with four illumination sources. A spot or a comet-shaped or otherwise shaped figure (I), (II), (III), (IV) (a comet-shaped spot), is apparently rotating around the origin (111) depending on the illumination direction. FIG. 1B illustrates the illumination and viewing conditions of FIG. 1A. The OEL is illuminated with a single light source at a time, and the shaped figure appears at position (I) when illuminated from N-direction, at position (II) when illuminated from W-direction, at position (III) when illuminated from S-direction, and at position (IV) when illuminated from E-direction.

Figure 2A:
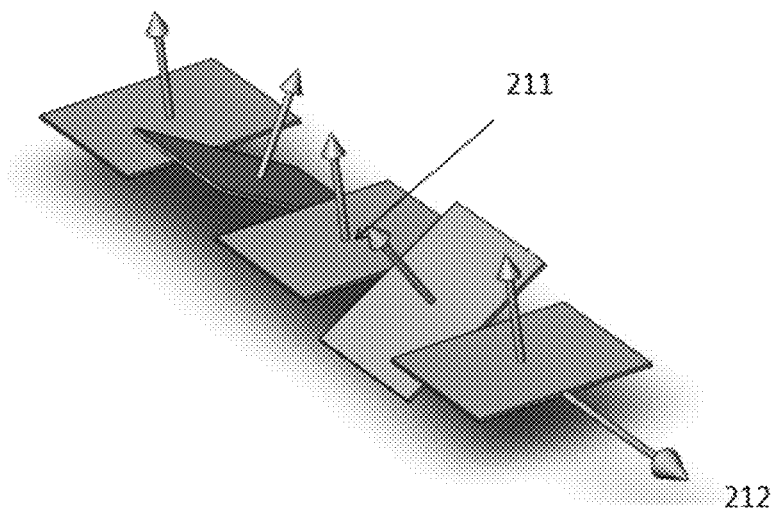
FIG. 2A schematically illustrates a particle orientation pattern according to the present invention, along a selected diameter (212) in the (x, y)-plane of the OEL and emanating from its origin (211).

Throughout the present description, the term "orientation pattern" refers to a two-dimensional set of local pigment particle orientations, which can be reproducibly produced in the coating layer (x10). The orientation pattern of the non-spherical oblate magnetic or magnetizable pigment particles in the OEL according to the present invention is circularly symmetric with respect to an axis of rotation orthogonal to the plane of the OEL (x10). The intersection point of said axis of rotation with the OEL (x10) is called the origin (x11) of the OEL. FIG. 2A schematically illustrates a particle orientation pattern of the non-spherical oblate magnetic or magnetizable pigment particles in the OEL according to the present invention, along a selected diameter (212) in the (x, y)-plane of said OEL and emanating from its origin (211). The varying lateral inclination of the non-spherical oblate magnetic or magnetizable pigment particle surface along a selected diameter (x12, 212 in FIG. 2A-B) in the plane of the OEL is a characterizing feature of the OEL of the present invention. As shown in FIG. 2A, the non-spherical oblate magnetic or magnetizable pigment particles orientation in the OEL is not only characterized by rotational symmetry around an origin (211) but also by a varying lateral inclination (i.e. rotation around the radial line) of the pigment particles along a selected diameter (212) in the plane of the OEL.

Figure 2B:
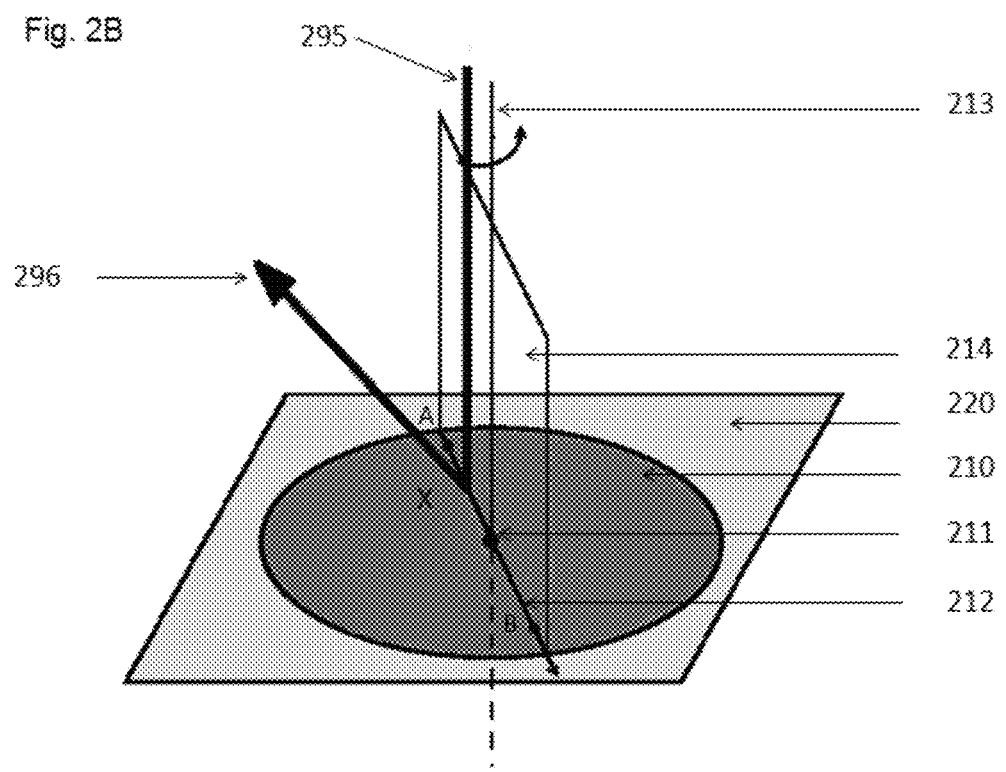
FIG. 2B gives a schematic representation of the characteristic reflection properties of the oriented non-spherical oblate magnetic or magnetizable pigment particles of an OEL (210) on a substrate (220) according to the present invention, said orientation pattern being illustrated along a selected diameter (212) of the OEL.

FIG. 2B schematically illustrates an OEL (210) on a substrate (220), wherein said OEL comprises a radiation cured coating composition comprising non-spherical oblate magnetic or magnetizable pigment particles. The non-spherical oblate magnetic or magnetizable pigment particles are locally oriented according to an orientation pattern and fixed/frozen in the OEL, wherein said orientation pattern of the said pigment particles is circularly symmetric with respect to a rotation axis (213) orthogonal to the plane of the OEL (210) and intersecting it at an origin (211). The OEL according to the present invention is characterized in that a collimated light beam (295), orthogonally incident onto a point of incidence (X) outside the origin (211), is reflected in a direction (296) which is, for a plurality of points of incidence (X), substantially out of the plane of incidence (214) defined by the rotation axis (213) and said point of incidence (X).

Figure 2C:
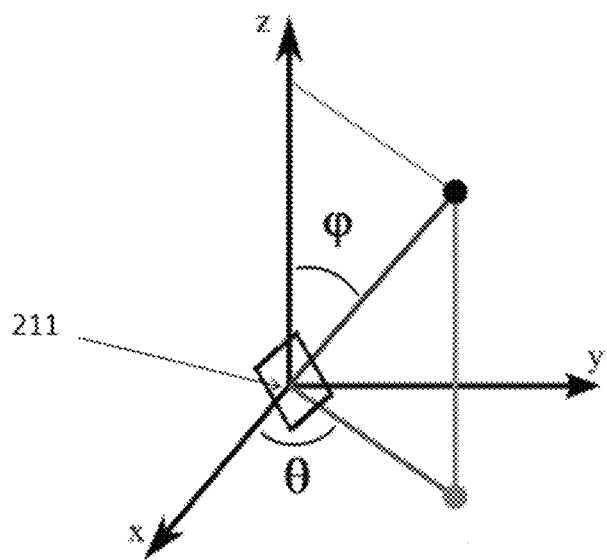
FIG. 2C schematically illustrates the coordinate system $(x, y, z, \varphi, \theta)$ used to describe position and orientation of the non-spherical oblate magnetic or magnetizable pigment particles comprised in the OEL of the present invention.
Figure 2D:
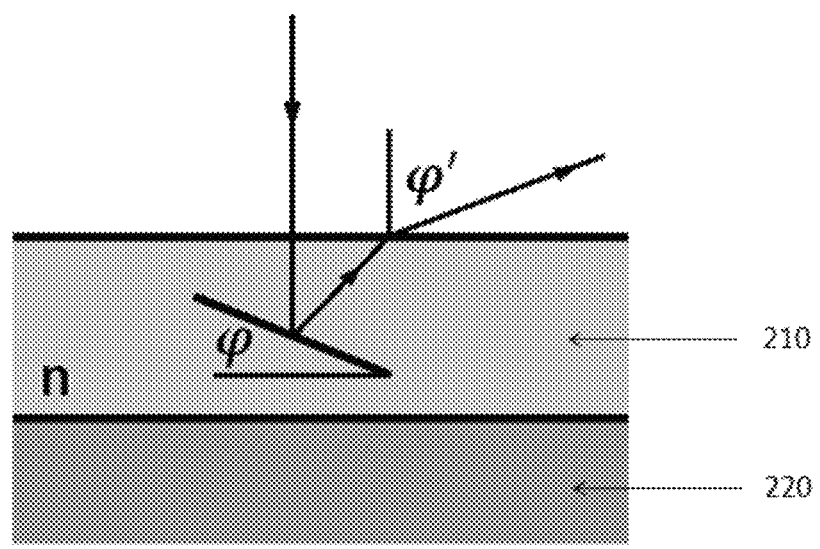
FIG. 2D describes the effect of the refractive index n of the coating composition onto the reflected beam exit angle $\varphi'$ at orthogonal incidence, wherein $\varphi$ is the particle's inclination angle with respect to the plane of the OEL.

FIG. 2C schematically illustrates the coordinate system (x, y, z, $\varphi$, $\theta$) used to describe position and orientation of the non-spherical oblate magnetic or magnetizable pigment particles comprised in the OEL of the present invention, wherein the linear position coordinates are given by (x, y, z); the OEL being in the (x, y)-plane, and the origin of the coordinate system coinciding with the OEL's origin (211). The x-axis coincides with the selected diameter along which the non-spherical oblate magnetic or magnetizable pigment particles orientation is measured. Points A and B on the x-axis (212) are two points on the OEL that mark the direction of the x-axis, point A being located at a coordinate $x_A < 0$ and point B being located on the opposite side of the axis of rotation (211), at a location $x_B > 0$. For clarity, A and B have been chosen such that $x_A$ and $x_B$ are located at approximately equal distances from the center of rotation (212). In FIG. 2C, the orientation of a non-spherical oblate magnetic or magnetizable pigment particle is defined by the direction ($\varphi$, $\theta$) of the vector orthogonal to the plane of the pigment particle (depicted by an arrow in FIG. 2A). The orientation of the non-spherical oblate magnetic or magnetizable pigment particles at any location along the x-axis is described following the mathematical convention for spherical coordinates ($\varphi$,$\theta$), where $\theta$ is the azimuthal angle of the pigment particle about the axis z measured from the direction of the x axis, and $\varphi$ is the inclination angle of the pigment particle measured between the vector orthogonal to the pigment surface and the z axis. Equivalently, this same inclination angle $\varphi$ can also be measured between the pigment surface plane and the plane of the OEL, as shown in FIG. 2D. According to these definitions, a particle with $\varphi=0$, is parallel to the OEL, and the azimuthal angle $\theta$ for this particle is undefined.

The index of refraction (n) of the coating composition layer has an influence on the apparent non-spherical oblate magnetic or magnetizable pigment particle's orientation. Throughout the present description, the following convention applies: whereas the coordinates ($\varphi$, $\theta$) refer to the orientation of the individual non-spherical oblate magnetic or magnetizable pigment particle, the coordinates ($\varphi'$, $\theta$) refer to the direction of the reflected beam under orthogonal incidence. Note that the angle $\theta$ is not affected by the refractive index of the coating composition layer under these conditions. FIG. 2D describes the effect of the refractive index n of the coating composition on the reflected beam exit angle $\varphi'$ at orthogonal incidence, wherein $\varphi$ is the non-spherical oblate magnetic or magnetizable pigment particle's inclination angle. The corresponding zenithal deflection angle $\varphi'$ represents the deviation of an orthogonal incident beam from the zenithal direction upon reflection and refraction by the OEL. The zenithal deflection angle is related at orthogonal incidence to the pigment particle inclination angle $\varphi$ through the equation: $\varphi'=\arcsin(n \times \sin(2\varphi))$, wherein n is the refractive index of the coating composition. Hence the measured zenithal deflection angle $\varphi'$ can be reduced to the particle angle $\varphi$ by applying the formula above. By extension, it is hereby defined that a particle lying at an inclination angle $\varphi$ can be characterized by its zenithal deflection angle $\varphi'$ in the OEL. Only the angle $\varphi$ is affected by refraction and mirror effect, the measured azimuth angle $\theta$ of the reflected beam in polar representation is the true azimuth angle of the inclined pigment particle. In order to characterize the OEL, the zenithal deflection angle $\varphi'$ of the particles and the azimuth angle $\theta$ of the particles are used as both can be measured unambiguously using a conoscopic scatterometer.

The non-spherical oblate magnetic or magnetizable pigment particles of the OEL described herein at least two, preferably four, distinct locations $x_i$ along any selected diameter of the OEL have an average zenithal deflection angle $\varphi'$ at location $x_i$ and an average azimuth angle $\theta$ with respect to the selected diameter at the same location x, that satisfy the condition $|\varphi' \sin(\theta)| \geq 10°$, preferably $|\varphi' \sin(\theta)| \geq 15°$ such that incident light at point x, is reflected at an angle equal to or greater than 10°, equal to or greater than 15° respectively, away from the normal plane of incidence (x14, see 214 in FIG. 2B) along said diameter. The expression "average angle" refers to the average value for the plural non-spherical oblate magnetic or magnetizable pigment particles at location $x_i$. The expression "location $x_i$" should be understood as a localized approximately circular area having a diameter of about 1 mm.

The condition $|\varphi' \sin(\theta)| \geq 10°$, represents all the orientations that reflect normal incident light more than or equal to 10° away from the plane of incidence (x14), which is representative by the shaded areas in FIG. 14A, The condition $|\varphi' \sin(\theta)| \geq 15°$, represents all the orientations that reflect normal incident light more than or equal to 15° away from the plane of incidence (x14), which is representative by the shaded areas in FIG. 14B.

A conoscopic scatterometer (obtained from Eckhartd Optics LLC, 5430 Jefferson Ct, White Bear Lake, Minn.

55110; http://eckop.com) was used for characterizing the orientation pattern of the oriented pigment particles of the OELs disclosed herein.

Figure 4A:
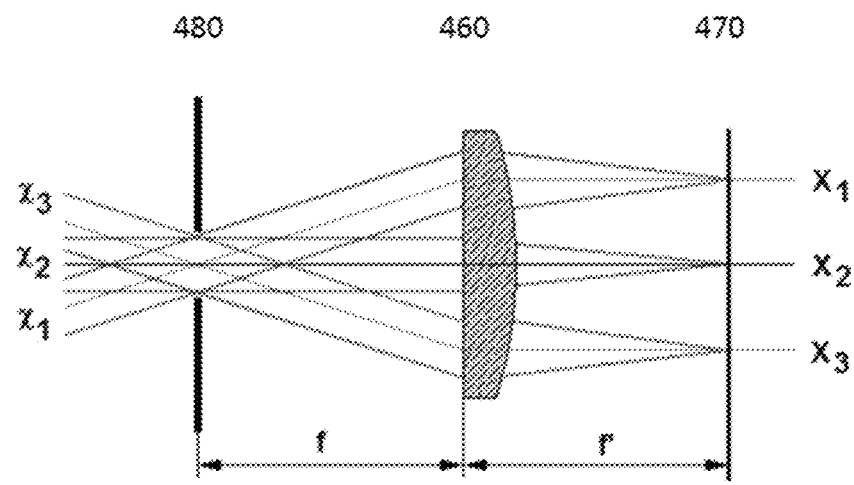
FIG. 4A schematically illustrates the working principles of conoscopic scatterometry used to measure the reflected beam directions in the OELs shown therein.
Figure 4B:
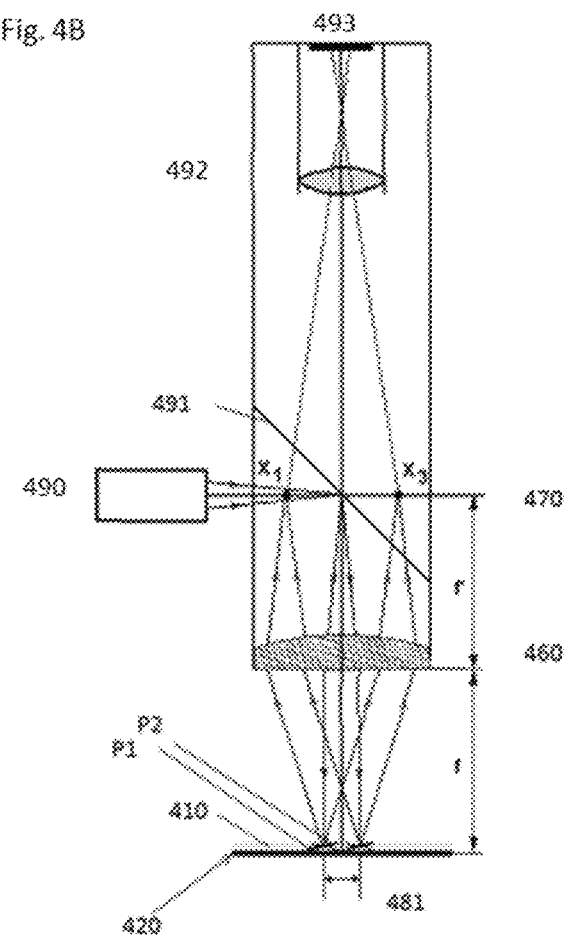
FIG. 4B schematically illustrates a complete reflection conoscopic scatterometer setup, as used for determining the orientation of pigment particles in the OEL.

FIG. 4A schematically shows the principles of conoscopic scatterometry, which relies on focal plane to focal plane (470 to 480), wherein (480) is the front focal plane of the lens, which is located at a distance f from the lens; (470) is the back focal plane of the lens, which is located at a distance f' from the lens) transform imaging (i.e. Fourier-transform imaging) by a lens or a lens system, mapping incoming ray directions ($\chi_1$, $\chi_2$, $\chi_3$) in the front focal plane f of the lens into spots ($x_1$, $x_2$, $x_3$) in the back focal plane f' of the lens. FIG. 4B schematically illustrates a complete back-reflection conoscopic scatterometer setup, comprising a front-end optics (460) performing said focal plane to focal plane transform imaging, a light source (490) and a semi-transparent coupling mirror (491) for illuminating, through the optics, a small spot on the OEL (410) on the substrate (420) with a beam (481) of parallel light under orthogonal incidence, and a back-end optics (492) comprising a camera sensor (493) for recording an image of the spot pattern present in the back focal plane (470) of the front end optics. Two different non-spherical oblate magnetic or magnetizable pigment particle orientations (P1, P2) are shown to reflect back the orthogonally incident beam into two different ray directions, which are focused by the front-end optics into two separate spots $x_1$ and $x_3$ in its back focal plane (470). The image locations of these spots are recorded by the back-end optics (492) and the camera sensor (493). In the images obtained by shining light at a point the pixel intensity on the sensor corresponding to angles ($\varphi'$, $\theta$) is proportional to the number of non-spherical oblate magnetic or magnetizable pigment particles oriented at said angles at point $x_i$ on the OEL and the image represents the angular distribution of non-spherical oblate magnetic or magnetizable pigment particle orientations at location $x_i$ on the OEL.

For measuring its reflection characteristics, the OEL comprising the oriented non-spherical oblate magnetic or magnetizable pigment particles was assessed from point A to point B every 0.5 mm along a selected diameter of the OEL (taken as the x-axis) going through its origin 0 (x11), using a 1 mm diameter beam of parallel light (LED, 520 nm) under orthogonal incidence, and an image of the back-reflected light was taken at each point. From these images, the corresponding zenithal deflection and azimuthal angles ($\varphi'$, $\theta$) of the back-reflected light spot were obtained by applying a 2-dimensional Gaussian distribution fit to the image data collected at the back focal plane of the conoscopic scatterometer; the ($\varphi'$, $\theta$) values corresponding to the center of the Gaussian distribution.

FIGS. 3C, 3F, 5C, 6C, 7C, 8C, 9D, 10D and 11D show the results of the characterizing measurements with the conoscopic scatterometer described herein and depicted in FIG. 4A-B. In particular, FIGS. 3C, 3F, 5C, 6C, 7C, 8C, 9D, 10D and 11D gives, in ($\varphi'$, $\theta$) graphical representation, the measured light reflection directions which are related to the non-spherical oblate magnetic or magnetizable pigment particle orientations, at several locations x, along a selected diameter through the origin of the OEL obtained with the spinning magnet assembly depicted in the respective figure. The supporting points of the curves correspond to the sampled positions along said selected diameter through the origin of the circularly symmetric OEL. The data were measured under vertical incidence and using a 520 nm LED sampling beam of 1 mm diameter on a conoscopic scatterometer, as further explained herebelow, by sampling a point every 0.5 mm along said selected diameter through the origin of the OEL, which was taken as being the x-axis direction (corresponding to the 180° to 0° direction in the Figures). The measurement results in FIGS. 3C, 3F, 5C, 6C, 7C, 8C, 9D, 10D, 11D and 15D are the center of the distribution of measured angles ($\varphi'$, $\theta$) of exiting beams under orthogonal incidence.

Figure 3A:
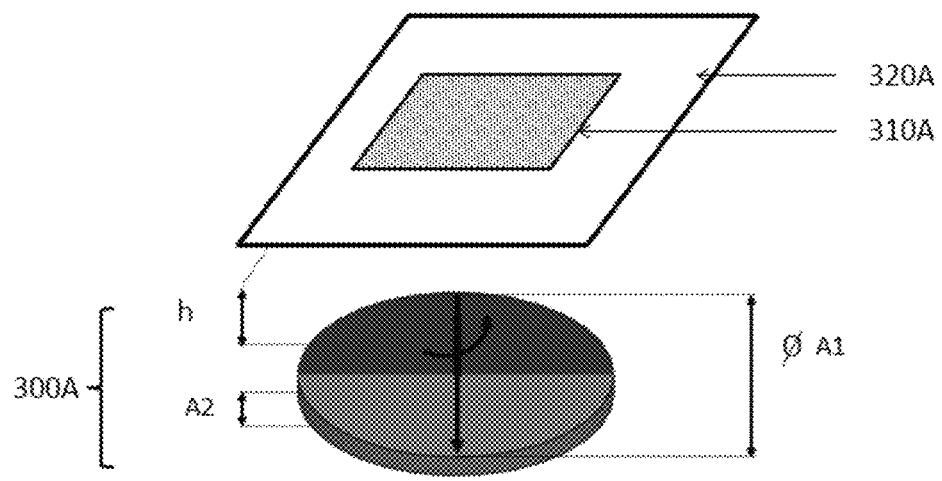
FIG. 3A schematically illustrates a spinneable magnet assembly of the prior art for producing a dome-type OEL.
Figure 3B:
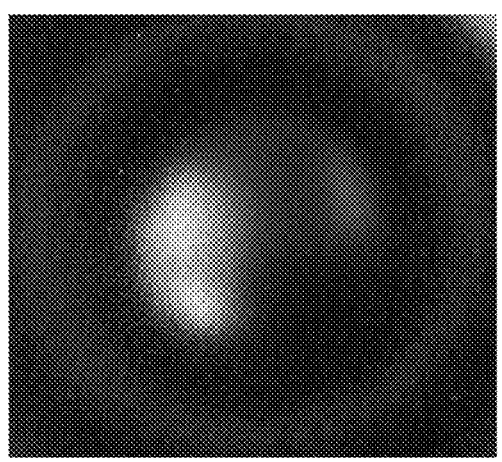
FIG. 3B shows a circularly symmetric OEL exhibiting a dome-type effect obtained with the spinning magnet assembly depicted in FIG. 3A according to the prior art.
Figure 3C:
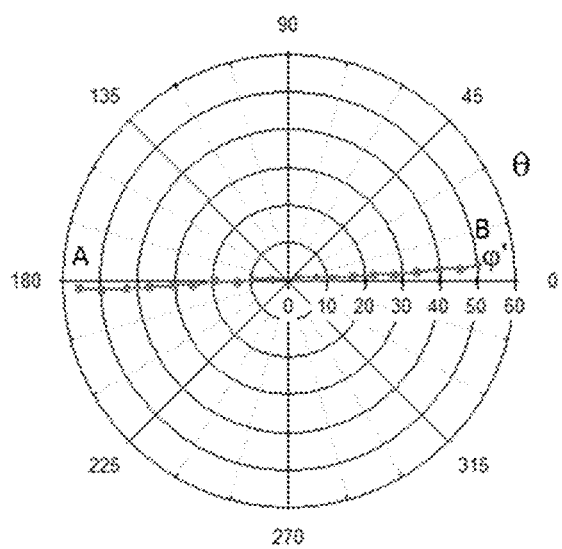
FIG. 3C gives, in ($\varphi'$,$\theta$) graphical representation, the measured particle orientation at several locations $x_i$ along a selected diameter through the origin of the OEL obtained with the spinning magnet assembly depicted in FIG. 3A.
Figure 3D:
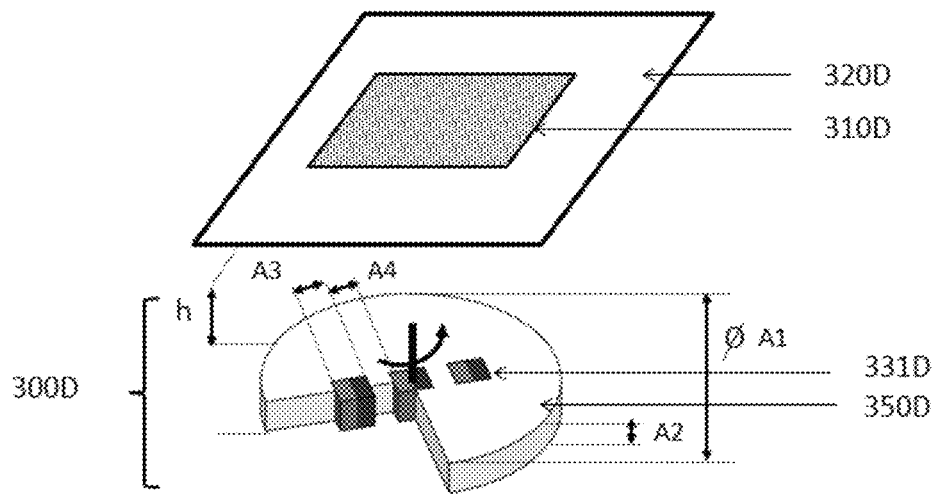
FIG. 3D schematically illustrates a spinneable magnet assembly of the prior art, for producing a ring-type OEL.
Figure 3E:
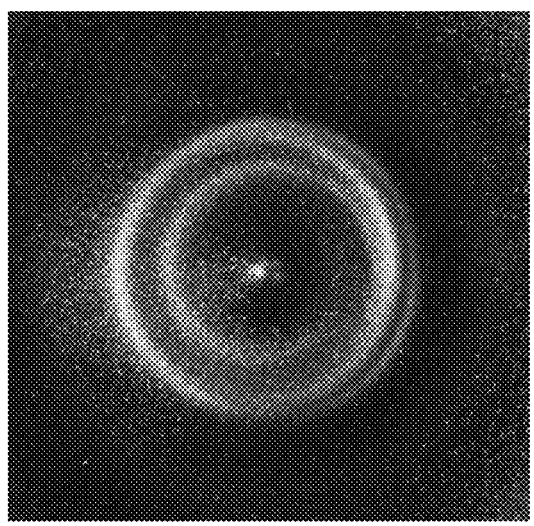
FIG. 3E shows a circularly symmetric OEL exhibiting a ring type effect obtained with the spinning magnet assembly depicted in FIG. 3D according to the prior art.

FIGS. 3A and 3D schematically illustrate spinneable magnet assemblies of the prior art whereas FIG. 5A1-11A1 and FIGS. 12-13 and 15 schematically illustrate spinneable magnet assemblies according to the present invention. FIG. 3A schematically illustrates a spinneable magnet assembly (300A) suitable for producing a dome-type OEL (see FIG. 3B), wherein said spinneable magnet (300A) has an axis of spinning (see arrow) substantially perpendicular to the substrate surface (320A) and is a disc-shaped dipole magnet, having a diameter (A1), a thickness (A2), and having its magnetic axis substantially parallel to its diameter and substantially parallel to the substrate (320A) surface. FIG. 3D schematically illustrates a spinneable magnet assembly (300D) suitable for producing a ring-type OEL (see FIG. 3E), wherein said spinneable magnet assembly (300D) has an axis of spinning (see arrow) substantially perpendicular to the substrate surface (320D) and comprises a centered arrangement of three collinear bar dipole magnets (331D) embedded in a supporting matrix (350D), having their North-South magnetic axis substantially perpendicular to the axis of spinning and substantially parallel to the substrate (320D) surface and having their magnetic axis pointing in the same direction. Circularly symmetric OELS according to the prior art are shown in FIG. 3A-F. The corresponding measured light reflection characteristics across a selected diameter through the origin of the dome-type OEL shown in FIG. 3B are given in FIG. 3C. For a dome-type OEL according to the prior art, the reflected beam direction, upon orthogonal incidence, is substantially confined within the plane defined by the OEL's rotation axis and the point of incidence of the orthogonal sampling beam; no substantial lateral deflection is present in FIG. 3C. The corresponding measured light reflection characteristics across a selected diameter through the origin of the ring-type OEL shown in FIG. 3E are given in FIG. 3F, wherein the reflected beam direction, upon orthogonal incidence, is substantially confined within the plane defined by the OEL's rotation axis and the point of incidence of the orthogonal sampling beam. The reflection is wiggling forth and back in said plane, without any substantial lateral-deflection.

The present invention provides as well a method for producing the optical effect layer (OEL) described herein on a substrate, and the optical effect layers (OELs) obtained therewith. wherein said methods comprise a step i) of applying on the substrate surface the radiation curable coating composition comprising non-spherical oblate magnetic or magnetizable pigment particles described herein, said radiation curable coating composition being in a first state, i.e. a liquid or pasty state, wherein the radiation curable coating composition is wet or soft enough, so that the non-spherical oblate magnetic or magnetizable pigment particles dispersed in the radiation curable coating composition are freely movable, rotatable and/or orientable upon exposure to the magnetic field.

The step i) described herein may be carried by a coating process such as for example roller and spray coating processes or by a printing process. Preferably, the step i) described herein is carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the radiation curable coating composition described herein on the substrate surface described herein (step i)), at least a part of the non-spherical oblate magnetic or magnetizable pigment particles are oriented (step ii)) by exposing the radiation curable coating composition to the magnetic field of the spinning magnetic assembly (x00) described herein, so as to align at least part of the non-spherical oblate magnetic or magnetizable pigment particles along the magnetic field lines generated by the spinning assembly.

Subsequently to or partially simultaneously with the step of orienting/aligning at least a part of the non-spherical oblate magnetic or magnetizable pigment particles by applying the magnetic field described herein, the orientation of the non-spherical oblate magnetic or magnetizable pigment particles is fixed or frozen. The radiation curable coating composition must thus noteworthy have a first state, i.e. a liquid or pasty state, wherein the radiation curable coating composition is wet or soft enough, so that the non-spherical oblate magnetic or magnetizable pigment particles dispersed in the radiation curable coating composition are freely movable, rotatable and/or orientable upon exposure to the magnetic field, and a second cured (e.g. solid) state, wherein the non-spherical oblate magnetic or magnetizable pigment particles are fixed or frozen in their respective positions and orientations.

Accordingly, the methods for producing an optical effect layer (OEL) on a substrate described herein comprises a step iii) of at least partially curing the radiation curable coating composition of step ii) to a second state so as to fix the non-spherical oblate magnetic or magnetizable pigment particles in their adopted positions and orientations. The step iii) of at least partially curing the radiation curable coating composition may be carried out subsequently to or partially simultaneously with the step of orienting/aligning at least a part of the non-spherical oblate magnetic or magnetizable pigment particles by applying the magnetic field described herein (step ii)). Preferably, the step iii) of at least partially curing the radiation curable coating composition is carried out partially simultaneously with the step of orienting/aligning at least a part of the non-spherical oblate magnetic or magnetizable pigment particles by applying the magnetic field described herein (step ii)). By "partially simultaneously", it is meant that both steps are partly performed simultaneously, i.e. the times of performing each of the steps partially overlap. In the context described herein, when curing is performed partially simultaneously with the orientation step ii), it must be understood that curing becomes effective after the orientation so that the pigment particles orient before the complete or partial curing or hardening of the OEL.

The so-obtained optical effect layers (OELs) provide a viewer with the impression of at least one circularly moving spot or at least one moving comet-shaped spot rotating around the origin of said OEL upon tilting around the substrate comprising the optical effect layer.

The first and second states of the radiation curable coating composition are provided by using a certain type of radiation curable coating composition. For example, the components of the radiation curable coating composition other than the non-spherical oblate magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical oblate magnetic or magnetizable pigment particles are fixed in their current positions and orientations and can no longer move nor rotate within the binder material.

As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the radiation curable coating composition described herein is typically chosen among those known in the art and depends on the coating or printing process used to apply the radiation curable coating composition and the chosen radiation curing process.

In the optical effect layers (OELs) described herein, the non-spherical oblate magnetic or magnetizable pigment particles described herein are dispersed in the hardened radiation curable coating composition comprising a cured binder material that fixes/freezes the orientation of the magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles contained in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength (s) concerned. This can be determined for example by measuring the transmittance of a test piece of the cured binder material (not including the non-spherical oblate magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. The infrared, visible and UV portions of the electromagnetic spectrum approximately correspond to the wavelength ranges between 700-2500 nm, 400-700 nm, and 200-400 nm respectively.

As mentioned hereabove, the radiation curable coating composition described herein depends on the coating or printing process used to apply said radiation curable coating composition and the chosen curing process. Preferably, curing of the radiation curable coating composition involves a chemical reaction which is not reversed by a simple temperature increase (e.g. up to 80° C.) that may occur during a typical use of an article comprising the OEL described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step iii)) is carried out by radiation curing including UV-visible light radiation curing or by E-beam radiation curing, more preferably by UV-Vis light radiation curing.

Therefore, suitable radiation curable coating compositions for the present invention include radiation curable compositions that may be cured by UV-visible light radiation (hereafter referred as UV-Vis light radiation) or by E-beam radiation (hereafter referred as EB radiation). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the radiation curable coating composition described herein is a UV-Vis radiation curable coating composition. Therefore, a radiation curable coating composition comprising non-spherical oblate magnetic or magnetizable pigment particles described herein is preferably at least partially cured by UV-Vis light radiation, preferably by narrow-bandwidth LED light in the UV-A (315-400 nm) or blue (400-500 nm) spectral region, most preferable by a high-power LED source emitting in the 350 nm to 450 nm spectral region, with a typical emission bandwidth in the 20 nm to 50 nm range. UV radiation from mercury vapor lamps or doped mercury lamps can also be used to increase the curing rate of the radiation curable coating composition.

Preferably, the UV-Vis radiation curable coating composition comprises one or more compounds selected from the group consisting of radically curable compounds and cationically curable compounds. The UV-Vis radiation curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The radiation curable coating composition described herein may further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication.

The radiation curable coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the shelf life (polymerization inhibitors), the gloss etc. Additives described herein may be present in the radiation curable coating composition in amounts and in forms known in the art, including so-called nano-materials where at least one of the dimensions of the additive is in the range of 1 to 1000 nm.

The radiation curable coating composition described herein comprises the non-spherical oblate magnetic or magnetizable pigment particles described herein. Preferably, the non-spherical oblate magnetic or magnetizable pigment particles are present in an amount from about 2 wt-% to about 40 wt-%, more preferably about 4 wt-% to about 30 wt-%, the weight percents being based on the total weight of the radiation curable coating composition comprising the binder material, the non-spherical oblate magnetic or magnetizable pigment particles and other optional components of the radiation curable coating composition.

Non-spherical oblate magnetic or magnetizable pigment particles described herein are defined as having, due to their non-spherical oblate shape, non-isotropic reflectivity with respect to an incident electromagnetic radiation for which the cured or hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical oblate magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, said conventional pigment particles displaying the same color for all viewing angles, whereas the magnetic or magnetizable pigment particles described herein exhibit non-isotropic reflectivity as described hereabove.

The non-spherical oblate magnetic or magnetizable pigment particles described herein are preferably platelet-shaped magnetic or magnetizable pigment particles.

Suitable examples of non-spherical oblate magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical oblate magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), silicon oxide (SiO), silicon dioxide ($SiO_2$), titanium oxide ($TiO_2$), zinc sulphide (ZnS) and aluminum oxide ($Al_2O_3$), more preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/A/M/A multilayer structures, B/NM/B multilayer structures, B/NM/B/A/ multilayer structures, wherein the layers A, the magnetic layers M and the layers B are chosen from those described hereabove.

At least part of the non-spherical oblate magnetic or magnetizable pigment particles described herein may be constituted by non-spherical oblate optically variable magnetic or magnetizable pigment particles and/or non-spherical oblate magnetic or magnetizable pigment particles having no optically variable properties. Preferably, at least a part of the non-spherical oblate magnetic or magnetizable pigment particles described herein is constituted by non-spherical oblate optically variable magnetic or magnetizable pigment particles. In addition to the overt security provided by the colorshifting property of non-spherical oblate optically variable magnetic or magnetizable pigment particles, which allows easily detecting, recognizing and/or discriminating an article or security document carrying an ink, radiation curable coating composition, coating or layer comprising the non-spherical oblate optically variable magnetic or magnetizable pigment particles described herein from their possible counterfeits using the unaided human senses, the optical properties of the platelet-shaped optically variable magnetic or magnetizable pigment particles may also be used as a machine readable tool for the recognition of the OEL. Thus, the optical properties of the non-spherical oblate optically variable magnetic or magnetizable pigment particles may simultaneously be used as a covert or semi-covert security feature in an authentication process wherein the optical (e.g. spectral) properties of the pigment particles are analyzed. The use of non-spherical oblate optically variable magnetic or magnetizable pigment particles in radiation curable coating compositions for producing an OEL enhances the significance of the OEL as a security feature in security document applications, because such materials (i.e. non-spherical oblate optically variable magnetic or magnetizable pigment particles) are reserved to the security document printing industry and are not commercially available to the public.

Moreover, and due to their magnetic characteristics, the non-spherical oblate magnetic or magnetizable pigment particles described herein are machine readable, and therefore radiation curable coating compositions comprising those pigment particles may be detected for example with specific magnetic detectors. Radiation curable coating compositions comprising the non-spherical oblate magnetic or magnetizable pigment particles described herein may therefore be used as a covert or semi-covert security element (authentication tool) for security documents.

As mentioned above, preferably at least a part of the non-spherical oblate magnetic or magnetizable pigment particles is constituted by non-spherical oblate optically variable magnetic or magnetizable pigment particles. These can more preferably be selected from the group consisting of non-spherical oblate magnetic thin-film interference pigment particles, non-spherical oblate magnetic cholesteric liquid crystal pigment particles, non-spherical oblate interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/di-electric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), iron (Fe), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/M/Al/MgF_2/Cr$ multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by an established deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical oblate magnetic or magnetizable pigment particles described herein may be surface treated so at to protect them against any deterioration that may occur in the radiation curable coating composition and/or to facilitate their incorporation in the radiation curable coating composition; typically corrosion inhibitor materials and/or wetting agents may be used.

The substrate described herein is preferably selected from the group consisting of papers or other fibrous materials, such as cellulose, paper-containing materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents, etc. The substrate described herein may be provided under the form of a web (e.g. a continuous sheet of the materials described hereabove) or under the form of sheets. Should the OEL produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

Also described herein are spinneable magnetic assemblies (x00) and processing using spinning magnetic assemblies (x00) described herein for producing an OEL (x10) such as those described herein on the substrate (x20) described herein, said OEL comprising the non-spherical oblate magnetic or magnetizable pigment particles being oriented in the cured radiation curable coating composition such as described herein. The spinneable magnetic assemblies (x00) described herein allows the production of OELs (x10) providing an optical impression of at least one circularly moving spot or at least one circularly moving comet-shaped spot rotating upon tilting said OEL, wherein said spinneable magnetic assemblies (x00) are spun for orienting the non-spherical oblate magnetic or magnetizable pigment particles so as to produce the OEL described herein. The spinneable magnetic assemblies (x00) described herein are based on the interaction of at least a) a first magnetic-field generating device (x30) and b) a second magnetic-field generating device (x40), which have mutually skew magnetic axes. Typically, the spinneable magnetic assemblies (x00) described herein are fixed on a support having an axis of spinning which is oriented such as to be substantially orthogonal to the plane of the OEL upon spinning of the assembly (x00), and wherein the magnetic axis of said first and of said second magnets are skew with respect to each other.

The spinneable magnetic assembly (x00) comprises the first magnetic-field generating device (x30) described herein and the second magnetic-field generating device (x40) described herein, wherein said first and second magnetic-field generating devices described herein are able to concomitantly spin together. The axis of spinning of the spinneable magnetic assembly (x00) described herein is substantially perpendicular to the OEL and to the substrate (x20) surface. The axis of spinning of the spinneable magnetic assembly (x00) described herein corresponds to the center of the circular symmetry orientation pattern of the OEL described herein. During operation, the magnetic assembly (x00) is spinning at a required frequency. In an embodiment of the magnetic assembly (x00) and the methods described herein, a central axis of spinning of the magnetic assembly (x00) passes orthogonally through a part of the substrate over the course of exposure.

Preferably, the spinneable magnetic assembly (x00) described herein comprises an electric motor for concomitantly spinning the first magnetic-field generating device (x30) described herein and the second magnetic-field generating device (x40) described herein. Preferred electric motors are disclosed in WO 2016/026896 A1.

The magnetic axis of the first (x30) and second (x40) magnetic field generating devices are both substantially perpendicular to the axis of spinning, i.e. substantially parallel to the plane of the OEL (substantially parallel to the substrate (x20) surface). The first magnetic-field generating device (x30) and the second magnetic-field generating device (x40) described herein are stacked and the magnetic axis of said first and the magnetic axis of said second devices are arranged in such a way that, when projected along the axis of spinning onto a plane perpendicular to the axis of spinning, i.e. substantially parallel to the plane of the OEL/substrate (x20) surface, their projections span up an angle ($\Omega$) which is between about 15° and about 175° or between about −15° and about −175°, preferably between about 15° and about 165° or between about −15° and about −165°. Preferably, the first magnetic-field generating device (x30) of the spinneable magnetic assembly (x00) described herein has its center of mass on the axis of spinning and the second magnetic-field generating device (x40) has its center of mass on the axis of spinning.

The first magnetic-field generating device (x30) and the second magnetic-field generating device (x40) of the spinneable magnetic assemblies (x00) described may independently be single-piece magnets or combinations of more than one magnet (i.e. combinations of two, three, etc. magnets). The spinneable magnetic assemblies (x00) described herein may further comprise one or more supporting matrixes (x50) for holding the component(s) of the first magnetic-field generating device (x30) described herein and/or for holding the component(s) of second magnetic-field generating device (x40) together.

The first magnetic-field generating device (x30) and the second magnetic-field generating device (x40) of the spinneable magnetic assemblies (x00) described herein may have any geometric form or shape, such as rectangular, cylindrical, spherical or any complex shape. Preferably, the first magnetic-field generating device (x30) and the second magnetic-field generating device (x40) of the spinneable magnetic assemblies (x00) described herein are independently selected from the group consisting of bar magnets (cubes or cuboids), disc-shaped magnets (discs or cylinders) the ring-shaped magnets (rings or hollow-cylinders) and combinations thereof.

When more than two, i.e. three, four, etc. of the two more or more bar dipole magnets of the first magnetic-field generating device (x30) described herein are used, said more than two more bar dipole magnets are preferably placed in a collinear arrangement.

Particularly preferred assemblies are spinneable magnetic assemblies (x00) comprising:
a) a first magnetic-field generating device (x30) comprising
i) a bar dipole magnet having its North-South magnetic axis substantially perpendicular to the axis of spinning (i.e. substantially parallel to the substrate (x20) surface), ii) two or more bar dipole magnets, each of said two or more bar dipole magnets having its North-South magnetic axis substantially perpendicular to the axis of spinning (i.e. substantially parallel to the substrate (x20) surface) and all of said two or more bar dipole magnets having a same magnetic field direction, iii) a loop-shaped, preferably a ring-shaped, dipole magnet having its North-South magnetic axis substantially perpendicular to the axis of spinning (i.e. substantially parallel to the substrate (x20) surface), iv) a disc-shaped dipole magnet being nested inside a loop-shaped, preferably a ring-shaped, dipole magnet, each of the disc-shaped dipole magnet and the loop-shaped, preferably the ring-shaped, dipole magnet having its North-South magnetic axis substantially perpendicular to the axis of spinning (i.e. substantially parallel to the substrate (x20) surface) and all of the disc-shaped dipole magnet and the loop-shaped, preferably the ring-shaped, dipole magnet having a same magnetic field direction, or v) two or more nested loop-shaped, preferably two or more nested ring-shaped, dipole magnets, each of said two or more nested loop-shaped, preferably two or more nested ring-shaped, dipole magnets having its North-South magnetic axis substantially perpendicular to the axis of spinning (i.e. substantially parallel to the substrate (x20) surface) and all of said two or more nested loop-shaped, preferably two or more nested ring-shaped, dipole magnets having a same magnetic field direction; and b) a second magnetic-field generating device (x40) being i) a disc-shaped dipole magnet having its North-South magnetic axis substantially perpendicular to the axis of spinning (i.e. substantially parallel to the substrate (x20) surface), ii) a loop-shaped, preferably a ring-shaped, dipole magnet having its North-South magnetic axis substantially perpendicular to the axis of spinning (i.e. substantially parallel to the substrate (x20) surface), or iii) a bar dipole magnet, having its North-South magnetic axis substantially perpendicular to the axis of spinning (i.e. substantially parallel to the substrate (x20) surface). As shown in FIGS. 5A1 and 6A1, the first magnetic-field generating device (x30) may be placed on top of the second magnetic-field generating device (x40) (see FIG. 5A1), or alternatively the second magnetic-field generating device (x40) may be placed on top of the first magnetic-field generating device (x30) (see FIG. 6A1).

As shown in FIG. 5A1-12A1, the first magnetic-field generating device (x30) and the second magnetic-field generating device (x40) are arranged in such a way that the projection of the magnetic axis of the first magnetic-field generating device (x30) along the axis of spinning onto a plane perpendicular to the axis of spinning form an angle ($\Omega$) having a value between about 5° and about 175° or between about −5° and about −175°, preferably between about 15° and about 165° or in between about −15° and about −165°, with the projection of the magnetic axis of the second magnetic-field generating device (x30) along the axis of spinning within the same plane.

The spinneable magnetic assembly (x00) described herein comprise the first magnetic-field generating device (x30) and the second magnetic-field generating device (x40), wherein said first magnetic-field generating device (x30) and/or said second magnetic-field generating device (x40) may further comprise one or more supporting matrixes (x50) for holding the component(s) of the first magnetic-field generating device (x30) described herein and/or for holding the component(s) of second magnetic-field generating device (x40) together.

The one or more supporting matrixes (x50) described herein are independently made of one or more non-magnetic materials. The non-magnetic materials are preferably selected from the group consisting of low conducting materials, non-conducting materials and mixtures thereof, such as for example engineering plastics and polymers, aluminum, aluminum alloys, titanium, titanium alloys and austenitic steels (i.e. non-magnetic steels). Engineering plastics and polymers include without limitation polyaryletherketones (PAEK) and its derivatives polyetheretherketones (PEEK), poletherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS.

The one or more supporting matrixes (x50) described herein independently comprise one or more recesses, voids, indentations and/or spaces for holding the component(s) of the first magnetic-field generating device (x30) described herein and/or for holding the component(s) of the second magnetic-field generating device (x40).

According to one embodiment and as shown in FIG. 9A1, the first magnetic-field generating device (x30) is a bar dipole magnet (x31) having its North-South magnetic axis substantially perpendicular to the axis of spinning (i.e. substantially parallel to the substrate (x20) surface). The bar dipole magnet of the first magnetic-field generating device (x30) is preferably at least partially or fully embedded in the supporting matrix (x50) described herein.

According to another embodiment and as shown in FIGS. 10A1 and 15A1, the first magnetic-field generating device (x30) consists of two or more bar dipole magnets, each of said two or more bar dipole magnets having its North-South magnetic axis substantially perpendicular to the axis of spinning (i.e. substantially parallel to the substrate (x20) surface) and all of said two or more bar dipole magnets having a same magnetic field direction. The two or more bar dipole magnets of the first magnetic-field generating device (x30) are preferably at least partially or fully embedded in the supporting matrix (x50) described herein. According to one embodiment shown in FIG. 10A1, wherein the two or more bar dipole magnets of the first magnetic-field generating device (x30) are at least partially or fully embedded in the supporting matrix (x50) described herein, the two or more magnets having their magnetic axis pointing in the same direction may have their magnetic axis substantially parallel to the symmetry axis of the supporting matrix (x50), in particular substantially parallel to the diameter of the supporting matrix (x50) being a disc-shaped supporting matrix (x50), or, and as shown in FIG. 15A1, the two or more magnets having their magnetic axis pointing in the same direction may have their magnetic axis tilted by a specific angle to the symmetry axis of the supporting matrix (x50), in particular substantially tilted to the diameter of the supporting matrix (x50).

According to another embodiment and as shown in FIG. 5A1-8A1, the first magnetic-field generating device (x30) is a ring-shaped dipole magnet having its North-South magnetic axis substantially perpendicular to the axis of spinning (i.e. substantially parallel to the substrate (x20) surface). The ring-shaped dipole magnet of the first magnetic-field generating device (x30) may be at least partially or fully embedded in the supporting matrix (x50) described herein.

Figure 12:
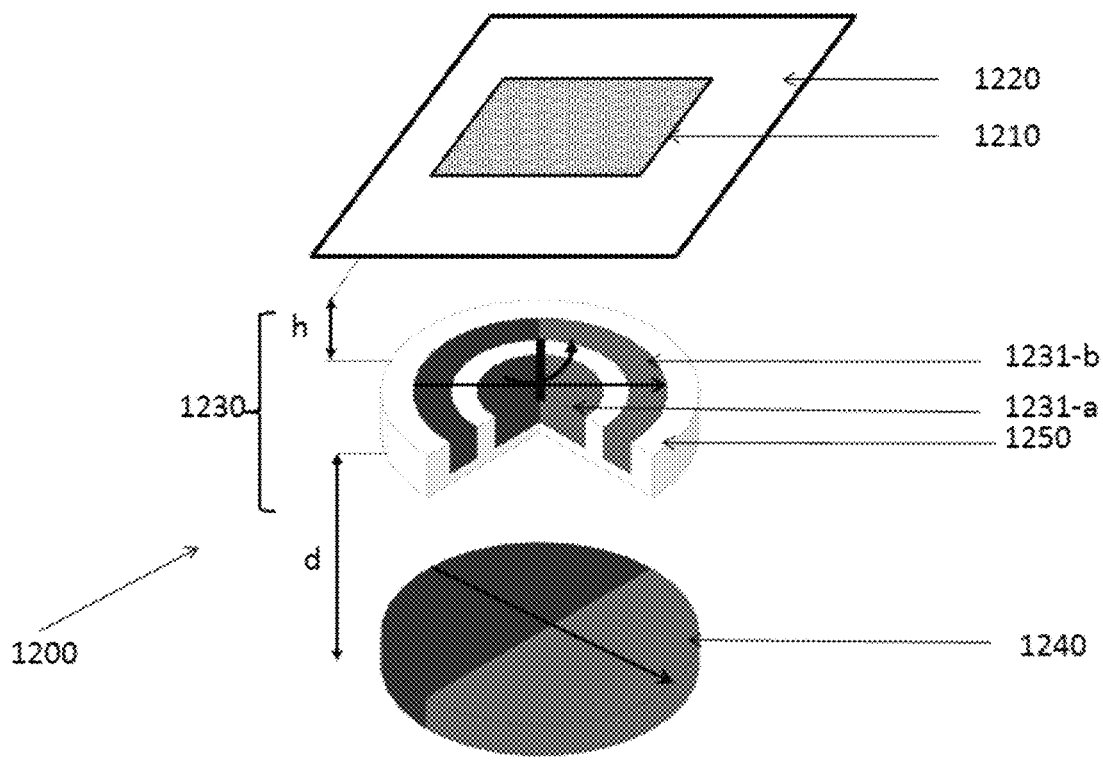
FIG. 12 schematically illustrates a spinneable magnetic assembly (1200) for producing an optical effect layer (OEL) (1210) on a substrate (1220) surface, wherein said spinneable magnetic assembly (1200) has a an axis of spinning (arrow) which upon use to produce the OEL is substantially perpendicular to the substrate (1220) surface, wherein the spinneable magnetic assembly comprises a first magnetic-field generating device (1230) comprising a disc-shaped dipole magnet (1231-a) being diametrically magnetized and being nested (i.e. concentrically disposed) inside a ring-shaped dipole magnet (1231-b) being diametrically magnetized, each of said magnets (1231-a, 1231-b) having its North-South magnetic axis substantially perpendicular to the axis of spinning and substantially parallel to the substrate (1220) surface and all of said magnets (1231-a, 1231-b) pointing in the same direction and being embedded in a supporting matrix (1250) and a second magnetic-field generating device (1240) being a disc-shaped dipole magnet having its North-South magnetic axis substantially perpendicular to the axis of spinning and substantially parallel to the substrate (1220) surface and being diametrically magnetized, wherein the first magnetic-field generating device (1230) is coaxially placed on top of the second magnetic-field generating device (1240) and wherein the projections of the magnetic axis of disc-shaped dipole magnet (1231-a)

According to another embodiment and as shown in FIG. 12, the first magnetic-field generating device (x30) comprises a disc-shaped dipole magnet (x31-a) being nested inside a ring-shaped dipole magnet (x10-b), each of the disc-shaped dipole magnet and the ring-shaped dipole magnet having their North-South magnetic axis substantially perpendicular to the axis of spinning (i.e. substantially parallel to the substrate (x20) surface) and having a same magnetic field direction. The disc-shaped dipole magnet (x31-a) and the ring-shaped dipole magnet (x31-b) of the first magnetic-field generating device (x30) may be at least partially or fully embedded in the supporting matrix (x50) described herein.

According to another embodiment and as shown in FIG. 13, the first magnetic-field generating device (x30) comprises two or more nested ring-shaped dipole magnets (x31-a, x31-b), each of said two or more nested ring-shaped dipole magnets having its North-South magnetic axis substantially perpendicular to the axis of spinning (i.e. substantially parallel to the substrate (x20) surface) and all of said two or more nested ring-shaped dipole magnets (x31-a, x31-b) having a same magnetic field direction. The two or more nested ring-shaped dipole magnets (x31-a, x31-b) of the first magnetic-field generating device (x30) may be at least partially or fully embedded in the supporting matrix (x50) described herein.

In addition to the first magnetic-field generating device (x30) described herein, the spinneable magnetic assembly (x00) described herein comprises the second magnetic-field generating device (x40) described herein, said second magnetic-field generating device (x40) may be i) a disc-shaped dipole magnet having its North-South magnetic axis substantially perpendicular to the axis of spinning (i.e. substantially parallel to the substrate (x20) surface), ii) a loop-shaped, preferably a ring-shaped, dipole magnet having its North-South magnetic axis substantially perpendicular to the axis of spinning (i.e. substantially parallel to the substrate (x20) surface), or iii) a bar dipole magnet having its North-South magnetic axis substantially perpendicular to the axis of spinning (i.e. substantially parallel to the substrate (x20) surface).

According to one embodiment and as shown in FIGS. 5A1, 6A1, 9A1, 10A1, 11A1, 12,13 and 15, the second magnetic-field generating device (x40) is a disc-shaped dipole magnet having its North-South magnetic axis substantially perpendicular to the axis of spinning (i.e. substantially parallel to the substrate (x20) surface). The disc-shaped dipole magnet of the second magnetic-field generating device (x40) may be at least partially or fully embedded in the supporting matrix (x50) described herein.

According to another embodiment and as shown in FIGS. 7A1 and 8A1, the second magnetic-field generating device (x40) is a ring-shaped dipole magnet having its North-South magnetic axis substantially perpendicular to the axis of spinning (i.e. substantially parallel to the substrate (x20) surface). The ring-shaped dipole magnet of the second magnetic-field generating device (x40) may be at least partially or fully embedded in the supporting matrix (x50) described herein.

According to another embodiment, the second magnetic-field generating device (x40) is a bar dipole magnet, having its North-South magnetic axis substantially perpendicular to the axis of spinning (i.e. substantially parallel to the substrate (x20) surface). The bar dipole magnet of the second magnetic-field generating device (x40) may be at least partially or fully embedded in the supporting matrix (x50) described herein.

The bar dipole magnet(s) of the first magnetic-field generating device (x30), the loop-shaped, preferably the ring-shaped, dipole magnet(s) of the first magnetic-field generating device (x30), the disc-shaped dipole magnet of the second magnetic-field generating device (x40), the loop-shaped, preferably the ring-shaped, dipole magnet of the second magnetic-field generating device (x40) and the bar dipole magnet of the second magnetic-field generating device (x40) are preferably independently made of high-coercivity materials (also referred as strong magnetic materials). Suitable high-coercivity materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_2O_4$ (e.g. as cobalt ferrite ($CoFe_2O_4$) or magnetite ($Fe_3O_4$)), wherein M is a bivalent metal ion), ceramic 8 (SI-1-5); rare earth magnetic materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the magnet bars are selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

The distance (d) between the first magnetic-field generating device (x30) described herein and the second magnetic-field generating device (x40) described herein is preferably between about 0 and about 10 mm, more preferably between about 0 mm and about 5 mm and still more preferably 0.

The distance (h) between the upmost surface of the first magnetic-field generating device (x30) or the second magnetic-field generating device (x40) described herein and the lower surface of the substrate (x20) facing either the first magnetic-field generating device (x30) or the second magnetic-field generating device (x40) is preferably between about 0.5 mm and about 10 mm, more preferably between about 0.5 mm and about 7 mm and still more preferably between about 1 mm and 7 mm.

The materials of the bar dipole magnet(s) of the first magnetic-field generating device (x30), the loop-shaped, preferably the ring-shaped, dipole magnet(s) of the first magnetic-field generating device (x30), the disc-shaped dipole magnet of the second magnetic-field generating device (x40), the loop-shaped, preferably the ring-shaped, dipole magnet of the second magnetic-field generating device (x40) and the bar dipole magnet of the second magnetic-field generating device (x40) and the distances (d), (h) are selected such that the magnetic field resulting from the interaction of the magnetic field produced by the first and second magnetic-field generating devices (x30 and x40) of the spinning magnetic assembly (x00) is suitable for producing the optical effects layers described herein. The magnetic field produced by the first and second magnetic-field generating devices (x30 and x40) of the spinning magnetic assembly (x00) interacts so that the resulting magnetic field of the apparatus is able to orient non-spherical oblate magnetic or magnetizable pigment particles in an as yet uncured radiation curable coating composition on the substrate, which are disposed in the magnetic field of the apparatus to produce an optical impression of at least one circularly moving spot or at least one circularly moving comet-shaped spot rotating around the center of rotation upon tilting said OEL.

FIG. 5A1 illustrates an example of a spinneable magnetic assembly (500) suitable for producing optical effect layers (OELs) (510) comprising non-spherical oblate magnetic or magnetizable pigment particles on a substrate (520) according to the present invention. The spinneable magnetic assembly (500) comprises a first magnetic-field generating device (530) consisting of a ring-shaped dipole magnet and a second magnetic-field generating device (540) consisting of a disc-shaped dipole magnet.

The ring-shaped dipole magnet of the first magnetic-field generating device (530) has a magnetic axis substantially perpendicular to the axis of spinning (i.e. substantially parallel to the substrate (520) surface) and is diametrically magnetized. The disc-shaped dipole magnet of the second magnetic-field generating device (540) has a magnetic axis substantially perpendicular to the axis of spinning (i.e. substantially parallel to the substrate (520) surface) and is diametrically magnetized.

The ring-shaped dipole magnet (530) is placed on top of the disc-shaped dipole magnet (540), i.e. the ring-shaped dipole magnet (530) is placed between the disc-shaped dipole magnet (540) and the substrate (520).

As shown in FIG. 5A2, the projection of the magnetic axis of the ring-shaped dipole magnet of the first magnetic-field generating device (530) and the projection of the magnetic axis of the disc-shaped dipole magnet of the second magnetic-field generating device (540) along the axis of spinning onto a plane perpendicular to the axis of spinning form an angle ($\Omega$) having a value of about $-30°$.

The spinneable magnetic assembly (500) comprising the ring-shaped dipole magnet (530) and the disc-shaped dipole magnet (540) is able to spin around an axis of spinning substantially perpendicular to the substrate (520) surface.

The distance (d) between the lower surface of the ring-shaped dipole magnet (530) and the upper surface of the disc-shaped dipole magnet (540) is preferably between about 0 and about 10 mm, more preferably between about 0 and about 5 mm and is still more preferably about 0, i.e. the ring-shaped dipole magnet (530) and the disc-shaped dipole magnet (540) are in direct contact.

Figure 5B:
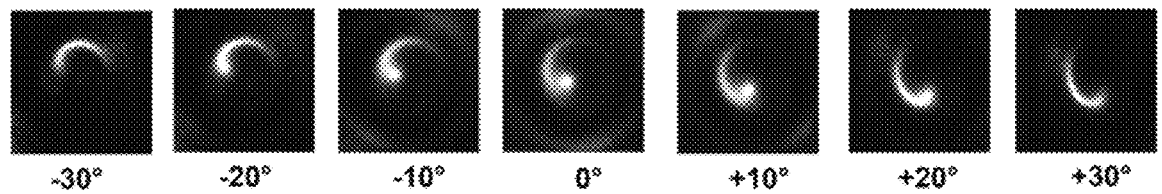
FIG. 5B shows pictures of an OEL obtained by using the spinneable magnetic assembly (500) illustrated in FIG. 5A1, as seen from a fixed position as the sample is tilted from −30° to +30°.
Figure 5C:
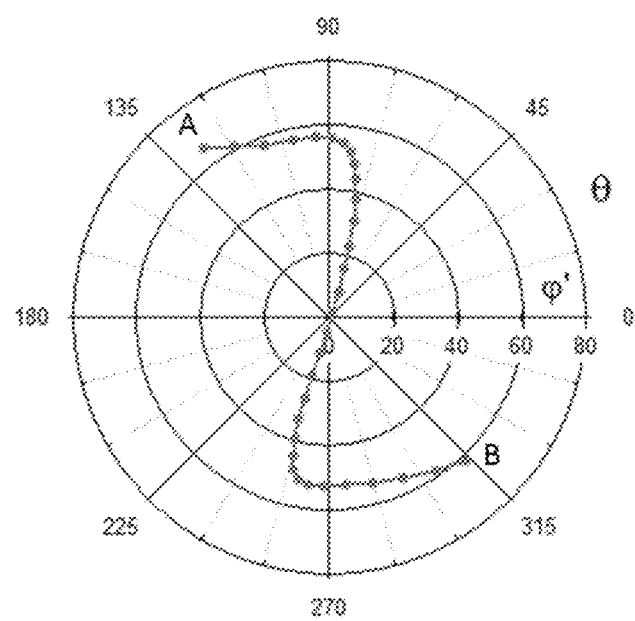
FIG. 5C gives, in ($\varphi'$,$\theta$) graphical representation, measured particle orientations along a selected diameter through the origin of the OEL obtained with the spinning magnet assembly depicted in FIG. 5A1.

FIG. 5C represents the deflection angles in spherical polar coordinates of a beam of light of a conoscopic scatterometer impinging the substrate (520) surface at normal incidence, along a diameter of the OEL shown in FIG. 5B.

The distance (h) between the upper surface of the ring-shaped dipole magnet (530) and the surface of the substrate (520) facing the spinneable magnetic assembly (500) is preferably between about 0.5 mm and about 10 mm, more preferably between about 0.5 mm and about 7 mm and still more preferably between about 1 mm and 7 mm.

The resulting OEL produced with the spinning magnetic assembly (500) illustrated in FIG. 5A1 is shown in FIG. 5B at different viewing angles by tilting the substrate (520) between $-30°$ and $+30°$. The so-obtained OEL provides the optical impression of a circularly moving comet-shaped spot rotating counterclockwise upon tilting said OEL. The resulting OELs produced with the spinning magnetic assembly (500) illustrated in FIG. 5A1 and varying the distance (d) and/or (h) are shown in FIG. 16A-C.

FIG. 6A1 illustrates an example of a spinneable magnetic assembly (600) suitable for producing optical effect layers (OELs) (610) comprising non-spherical oblate magnetic or magnetizable pigment particles on a substrate (620) according to the present invention. The spinneable magnetic assembly (600) comprises a first magnetic-field generating device (630) consisting of a ring-shaped dipole magnet and a second magnetic-field generating device (640) consisting of a disc-shaped dipole magnet.

The ring-shaped dipole magnet of the first magnetic-field generating device (630) has a magnetic axis substantially perpendicular to the axis of spinning (i.e. substantially parallel to the substrate (620) surface) and is diametrically magnetized. The disc-shaped dipole magnet of the second magnetic-field generating device (640) has a magnetic axis substantially perpendicular to the axis of spinning (i.e. substantially parallel to the substrate (620) surface and is diametrically magnetized).

The disc-shaped dipole magnet (640) is placed on top of the ring-shaped dipole magnet (630), i.e. the disc-shaped dipole magnet (640) is placed between the substrate (620) and the ring-shaped dipole magnet (630).

As shown in FIG. 6A2, the projection of the magnetic axis of the ring-shaped dipole magnet of first magnetic-field generating device (630) and the projection of magnetic axis of the disc-shaped dipole magnet of the second magnetic-field generating device (640) along the axis of spinning onto a plane perpendicular to the axis of spinning form an angle ($\Omega$) having a value of about +45°.

Figure 6B:
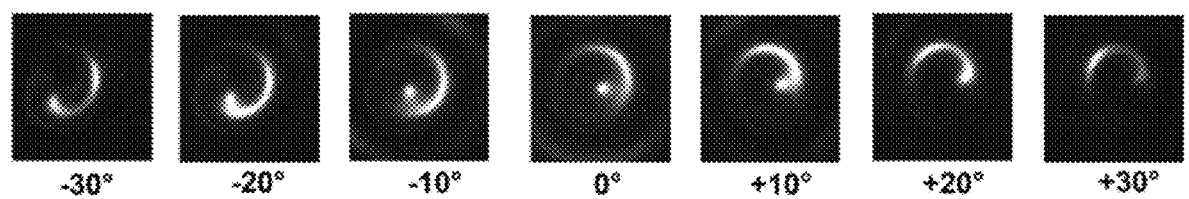
FIG. 6B shows pictures of an OEL obtained by using the magnetic assembly illustrated in FIG. 6A1, as seen from a fixed position as the sample is tilted from −30° to +30°.
Figure 6C:
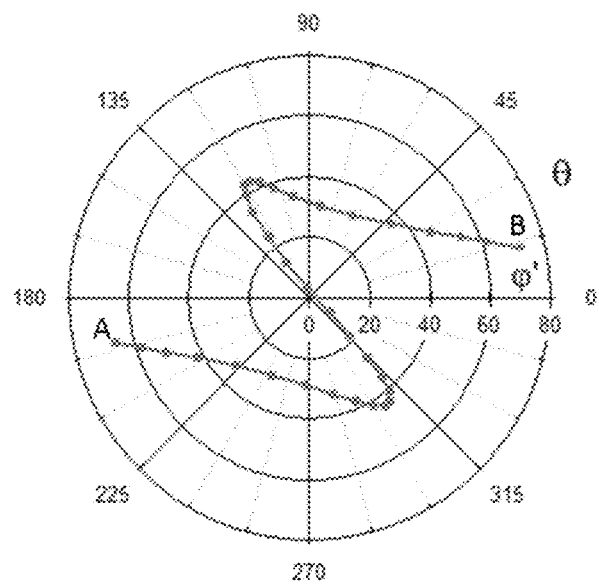
FIG. 6C gives, in ($\varphi'$,$\theta$) graphical representation, measured particle orientations at several locations $x_i$ along a selected diameter through the origin of the OEL obtained with the spinning magnet assembly depicted in FIG. 6A1.

FIG. 6C represents the deflection angles in spherical polar coordinates of a beam of light of a conoscopic scatterometer impinging the substrate (620) surface at normal incidence, along a diameter of the OEL shown in FIG. 6B. The spinneable magnetic assembly (600) comprising the ring-shaped dipole magnet (630) and the disc-shaped dipole magnet (640) is able to spin around an axis of spinning substantially perpendicular to the substrate (620) surface.

The distance (d) between the lower surface of the disc-shaped dipole magnet (640) and the upper surface of the ring-shaped dipole magnet (630) is preferably between about between about 0 and about 10 mm, more preferably between about 0 and about 5 mm and is still more preferably about 0 mm, i.e. the ring-shaped dipole magnet (630) and the disc-shaped dipole magnet (640) are in direct contact.

The distance (h) between the upper surface of the disc-shaped dipole magnet (640) and the surface of the substrate (620) facing the spinneable magnetic assembly (600) is preferably between about 0.5 mm and about 10 mm, more preferably between about 0.5 mm and about 7 mm and still more preferably between about 1 mm and 7 mm.

The resulting OEL produced with the spinning magnetic assembly (600) illustrated in FIG. 6A1 is shown in FIG. 6B at different viewing angles by tilting the substrate (620) between −30° and +30°. The so-obtained OEL provides the optical impression of a circularly moving comet-shaped spot rotating counterclockwise upon tilting said OEL.

FIG. 7A1 illustrates an example of a spinneable magnetic assembly (700) suitable for producing optical effect layers (OELs) (710) comprising non-spherical oblate magnetic or magnetizable pigment particles on a substrate (720) according to the present invention. The spinneable magnetic assembly (700) comprises a first magnetic-field generating device (730) consisting of a ring-shaped dipole magnet and a second magnetic-field generating device (740) consisting of a ring-shaped dipole magnet.

The ring-shaped dipole magnet of the first magnetic-field generating device (730) has a magnetic axis substantially perpendicular to the axis of spinning (i.e. substantially parallel to the substrate (720) surface) and is diametrically magnetized. The ring-shaped dipole magnet of the second magnetic-field generating device (740) has a magnetic axis substantially perpendicular to the axis of spinning (i.e. substantially parallel to the substrate (720) surface) and is diametrically magnetized.

The ring-shaped dipole magnet of the first magnetic-field generating device (730) is placed on top of the ring-shaped dipole magnet of the second magnetic-field generating device (740), i.e. the ring-shaped dipole magnet of the first magnetic-field generating device (730) is placed between the substrate (720) and the ring-shaped dipole magnet of the second magnetic-field generating device (740).

As shown in FIG. 7A2, the magnetic axis of the ring-shaped dipole magnet of the first magnetic-field generating device (730) and the magnetic axis of the ring-shaped dipole magnet of the second magnetic-field generating device (740) along the axis of spinning onto a plane perpendicular to the axis of spinning form an angle ($\Omega$) having a value of about −90°.

The spinneable magnetic assembly (700) comprising the ring-shaped dipole magnet of the first magnetic-field generating device (730) and the ring-shaped dipole magnet of the second magnetic-field generating device (740) is able to spin around an axis of spinning substantially perpendicular to the substrate (720) surface.

Figure 7B:
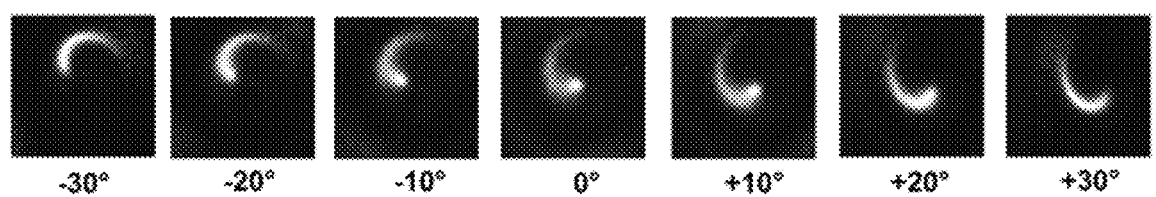
Figure 7C:
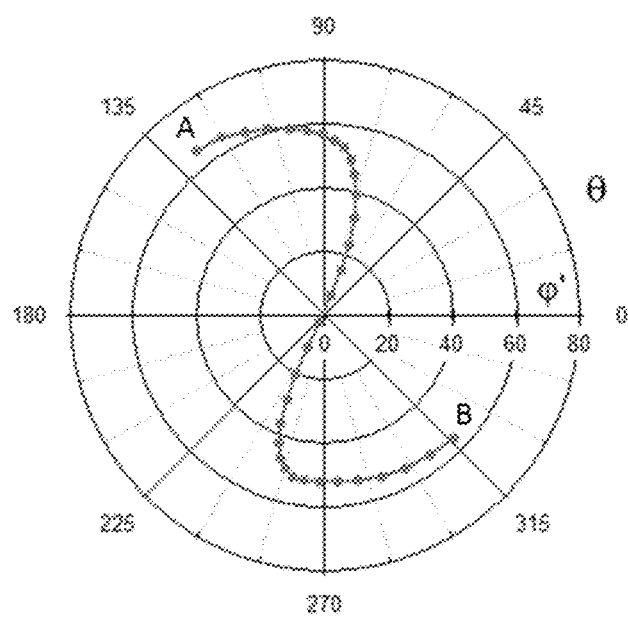

FIG. 7C represents the deflection angles in spherical polar coordinates of a beam of light of a conoscopic scatterometer impinging the substrate (720) surface at normal incidence, along a diameter of the OEL shown in FIG. 7B.

The distance (d) between the lower surface of the ring-shaped dipole magnet of the first magnetic-field generating device (730) and the upper surface of the ring-shaped dipole magnet of the second magnetic-field generating device (740) is preferably between about 0 and about 10 mm and is more preferably about 0 mm, i.e. the ring-shaped dipole magnet (730) and the disc-shaped dipole magnet (740) are in direct contact.

The distance (h) between the upper surface of the ring-shaped dipole magnet of the first magnetic-field generating device (730) and the surface of the substrate (720) facing the spinneable magnetic assembly (700) is preferably between about 0.5 mm and about 10 mm, more preferably between about 0.5 mm and about 7 mm and still more preferably between about 1 mm and 7 mm.

The spinneable magnetic assembly (700) comprising the ring-shaped dipole magnet of the first magnetic-field generating device (730) and the ring-shaped dipole magnet of the second magnetic-field generating device (740) is able to spin around an axis perpendicular to the substrate (720) surface.

The resulting OEL produced with the spinning magnetic assembly (700) illustrated in FIG. 7A1 is shown in FIG. 7B at different viewing angles by tilting the substrate (720) between −30° and +30°. The so-obtained OEL provides the optical impression of a circularly moving comet-shaped spot rotating counterclockwise upon tilting said OEL.

FIG. 8A1 illustrates an example of a spinneable magnetic assembly (800) suitable for producing optical effect layers (OELs) (810) comprising non-spherical oblate magnetic or magnetizable pigment particles on a substrate (820) according to the present invention. The spinneable magnetic assembly (800) comprises a first magnetic-field generating device (830) consisting of a ring-shaped dipole magnet and a second magnetic-field generating device (840) consisting of a ring-shaped dipole magnet.

The ring-shaped dipole magnet of the first magnetic-field generating device (830) has a magnetic axis substantially perpendicular to the axis of spinning (i.e. substantially parallel to the substrate (820) surface) and is diametrically magnetized. The ring-shaped dipole magnet of the second magnetic-field generating device (840) has a magnetic axis substantially perpendicular to the axis of spinning (i.e. substantially parallel to the substrate (820) surface) and is diametrically magnetized.

The ring-shaped dipole magnet of the first magnetic-field generating device (830) is placed on top of the ring-shaped dipole magnet of the second magnetic-field generating device (840), i.e. the ring-shaped dipole magnet of the first magnetic-field generating device (830) is placed between the substrate (820) and the ring-shaped dipole magnet of the second magnetic-field generating device (840).

As shown in FIG. 8A2, the magnetic axis of the ring-shaped dipole magnet of the first magnetic-field generating device (830) and the magnetic axis of the ring-shaped dipole magnet of the second magnetic-field generating device (840) along the axis of spinning onto a plane perpendicular to the axis of spinning form an angle ($\Omega$) having a value of about 90°.

The spinneable magnetic assembly (800) comprising the ring-shaped dipole magnet of the first magnetic-field generating device (830) and the ring-shaped dipole magnet of the second magnetic-field generating device (840) is able to spin around an axis of spinning substantially perpendicular to the substrate (820) surface.

Figure 8B:
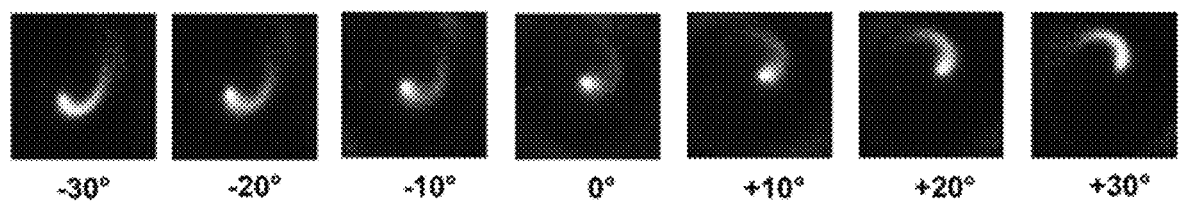
Figure 8C:
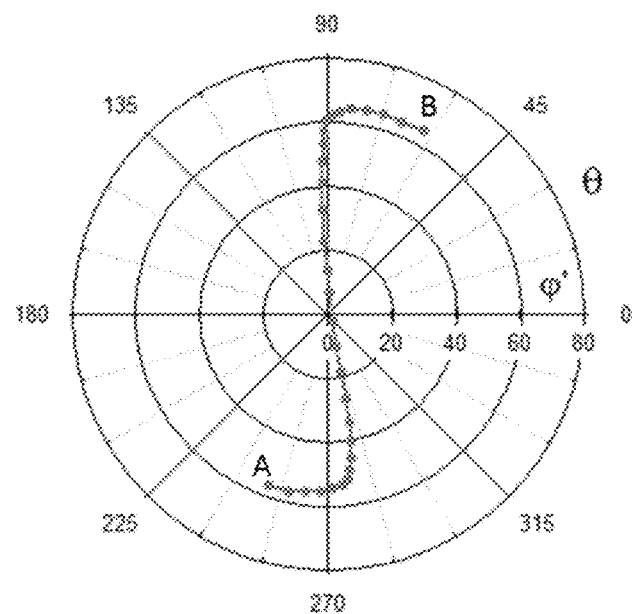

FIG. 8C represents the deflection angles in spherical polar coordinates of a beam of light of a conoscopic scatterometer impinging the substrate (820) surface at normal incidence, along a diameter of the OEL shown in FIG. 8B.

The distance (d) between the lower surface of the ring-shaped dipole magnet of the first magnetic-field generating device (830) and the upper surface of the ring-shaped dipole magnet of the second magnetic-field generating device (840) is preferably between about 0 and about 10 mm and is more preferably about 0 mm, i.e. the ring-shaped dipole magnet (830) and the disc-shaped dipole magnet (840) are in direct contact.

The distance (h) between the upper surface of the ring-shaped dipole magnet of the first magnetic-field generating device (830) and the surface of the substrate (820) facing the spinneable magnetic assembly (800) is preferably between about 0.5 mm and about 10 mm, more preferably between about 0.5 mm and about 7 mm and still more preferably between about 1 mm and 7 mm.

The resulting OEL produced with the spinning magnetic assembly (800) illustrated in FIG. 8A1 is shown in FIG. 8B at different viewing angles by tilting the substrate (820) between −30° and +30°. The so-obtained OEL provides the optical impression of a circularly moving comet-shaped spot rotating counterclockwise upon tilting said OEL.

FIG. 9A1 illustrates an example of a spinneable magnetic assembly (900) suitable for producing optical effect layers (OELs) (910) comprising non-spherical oblate magnetic or magnetizable pigment particles on a substrate (920) according to the present invention. The spinneable magnetic assembly (900) comprises a first magnetic-field generating device (930) consisting of a bar dipole magnet (931) and a second magnetic-field generating device (940) consisting of a disc-shaped dipole magnet.

The bar dipole magnet (931) of the first magnetic-field generating device (930) has a magnetic axis substantially perpendicular to the axis of spinning (i.e. substantially parallel to the substrate (920) surface). The bar dipole magnet (931) of the first magnetic-field generating device (930) is embedded in a disc-shaped supporting matrix (950), wherein said disc-shaped supporting matrix comprises a void having the same shape as the bar dipole magnet. The top and lower surfaces of the bar dipole magnet (931) of the first magnetic-field generating device (930) were respectively flush with the top and lower surfaces of the supporting matrix (950).

The disc-shaped dipole magnet of the second magnetic-field generating device (940) has a magnetic axis substantially perpendicular to the axis of spinning (i.e. substantially parallel to the substrate (920) surface) and is diametrically magnetized.

The supporting matrix (950) comprising the bar dipole magnet (931) of the first magnetic-field generating device (930) is placed on top of the disc-shaped dipole magnet of the second magnetic-field generating device (940), i.e. the first magnetic-field generating device (930) is placed between the substrate (920) and disc-shaped dipole magnet of the second magnetic-field generating device (940).

As shown in FIG. 9A2, the projection of the magnetic axis of the bar dipole magnet (931) of the first magnetic-field generating device (930) and the projection of the magnetic axis of the disc-shaped dipole magnet of the second magnetic-field generating device (940) along the axis of spinning onto a plane perpendicular to the axis of spinning form an angle ($\Omega$) having a value of about −60°.

The spinneable magnetic assembly (900) comprising the bar dipole magnet (931) of the first magnetic-field generating device (930) and the disc-shaped dipole magnet of the second magnetic-field generating device (940) is able to spin around an axis of spinning substantially perpendicular to the substrate (920) surface.

FIG. 9D represents the deflection angles in spherical polar coordinates of a beam of light of a conoscopic scatterometer impinging the substrate (920) surface at normal incidence, along a diameter of the OEL shown in FIG. 9B.

The distance (d) between the lower surface of the bar dipole magnet (931) of the first magnetic-field generating device (930) and the upper surface of the disc-shaped dipole magnet of the second magnetic-field generating device (940) is preferably between about 0 and 5 mm and is more preferably about 0 mm, i.e. the bar dipole magnet (931) of the first magnetic-field generating device (930) and the disc-shaped dipole magnet (940) are in direct contact.

The distance (h) between the upper surface of the bar dipole magnet (931) of the first magnetic-field generating device (930) and the surface of the substrate (920) facing the spinneable magnetic assembly (900) is preferably between about 0.5 mm and about 10 mm, more preferably between about 0.5 mm and about 7 mm and still more preferably between about 1 mm and 7 mm.

The resulting OEL produced with the spinning magnetic assembly (900) illustrated in FIG. 9A1 is shown in FIG. 9C at different viewing angles by tilting the substrate (920) between −30° and +30°. The so-obtained OEL provides the optical impression of a circularly moving comet-shaped spot rotating counterclockwise upon tilting said OEL.

FIG. 10A1 illustrates an example of a spinneable magnetic assembly (1000) suitable for producing optical effect layers (OELs) (1010) comprising non-spherical oblate magnetic or magnetizable pigment particles on a substrate (1020) according to the present invention. The spinneable magnetic assembly (1000) comprises a first magnetic-field generating device (1030) consisting of two or more, in particular two, bar dipole magnets (1031) and a second magnetic-field generating device (1040) consisting of a disc-shaped dipole magnet.

Each of the two bar dipole magnets (1031) of the first magnetic-field generating device (1030) has a magnetic axis substantially perpendicular to the axis of spinning (i.e. substantially parallel to the substrate (1020) surface). The two bar dipole magnets (1031) of the first magnetic-field generating device (1030) have their magnetic axis pointing in the same direction. The two bar dipole magnets (1031) of the first magnetic-field generating device (1030) are embedded in a disc-shaped supporting matrix (1050), wherein said disc-shaped supporting matrix comprises two voids having the same shape as the bar dipole magnets. The top and lower surfaces of the bar dipole magnets (1031) of the first magnetic-field generating device (1030) were respectively flush with the top and lower surfaces of the supporting matrix (1050).

The disc-shaped dipole magnet of the second magnetic-field generating device (1040) has a magnetic axis substantially perpendicular to the axis of spinning (i.e. substantially parallel to the substrate (1020) surface) and is diametrically magnetized.

The supporting matrix (1050) comprising the two bar dipole magnets (1031) of the first magnetic-field generating device (1030) is placed on top of the disc-shaped dipole magnet of the second magnetic-field generating device (1040), i.e. the first magnetic-field generating device (1030) is placed between the substrate (1020) and the disc-shaped dipole magnet of the second magnetic-field generating device (1040).

As shown in FIG. 10A2, the projection of the magnetic axis of the two bar dipole magnets (1031) of the first magnetic-field generating device (1030) and the projection of the magnetic axis of the disc-shaped dipole magnet of the second magnetic-field generating device (1040) along the axis of spinning onto a plane perpendicular to the axis of spinning form an angle ($\Omega$) having a value of about −30°.

The spinneable magnetic assembly (1000) comprising the two bar dipole magnets (1031) of the first magnetic-field generating device (1030) and the disc-shaped dipole magnet of the second magnetic-field generating device (1040) is able to spin around an axis of spinning substantially perpendicular to the substrate (1020) surface.

FIG. 10D represents the deflection angles in spherical polar coordinates of a beam of light of a conoscopic scatterometer impinging the substrate (1020) surface at normal incidence, along a diameter of the OEL shown in FIG. 10B.

The distance (d) between the lower surface of the two bar dipole magnets (1031) of the first magnetic-field generating device (1030) and the upper surface of the disc-shaped dipole magnet of the second magnetic-field generating device (1040) is preferably between about 0 and about 5 mm and is more preferably about 0 mm, i.e. the two bar dipole magnets (1031) of the first magnetic-field generating device (1030) and the disc-shaped dipole magnet (1040) are in direct contact.

The distance (h) between the upper surface of the two bar dipole magnet (1031) of the first magnetic-field generating device (1030) and the surface of the substrate (1020) facing the spinneable magnetic assembly (1000) is preferably between about 0.5 mm and about 10 mm, more preferably between about 0.5 mm and about 7 mm and still more preferably between about 1 mm and 7 mm.

The resulting OEL produced with the spinning magnetic assembly (1000) illustrated in FIG. 10A1 is shown in FIG. 10C at different viewing angles by tilting the substrate (1020) between −30° and +30°. The so-obtained OEL provides the optical impression of a circularly moving comet-shaped spot rotating counterclockwise upon tilting said OEL.

FIG. 11A1 illustrates an example of a spinneable magnetic assembly (1100) suitable for producing optical effect layers (OELs) (1110) comprising non-spherical oblate magnetic or magnetizable pigment particles on a substrate (1120) according to the present invention. The spinneable magnetic assembly (1100) comprises a first magnetic-field generating device (1130) consisting of two or more, in particular three, bar dipole magnets (1131) and a second magnetic-field generating device (1140) consisting of a disc-shaped dipole magnet. The first magnetic-field generating device (1130) comprises a centered arrangement of three collinear bar dipole magnets (1131) embedded in a supporting matrix (1150).

Each of the three bar dipole magnets (1131) of the first magnetic-field generating device (1130) has a magnetic axis substantially perpendicular to the axis of spinning (i.e. substantially parallel to the substrate (1120) surface). The three bar dipole magnets (1131) of the first magnetic-field generating device (1130) have their magnetic axis pointing in the same direction. The three bar dipole magnets (1131) of the first magnetic-field generating device (1130) are embedded in a disc-shaped supporting matrix (1150), wherein said disc-shaped supporting matrix comprises three voids having the same shape as the bar dipole magnets. The top and lower surfaces of the bar dipole magnets (1131) of the first magnetic-field generating device (1130) were respectively flush with the top and lower surfaces of the supporting matrix (1150).

The disc-shaped dipole magnet of the second magnetic-field generating device (1140) has a magnetic axis substantially perpendicular to the axis of spinning (i.e. substantially parallel to the substrate (1120) surface) and is diametrically magnetized.

The supporting matrix (1150) comprising the three bar dipole magnets (1131) of the first magnetic-field generating device (1130) is placed on top of the disc-shaped dipole magnet of the second magnetic-field generating device (1140), i.e. the first magnetic-field generating device (1130) is placed between the substrate (1120) and the disc-shaped dipole magnet of the second magnetic-field generating device (1140).

As shown in FIG. 11A2, the projection of the magnetic axis of the three collinear bar dipole magnets (1131) of the first magnetic-field generating device (1130) and the projection of the magnetic axis of the disc-shaped dipole magnet of the second magnetic-field generating device (1140) along the axis of spinning onto a plane perpendicular to the axis of spinning form an angle ($\Omega$) having a value of about −120°.

The spinneable magnetic assembly (1100) comprising the three bar dipole magnets (1131) of the first magnetic-field generating device (1130) and the disc-shaped dipole magnet of the second magnetic-field generating device (1140) is able to spin around an axis of spinning substantially perpendicular to the substrate (1120) surface.

FIG. 11D represents the deflection angles in spherical polar coordinates of a beam of light of a conoscopic scatterometer impinging the substrate (1120) surface at normal incidence, along a diameter of the OEL shown in FIG. 11B.

The distance (d) between the lower surface of the three bar dipole magnets (1131) of the first magnetic-field generating device (1130) and the upper surface of the disc-shaped dipole magnet of the second magnetic-field generating device (1140) is preferably between about 0 and about 5 mm and is more preferably about 0 mm, i.e. the three bar dipole magnets (1131) of the first magnetic-field generating device (1130) and the disc-shaped dipole magnet (1140) are in direct contact.

The distance (h) between the upper surface of the three bar dipole magnets (1131) of the first magnetic-field generating device (1130) and the surface of the substrate (1120) facing the spinneable magnetic assembly (1100) is preferably between about 0.5 mm and about 10 mm, more preferably between about 0.5 mm and about 7 mm and still more preferably between about 1 mm and 7 mm.

The resulting OEL produced with the spinning magnetic assembly (1100) illustrated in FIG. 11A1 is shown in FIG. 11C at different viewing angles by tilting the substrate (1120) between −30° and +30°. The so-obtained OEL provides the optical impression of a double circularly moving comet-shaped spot rotating counterclockwise upon tilting said OEL.

FIG. 15A1 illustrates an example of a spinneable magnetic assembly (1500) suitable for producing optical effect layers (OELs) (1510) comprising non-spherical oblate magnetic or magnetizable pigment particles on a substrate (1520) according to the present invention. The spinneable magnetic assembly (1500) comprises a first magnetic-field generating device (1530) consisting of two or more, in particular two, bar dipole magnets (1531) and a second magnetic-field generating device (1540) consisting of a disc-shaped dipole magnet.

Each of the two bar dipole magnets (1531) of the first magnetic-field generating device (1530) has a magnetic axis substantially perpendicular to the axis of spinning (i.e. substantially parallel to the substrate (1520) surface). The two bar dipole magnets (1531) of the first magnetic-field generating device (1530) have their magnetic axis pointing in the same direction. The two bar dipole magnets (1531) of the first magnetic-field generating device (1530) have their magnetic axis tilted by a specific angle, in particular an angle β of about 30° (as illustrated in FIG. 1561), from the diameter of the supporting matrix (1550) crossing the center of the top face of the two bar dipole magnets (1531). The two bar dipole magnets (1531) of the first magnetic-field generating device (1530) are embedded in a disc-shaped supporting matrix (1550), wherein said disc-shaped supporting matrix comprises two or more, in particular two, voids having the same shape as the bar dipole magnets. The top and lower surfaces of the bar dipole magnets (1531) of the first magnetic-field generating device (1530) were respectively flush with the top and lower surfaces of the supporting matrix (1550).

The disc-shaped dipole magnet of the second magnetic-field generating device (1540) has a magnetic axis substantially perpendicular to the axis of spinning (i.e. substantially parallel to the substrate (1520) surface) and is diametrically magnetized.

The supporting matrix (1550) comprising the two bar dipole magnets (1531) of the first magnetic-field generating device (1530) is placed on top of the disc-shaped dipole magnet of the second magnetic-field generating device (1540), i.e. the first magnetic-field generating device (1530) is placed between the substrate (1520) and the disc-shaped dipole magnet of the second magnetic-field generating device (1540).

As shown in FIG. 15A2, the projection of the magnetic axis of the two bar dipole magnets (1531) of the first magnetic-field generating device (1530) and the projection of the magnetic axis of the disc-shaped dipole magnet of the second magnetic-field generating device (1540) along the axis of spinning onto a plane perpendicular to the axis of spinning form an angle (Ω) having a value of about 150°.

The spinneable magnetic assembly (1500) comprising the two bar dipole magnets (1531) of the first magnetic-field generating device (1530) and the disc-shaped dipole magnet of the second magnetic-field generating device (1540) is able to spin around an axis of spinning substantially perpendicular to the substrate (1520) surface.

FIG. 15D represents the deflection angles in spherical polar coordinates of a beam of light of a conoscopic scatterometer impinging the substrate (1520) surface at normal incidence, along a diameter of the OEL shown in FIG. 15C.

The distance (d) between the lower surface of the two bar dipole magnets (1531) of the first magnetic-field generating device (1530) and the upper surface of the disc-shaped dipole magnet of the second magnetic-field generating device (1540) is preferably between about 0 and about 5 mm and is more preferably about 0 mm, i.e. the two bar dipole magnets (1531) of the first magnetic-field generating device (1530) and the disc-shaped dipole magnet (1540) are in direct contact.

The distance (h) between the upper surface of the two bar dipole magnet (1531) of the first magnetic-field generating device (1530) and the surface of the substrate (1020) facing the spinneable magnetic assembly (1500) is preferably between about 0.5 mm and about 10 mm, more preferably between about 0.5 mm and about 7 mm and still more preferably between about 1 mm and 7 mm.

The resulting OEL produced with the spinning magnetic assembly (1500) illustrated in FIG. 15A1 is shown in FIG. 15C at different viewing angles by tilting the substrate (1520) between −30° and +30°. The so-obtained OEL provides the optical impression of a circularly moving comet-shaped spot rotating counterclockwise upon tilting said OEL.

FIG. 12 illustrates an example of a spinneable magnetic assembly (1200) suitable for producing optical effect layers (OELs) (1210) comprising non-spherical oblate magnetic or magnetizable pigment particles on a substrate (1220) according to the present invention. The spinneable magnetic assembly (1200) comprises a first magnetic-field generating device (1230) consisting of a disc-shaped dipole magnet (1231-*a*) nested inside a ring-shaped dipole magnet (1231-*b*), and a second magnetic-field generating device (1240) consisting of a disc-shaped dipole magnet.

Each of the disc-shaped dipole magnet (1231-*a*) nested inside the ring-shaped dipole magnet (1231-*b*) of the first magnetic-field generating device (1230) have their magnetic axis substantially perpendicular to the axis of spinning (i.e. substantially parallel to the substrate (1220) surface), are diametrically magnetized and both of them have their magnetic axis pointing in the same direction. The disc-shaped dipole magnet (1231-*a*) and the ring-shaped dipole magnet (1231-*b*) are centrally aligned. The disc-shaped dipole magnet (1231-*a*) nested inside the ring-shaped dipole magnet (1231-*b*) of the first magnetic-field generating device (1230) is embedded in a disc-shaped supporting matrix (1250), wherein said disc-shaped supporting matrix comprises two circular voids or indentations having the same external shape as the disc-shaped dipole magnet (1231-*a*) and the ring-shaped dipole magnet (1231-*b*).

The disc-shaped dipole magnet of the second magnetic-field generating device (1240) has a magnetic axis substantially perpendicular to the axis of spinning (i.e. substantially parallel to the substrate (1220) surface) and is diametrically magnetized.

The supporting matrix (1250) comprising the disc-shaped dipole magnet (1231-*a*) nested inside the ring-shaped dipole magnet (1231-*b*) of the first magnetic-field generating device (1230) is placed on top of the disc-shaped dipole magnet of the second magnetic-field generating device (1240), i.e. the first magnetic-field generating device (1230) is placed between the substrate (1220) and the disc-shaped dipole magnet of the second magnetic-field generating device (1240). The spinneable magnetic assembly (1200) comprising the disc-shaped dipole magnet (1231-*a*) nested inside the ring-shaped dipole magnet (1231-*b*) of the first magnetic-field generating device (1130) and the disc-shaped dipole magnet of the second magnetic-field generating device (1240) is able to spin around an axis of spinning substantially perpendicular to the substrate (1220) surface.

A resulting OEL produced with the spinning magnetic assembly (1200) illustrated in FIG. 12 would be a circularly moving double comet-shaped spot at different viewing angles by tilting the substrate (1220) between −30° and +30°, i.e. OEL similar to the one illustrated in FIG. 11C.

FIG. 13 illustrates an example of a spinneable magnetic assembly (1300) suitable for producing optical effect layers (OELs) (1310) comprising non-spherical oblate magnetic or magnetizable pigment particles on a substrate (1320) according to the present invention. The spinneable magnetic assembly (1300) comprises a first magnetic-field generating device (1330) consisting of two or more, in particular two, nested ring-shaped dipole magnets (1331-*a*, 1331-*b*), and a second magnetic-field generating device (1340) consisting of a disc-shaped dipole magnet.

Each of the two nested ring-shaped dipole magnets (1331-*a*, 1331-*b*) of the first magnetic-field generating device (1330) have a magnetic axis substantially perpendicular to the axis of spinning (i.e. substantially parallel to the substrate (1320) surface), are diametrically magnetized and both of them have their magnetic axis are pointing in the same direction. The two nested ring-shaped dipole magnets (1331-*a*, 1331-*b*) of the first magnetic-field generating device (1330) are centrally aligned. The two nested ring-shaped magnets (1331-*a*, 1331-*b*) of the first magnetic-field generating device (1330) are embedded in a disc-shaped supporting matrix (1350), wherein said disc-shaped supporting matrix comprises two circular voids or indentations having the same shape as the two nested ring-shaped dipole magnets (1331-*a*, 1331-*b*). The top and lower surfaces of two nested ring-shaped dipole magnets (1331-*a*, 1331-*b*) of the first magnetic-field generating device (1330) were respectively flush with the top and lower surfaces of the supporting matrix (1350).

The disc-shaped dipole magnet of the second magnetic-field generating device (1340) has a magnetic axis substantially perpendicular to the axis of spinning (i.e. substantially parallel to the substrate (1320) surface) and is diametrically magnetized.

The two nested ring-shaped dipole magnets (1331-*a*, 1331-*b*) of the first magnetic-field generating device (1330) are placed on top of the disc-shaped dipole magnet of the second magnetic-field generating device (1340). The spinneable magnetic assembly (1300) comprising two nested ring-shaped dipole magnets (1331-*a*, 1331-*b*) of the first magnetic-field generating device (1330) and the disc-shaped dipole magnet of the second magnetic-field generating device (1340) is able to spin around an axis of spinning substantially perpendicular to the substrate (1320) surface.

A resulting OEL produced with the spinning magnetic assembly (1300) illustrated in FIG. 13 would be a circularly moving double comet-shaped spot at different viewing angles by tilting the substrate (1320) between −30° and +30°, i.e. OEL similar to the one illustrated in FIG. 11C.

The present invention further provides printing apparatuses comprising a rotating magnetic cylinder and the one or more spinneable magnetic assemblies (x00) described herein, wherein said one or more spinneable magnetic assemblies (x00) are mounted to circumferential or axial grooves of the rotating magnetic cylinder as well as printing assemblies comprising a flatbed printing unit and one or more of the spinneable magnetic assemblies described herein, wherein said one or more spinneable magnetic assemblies are mounted to recesses of the flatbed printing unit.

The rotating magnetic cylinder is meant to be used in, or in conjunction with, or being part of a printing or coating equipment, and bearing one or more spinneable magnetic assemblies described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more of the spinneable magnetic assemblies described herein. In an embodiment, the flatbed printing unit is part of a sheet-fed industrial printing press that operates in a discontinuous way.

The printing apparatuses comprising the rotating magnetic cylinder described herein or the flatbed printing unit described herein may include a substrate feeder for feeding a substrate such as those described herein having thereon a layer of non-spherical oblate magnetic or magnetizable pigment particles described herein, so that the magnetic assemblies generate a magnetic field that acts on the pigment particles to orient them to form an optical effect layer (OEL). In an embodiment of the printing apparatuses comprising a rotating magnetic cylinder described herein, the substrate is fed by the substrate feeder under the form of sheets or a web. In an embodiment of the printing apparatuses comprising a flatbed printing unit described herein, the substrate is fed under the form of sheets. The printing apparatuses comprising the rotating magnetic cylinder described herein or the flatbed printing unit described herein may include a coating or printing unit for applying the radiation curable coating composition comprising the non-spherical oblate magnetic or magnetizable pigment particles described herein on the substrate described herein, the radiation curable coating composition comprising non-spherical oblate magnetic or magnetizable pigment particles that are oriented by the magnetic-field generated by the spinneable magnetic assemblies described herein to form an optical effect layer (OEL). In an embodiment of the printing apparatuses comprising a rotating magnetic cylinder described herein, the coating or printing unit works according to a rotary, continuous process. In an embodiment of the printing apparatuses comprising a flatbed printing unit described herein, the coating or printing unit works according to a linear, discontinuous process.

The printing apparatuses comprising the rotating magnetic cylinder described herein or the flatbed printing unit described herein may include a curing unit for at least partially curing the radiation curable coating composition comprising non-spherical oblate magnetic or magnetizable pigment particles that have been magnetically oriented by the spinneable magnetic assemblies described herein, thereby fixing the orientation and position of the non-spherical oblate magnetic or magnetizable pigment particles to produce an optical effect layer (OEL).

The OEL described herein may be provided directly on a substrate on which it shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after at least partially curing the coating composition for the production of the OEL, the temporary substrate may be removed from the OEL.

Alternatively, an adhesive layer may be present on the OEL or may be present on the substrate comprising an optical effect layer (OEL), said adhesive layer being on the side of the substrate opposite the side where the OEL is provided or on the same side as the OEL and on top of the OEL. Therefore an adhesive layer may be applied to the optical effect layer (OEL) or to the substrate. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates such as those described herein comprising more than one, i.e. two, three, four, etc. optical effect layers (OEL) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned herein, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

EXAMPLES

Spinneable magnetic assemblies illustrated in FIG. 5A-11A were used to orient non-spherical oblate optically variable magnetic pigment particles in a printed layer of the UV-curable screen printing ink described in Table 1 so as to produce optical effect layers (OELs) shown in FIGS. 5B-8B and 9C-11C. The UV-curable screen printing ink was applied onto a black commercial paper (Gascogne Laminates M-cote 120), said application being carried out by hand screen printing using a T90 screen so as to form a coating layer having a thickness of about 20 μm. The substrate carrying the applied layer of the UV-curable screen printing ink was placed on the spinning magnet assembly. The spinneable magnetic assemblies of Example E1-E7 and C1-C2 were spinning for about 5 seconds at a frequency of 30 Hz by using a motor as described in FIG. 2 of WO 2016/026896 A1. The so-obtained magnetic orientation pattern of the platelet-shaped optically variable pigment particles was then, partially simultaneously to the orientation step, (i.e. while the substrate carrying the applied layer of the UV-curable screen printing ink was still in the spinning magnetic field of the magnetic assembly), fixed by exposing for about 0.5 second to UV-curing the applied layer comprising the pigment particles using a UV-LED-lamp from Phoseon (Type FireFlex 50×75 mm, 395 nm, 8 W/cm$^2$).

TABLE 1

| UV-curable screen printing ink (coating composition): | |
|---|---|
| Epoxyacrylate oligomer | 28% |
| Trimethylolpropane triacrylate monomer | 19.5% |
| Tripropyleneglycol diacrylate monomer | 20% |
| Genorad 16 (Rahn) | 1% |
| Aerosil 200 (Evonik) | 1% |
| Speedcure TPO-L (Lambson) | 2% |
| Irgacure ® 500 (BASF) | 6% |
| Genocure ® EPD (Rahn) | 2% |
| BYK ® 371 (BYK) | 2% |
| Tego Foamex N (Evonik) | 2% |
| 7-layer optically variable magnetic pigment particles (*) | 16.5% |

(*) gold-to-green optically variable magnetic pigment particles having a flake shape (platelet-shaped pigment particles) of diameter d50 about 9 μm and thickness about 1 μm, obtained from Viavi Solutions, Santa Rosa, CA.

Measurement of Pigment Particles Orientation (FIG. 4)

The measurements of the orientation pattern of the non-spherical platelet-shaped optically variable magnetic pigment particles along a diameter of the OEL were carried out on a conoscopic scatterometer from Eckhardt Optics LLC (Eckhardt Optics LLC, 5430 Jefferson Ct, White Bear Lake, Minn. 55110; http://eckop.com).

The substrates (x20) carrying the coating layer (x10) were independently and successively placed flat on a manual xy-table in the front focal plane of the conoscopic scatterometer. The xy-table was adjustable between 0 and 26 mm on both axes. The xy-table carrying the substrate with the OEL was manually adjusted under the optical system such that the center of the OEL (identifiable by pigment particles' orientation having a zero zenith angle as a consequence of the circular symmetry of the OEL and the circular symmetry of the orientation pattern) was facing the center of the optical system. The origin of the x-axis was arbitrarily set at 13 mm, along both axis of the xy-table (middle of the scan range).

The coating layer comprising the oriented non-spherical platelet-shaped optically variable magnetic pigment particles was illuminated at orthogonal incidence through the optics with a 1 mm diameter beam of parallel light green light (520 nm). A measure of the light beam deflection angles upon reflection by the sample was taken every 0.5 mm along the diameter of the OEL and reported in spherical polar coordinates in FIGS. 3C, 3F, 5C, 6C, 7C, 8C, 9D, 10D and 11D. Hence, FIGS. 3C, 3F, 5C, 6C, 7C, 8C, 9D, 10D and 11D illustrate the variation of azimuth angle θ and zenithal deflection angle φ' along a diameter of the OEL along the x direction. The direction of scanning along the diameter is indicated in the relevant graphs, starting with negative x values at one end of the graph and positive x values at the other end, in 0.5 mm steps.

Comparative Example C1 (FIG. 3A-C)

Comparative Example C1 (FIG. 3A-C) was prepared according to Example E1 of WO 2016/026896 A1, FIGS. 1 and 13.

The magnetic assembly (300A) used to prepare C1 comprised a disc-shaped dipole magnet (300A). The disc-shaped dipole magnet (300A) was diametrically magnetized and had a diameter (A1) of about 30 mm and a thickness (A2) of about 3 mm. The magnetic axis of the disc-shaped dipole magnet (300A) was substantially perpendicular to the axis of spinning and substantially parallel to the substrate (320A) surface. The disc-shaped dipole magnet was made of NdFeB N40.

The distance (h) between the upper surface of the disc-shaped dipole magnet (300A) and the surface of the substrate (320A) facing the dipole magnet was about 5 mm.

The magnetic assembly (300A) was spinning around an axis of spinning perpendicular to the substrate (320A) surface at a speed of about 30 Hz.

The resulting OEL produced with the magnetic assembly (300A) illustrated in FIG. 3A is shown in
FIG. 3B. The so-obtained OEL provides the optical impression of a dome.

The conoscopic scatterometry of the OEL shown in FIG. 3B allowed the measurement of the orientation pattern of the non-spherical platelet-shaped optically variable magnetic pigment particles and the resulting graph is shown in FIG. 3C. Over a distance ranging from −9.7 mm (A) to +9.3 mm (B) along the x direction, the zenithal deflection angle φ' spans values between 0° and about 55°, and the azimuth angle θ remains substantially constant at about 180° in the negative x branch, and symmetrically, at about 360° in the locations where x is positive.

Figure 3F:
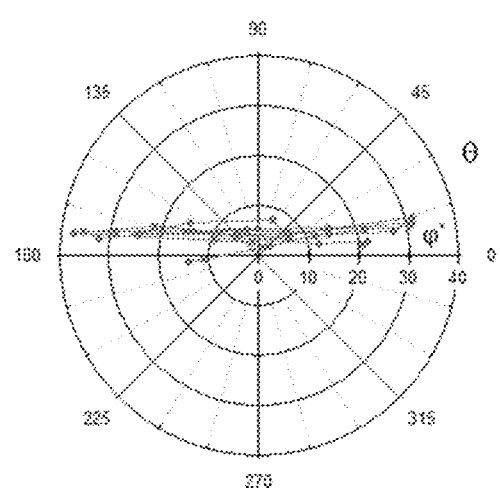
FIG. 3F gives, in ($\varphi'$,$\theta$) graphical representation, measured particle orientations at several locations $x_i$ along a selected diameter through the origin of the OEL obtained with the spinning magnet assembly depicted in FIG. 3D.

Comparative Example C2 (FIG. 3D-F)

Comparative example C2 (FIG. 3D-F) was prepared with a magnetic device similar to Example E2 of WO 2016/026896 A1.

The magnetic assembly (300D) used to prepare C2 consisted of a centered arrangement of three collinear bar dipole magnets (331D) embedded in a supporting matrix (350D). Each of the three bar dipole magnets (331D) was a cubic block having a length (A3) of about 5 mm. The three bar dipole magnets (331D) were disposed symmetrically around the center of the supporting matrix (350D) at a distance (A4) of about 5 mm from each other along the diameter of the supporting matrix (350D). The magnetic axis of the three bar dipole magnets (331D) was substantially perpendicular to the axis of spinning and substantially parallel to the substrate (320D) surface, with the North pole of said three bar dipole magnets (331D) pointing in the same direction. The three bar dipole magnets (331D) were made of NdFeB N45.

The three bar dipole magnets (331D) were embedded in a supporting matrix (350D) comprising three voids having the same shape as the bar dipole magnets (331D). The supporting matrix (350D) had a diameter (A1) of about 30 mm and a thickness (A2) of about 5 mm. The supporting matrix (350D) was made of POM (polyoxymethylene). The top and lower surfaces of the three bar dipole magnets (331D) were respectively flush with the top and lower surfaces of the supporting matrix (350D).

The distance (h) between the upper surface of the three bar dipole magnets (331D) embedded in the supporting matrix (350D) and the surface of the substrate (320D) facing the three bar dipole magnets (331D) was about 5 mm.

The magnetic assembly (300D) was spinning around the axis of spinning being substantially perpendicular to the substrate (320D) surface at a speed of about 30 Hz.

The resulting OEL produced with the magnetic assembly illustrated in FIG. 3D is shown in FIG. 3E. The so-obtained OEL provides the optical impression of a protrusion nested in the center of multiple rings.

The conoscopic scatterometry of the OEL shown in FIG. 3E allowed the measurement of the orientation pattern of the non-spherical platelet-shaped optically variable magnetic pigment particles and the resulting graph is shown in FIG. 3F. Over a distance along the x direction, the zenithal deflection angle φ' and the azimuth angle θ varied significantly, but remained constrained to angular locations close to the 0°-180° axis. Close to the 0°-180° axis in this context means that deflection angle remains within 10°-15° of the plane of incidence (x14, 214 in FIG. 2B).

Example 1, E1 (FIG. 5)

The spinneable magnetic assembly (500) used to prepare the optical effect layer (510) of Example 1 on the substrate (520) is illustrated in FIG. 5A1.

The magnetic assembly (500) comprised a first magnetic-field generating device (530) consisting of a ring-shaped dipole magnet and a second magnetic-field generating device (540) consisting of a disc-shaped dipole magnet, wherein the first magnetic-field generating device (530) was placed on top of the second magnetic-field generating device (540).

The ring-shaped dipole magnet of the first magnetic-field generating device (530) was diametrically magnetized and had an external diameter (A1) of about 25 mm, an internal diameter (A2) of about 14 mm and a thickness (A3) of about 2 mm. The magnetic axis of the ring-shaped dipole magnet (530) was substantially perpendicular to the axis of spinning and substantially parallel to the substrate (520) surface. The ring-shaped dipole magnet was made of NdFeB N40.

The disc-shaped dipole magnet the second magnetic-field generating device (540) was diametrically magnetized and had a diameter (A4) of about 25 mm and a thickness (A5) of about 2 mm. The magnetic axis of the disc-shaped dipole magnet was substantially perpendicular to the axis of spinning and substantially parallel to the substrate (520) surface. The disc-shaped dipole magnet was made of NdFeB N40.

As shown in FIG. 5B, the projection of the magnetic axis of the ring-shaped dipole magnet of the first magnetic-field generating device (530) and the projection of the magnetic axis of the disc-shaped dipole magnet of the second magnetic-field generating device (540) along the axis of spinning onto a plane perpendicular to the axis of spinning formed an angle (Ω) of about −30°.

The distance (d) between the lower surface of the ring-shaped dipole magnet of the first magnetic-field generating device (530) and the upper surface of the disc-shaped dipole magnet of the second magnetic-field generating device (540) was 0 mm, i.e. the ring-shaped dipole magnet and the disc-shaped dipole magnet were in direct contact. The distance (h) between the upper surface of the ring-shaped dipole magnet of the first magnetic-field generating device (530) and the surface of the substrate (520) facing the ring-shaped dipole magnet was about 4.5 mm.

The magnetic assembly (500) comprising the first and second magnetic-field generating devices (530 and 540) was spinning around the axis of spinning being substantially perpendicular to the substrate (520) surface.

The resulting OEL produced with the magnetic assembly illustrated in FIG. 5A is shown in FIG. 5B at different viewing angles by tilting the substrate (520) between −30° and +30°. The so-obtained OEL provides the optical impression of a circularly moving comet-shaped spot rotating counterclockwise upon tilting said OEL.

The conoscopic scatterometry of the OEL shown in FIG. 5B allowed the measurement of the orientation pattern (see FIG. 5C) of the platelet-shaped optically variable magnetic pigment particles. Over a distance ranging from −7.7 mm (A) to +7.8 mm (B) along the x direction, the zenithal deflection angle φ' spans a range of values from 0° to about 60°, and the azimuth angle θ spans a range of values from about. 135° to about 75° in the negative x branch, and symmetrically, about 255° to about 315° in the locations where x is positive.

Example 2, E2 (FIG. 6)

The spinneable magnetic assembly (600) used to prepare the optical effect layer (610) of Example 2 on the substrate (620) is illustrated in FIG. 6A1.

The magnetic assembly (600) comprised a first magnetic-field generating device (630) consisting of a ring-shaped dipole magnet and a second magnetic-field generating device (640) consisting of a disc-shaped dipole magnet, wherein the second magnetic-field generating device (640) was placed on top of the first magnetic-field generating device (640).

The ring-shaped dipole magnet the first magnetic-field generating device (630) was diametrically magnetized and had an external diameter (A3) of about 25 mm, an internal diameter (A4) of about 10 mm and a thickness (A5) of about 3 mm. The magnetic axis of the ring-shaped dipole magnet was substantially perpendicular to the axis of spinning and substantially parallel to the substrate (620) surface. The ring-shaped dipole magnet was made of NdFeB N40.

The disc-shaped dipole magnet of the second magnetic-field generating device (640) was diametrically magnetized and had an external diameter (A1) of about 25 mm and a thickness (A2) of about 2 mm. The magnetic axis of the disc-shaped dipole magnet (640) was substantially perpendicular to the axis of spinning and substantially parallel to the substrate (620) surface. The disc-shaped dipole magnet was made of NdFeB N40.

As shown in FIG. 6B, the projection of the magnetic axis of the ring-shaped dipole magnet of the first magnetic-field generating device (630) and the projection of the magnetic axis of the disc-shaped dipole magnet of the second magnetic-field generating device (640) along the axis of spinning onto a plane perpendicular to the axis of spinning formed an angle (Ω) of about +45°.

The distance (d) between the lower surface of the disc-shaped dipole magnet of the second magnetic-field generating device (640) and the upper surface of the ring-shaped dipole magnet of the first magnetic-field generating device (640) was 0 mm, i.e. the ring-shaped dipole magnet and the disc-shaped dipole magnet were in direct contact. The distance (h) between the upper surface of the disc-shaped dipole magnet of the second magnetic-field generating device (640) and the surface of the substrate (620) facing the disc-shaped dipole magnet was about 1.5 mm.

The magnetic assembly (600) comprising the first and second magnetic-field generating devices (630 and 640) was spinning around the axis of spinning being substantially perpendicular to the substrate (620) surface.

The resulting OEL produced with the magnetic assembly illustrated in FIG. 6A1 is shown in FIG. 6B at different viewing angles by tilting the substrate (620) between −30° and +30°. The so-obtained OEL provides the optical impression of circularly moving comet-shaped spot rotating counterclockwise upon tilting said OEL.

The conoscopic scatterometry of the OEL shown in FIG. 6B allowed the measurement of the orientation pattern (see FIG. 6C) of the non-spherical platelet-shaped optically variable magnetic pigment particles. Over a distance ranging from −8.4 mm (A) to +8.1 mm (B) along the x direction, the zenithal deflection angle φ' spans a range of values from 0° to about 70°, and the azimuth angle θ spans a range of values from about 195° to about 315° in the negative x branch, and symmetrically, from about 135° to about 15° in the locations where x is positive.

Example 3, E3 (FIG. 7)

The spinneable magnetic assembly (700) used to prepare the optical effect layer (710) of Example 3 on the substrate (720) is illustrated in FIG. 7A1.

The magnetic assembly (700) comprised a first magnetic-field generating device (730) consisting of a ring-shaped dipole magnet and a second magnetic-field generating device (640) consisting of a ring-shaped dipole magnet, wherein the first magnetic-field generating device (730) was placed on top of the second magnetic-field generating device (740).

The ring-shaped dipole magnet the first magnetic-field generating device (730) was diametrically magnetized and had an external diameter (A1) of about 25 mm, an internal diameter (A2) of about 16 mm and a thickness (A3) of about 2 mm. The magnetic axis of the ring-shaped dipole magnet was substantially perpendicular to the axis of spinning and substantially parallel to the substrate (720) surface. The ring-shaped dipole magnet was made of NdFeB N40.

The ring-shaped dipole magnet of the second magnetic-field generating device (740) was diametrically magnetized and had an external diameter (A4) of about 25 mm, an internal diameter (A5) of about 10 mm and a thickness (A6) of about 2 mm. The magnetic axis of the ring-shaped dipole magnet (740) was substantially perpendicular to the axis of spinning and substantially parallel to the substrate (720) surface. The disc-shaped dipole magnet was made of NdFeB N40.

As shown in FIG. 7B, the projection of the magnetic axis of ring-shaped dipole magnet of the first magnetic-field generating device (730) and the projection of the magnetic axis of the ring-shaped dipole magnet of the second magnetic-field generating device (740) along the axis of spinning onto a plane perpendicular to the axis of spinning formed an angle (Ω) of about −90°.

The distance (d) between the lower surface of the ring-shaped dipole magnet of the first magnetic-field generating device (730) and the upper surface of the ring-shaped dipole magnet of the second magnetic-field generating device (740) was 0 mm, i.e. both ring-shaped dipole magnets were in direct contact. The distance (h) between the upper surface of the disc-shaped dipole magnet of the first magnetic-field generating device (730) and the surface of the substrate (720) facing the ring-shaped dipole magnet was about 5.5 mm.

The magnetic assembly (700) comprising the first and second magnetic-field generating devices (730 and 740) was spinning around the axis of spinning being substantially perpendicular to the substrate (720) surface.

The resulting OEL produced with the magnetic assembly illustrated in FIG. 7A1 is shown in FIG. 6B at different viewing angles by tilting the substrate (720) between −30° and +30°. The so-obtained OEL provides the optical impression of circularly moving comet-shaped spot rotating counterclockwise upon tilting said OEL.

The conoscopic scatterometry of the OEL shown in FIG. 7B allowed the measurement of the orientation pattern (see FIG. 7C) of the non-spherical platelet-shaped optically variable magnetic pigment particles. Over a distance ranging from −7.9 mm (A) to +8.1 mm (B) along the x direction, the zenithal deflection angle φ' spans a range of values from 0° to about 60°, and the azimuth angle θ spans a range of values from about 135° to 60° in the negative x branch, and symmetrically, from about 240° to about 315° in the locations where x is positive.

Example 4, E4 (FIG. 8)

The spinneable magnetic assembly (800) used to prepare the optical effect layer (810) of Example 4 on the substrate (820) is illustrated in FIG. 8A1.

The magnetic assembly (800) comprised a first magnetic-field generating device (830) consisting of a ring-shaped dipole magnet and a second magnetic-field generating device (640) consisting of a ring-shaped dipole magnet, wherein the first magnetic-field generating device (830) was placed on top of the second magnetic-field generating device (840).

The ring-shaped dipole magnet the first magnetic-field generating device (830) was diametrically magnetized and had an external diameter (A1) of about 25 mm, an internal diameter (A2) of about 16 mm and a thickness (A3) of about 2 mm. The magnetic axis of the ring-shaped dipole magnet was substantially perpendicular to the axis of spinning and substantially parallel to the substrate (820) surface. The ring-shaped dipole magnet was made of NdFeB N40.

The ring-shaped dipole magnet of the second magnetic-field generating device (840) was diametrically magnetized and had an external diameter (A4) of about 25 mm, an internal diameter (A5) of about 10 mm and a thickness (A6) of about 2 mm. The magnetic axis of the ring-shaped dipole magnet (840) was substantially perpendicular to the axis of spinning and substantially parallel to the substrate (820) surface. The ring-shaped dipole magnet was made of NdFeB N40.

As shown in FIG. 8B, the projection of the magnetic axis of ring-shaped dipole magnet of the first magnetic-field generating device (830) and the projection of the magnetic axis of the ring-shaped dipole magnet of the second magnetic-field generating device (840) along the axis of spinning onto a plane perpendicular to the axis of spinning formed an angle (Ω) of about +90°.

The distance (d) between the lower surface of the ring-shaped dipole magnet of the first magnetic-field generating device (830) and the upper surface of the ring-shaped dipole magnet of the second magnetic-field generating device (830) was 0 mm, i.e. both ring-shaped magnets were in direct contact. The distance (h) between the upper surface of the disc-shaped dipole magnet of the first magnetic-field generating device (830) and the surface of the substrate (820) facing the disc-shaped dipole magnet was about 5.5 mm.

The magnetic assembly (800) comprising the first and second magnetic-field generating devices (830 and 840) was spinning around the axis of spinning being substantially perpendicular to the substrate (820) surface.

The resulting OEL produced with the magnetic assembly illustrated in FIG. 8A1 is shown in FIG. 6B at different viewing angles by tilting the substrate (820) between −30° and +30°. The so-obtained OEL provides the optical impression of circularly moving comet-shaped spot rotating counterclockwise upon tilting said OEL The conoscopic scatterometry of the OEL shown in FIG. 8B allowed the measurement of the orientation pattern (see FIG. 8C) of the non-spherical platelet-shaped optically variable magnetic pigment particles. Over a distance ranging from −7.1 mm (A) to +7.9 mm (B) along the x direction, the zenithal deflection angle φ' spans a range of values from 0° to about 60°, and the azimuth angle θ spans a range of values from about 60° to 95° in the negative x branch, and from about 285° to about 240° in the locations where x is positive.

Example 5, E5 (FIG. 9)

The spinneable magnetic assembly (900) used to prepare the optical effect layer (910) of Example 5 on the substrate (920) is illustrated in FIG. 9A1.

The magnetic assembly (900) comprised a first magnetic-field generating device (930) consisting of a bar dipole magnet (931) and a second magnetic-field generating device (940) consisting of a disc-shaped dipole magnet embedded in a supporting matrix (950), wherein the first magnetic-field generating device (930) was placed on top of the second magnetic-field generating device (940).

The bar dipole magnet (931) of the first magnetic-field generating device (930) had a length (A3) of about 18 mm, a width (A4) of about 3 mm and a thickness (A5) of about 3 mm. The magnetic axis of the bar dipole magnet (931) was substantially perpendicular to the axis of spinning and substantially to the substrate (920) surface. The bar dipole magnet (531) was made of NdFeB N45.

The bar dipole magnet (931) was embedded in a supporting matrix (950) comprising a void having the same shape as the bar dipole magnet (931). The supporting matrix (950) had a diameter (A1) of about 25 mm and a thickness (A2) of about 3 mm. The supporting matrix (950) was made of POM (polyoxymethylene). The top and lower surfaces of the bar dipole magnet (931) of the first magnetic-field generating device (930) were respectively flush with the top and lower surfaces of the supporting matrix (950).

The disc-shaped dipole magnet of the second magnetic-field generating device (940) was diametrically magnetized and had a diameter (A6) of about 25 mm and a thickness (A7) of about 2 mm. The magnetic axis of the disc-shaped dipole magnet (940) was substantially perpendicular to the axis of spinning and substantially parallel to the substrate (920) surface. The disc-shaped dipole magnet was made of NdFeB N40.

As shown in FIG. 9A2, the projection of the magnetic axis of the bar dipole magnet (931) of the first magnetic-field generating device (930) and the projection of the magnetic axis of the disc-shaped dipole magnet of the second magnetic-field generating device (940) along the axis of spinning onto a plane perpendicular to the axis of spinning formed an angle ($\Omega$) of about −60°.

The distance (d) between the lower surface of the supporting matrix of the first magnetic-field generating device (930) and the upper surface of the disc-shaped dipole magnet of the second magnetic-field generating device (940) was 0 mm, i.e. the supporting matrix and the disc-shaped dipole magnet were in direct contact. The distance (h) between the upper surface of the supporting matrix (950) of the first magnetic-field generating device (930) and the surface of the substrate (920) facing the supporting matrix magnet was about 2.5 mm.

The magnetic assembly (900) comprising the first and second magnetic-field generating devices (930 and 940) was spinning around the axis of spinning being substantially perpendicular to the substrate (920) surface.

The resulting OEL produced with the magnetic assembly illustrated in FIG. 9A1 is shown in FIG. 9C at different viewing angles by tilting the substrate (920) between −30° and +30°. The so-obtained OEL provides the optical impression of circularly moving comet-shaped spot rotating counterclockwise upon tilting said OEL.

The conoscopic scatterometry of the OEL shown in FIG. 9C allowed the measurement of the orientation pattern (see FIG. 9D) of the non-spherical platelet-shaped optically variable magnetic pigment particles. Over a distance ranging from −6.2 mm (A) to +6.3 mm (B) along the x direction, the zenithal deflection angle $\varphi'$ spans values between 0° and approximately 65°, and the azimuth angle $\theta$ spans a range of values from about 210° to 315° in the negative x branch, and symmetrically, from about 135° to about 45° in the locations where x is positive.

Example 6, E6 (FIG. 10)

The spinneable magnetic assembly (1000) used to prepare the optical effect layer (1010) of Example 6 on the substrate (1020) is illustrated in FIG. 10A1.

The magnetic assembly (1000) comprised a first magnetic-field generating device (1030) consisting of two bar dipole magnets (1031) and a second magnetic-field generating device (640) consisting of a disc-shaped dipole magnet embedded in a supporting matrix (1050), wherein the first magnetic-field generating device (1030) was placed on top of the second magnetic-field generating device (1040).

Each of the two bar dipole magnet (1031) of the first magnetic-field generating device (1030) had a length (A3) of about 6 mm, a width (A4) of about 3 mm and a thickness (A2) of about 3 mm. The two bar dipole magnets (1031) were disposed symmetrically around the center of the supporting matrix (1050) at a distance (A7) of about 9 mm from each other along the diameter of the supporting matrix (1050). The magnetic axis of the two bar dipole magnets (1031) was substantially perpendicular to the axis of spinning and substantially to the substrate (1020) surface, with the North pole of said two bar dipole magnets (1031) pointing in the same direction. The two bar dipole magnets (1031) were made of NdFeB N45.

The two bar dipole magnets (1031) were embedded in a supporting matrix (1050) comprising a two voids having the same shape as the bar dipole magnets (1031). The supporting matrix (1050) had a diameter (A1) of 25 mm and a thickness (A2) of 3 mm. The supporting matrix (1050) was made of POM (polyoxymethylene). The top and lower surfaces of the bar dipole magnets (1031) of the first magnetic-field generating device (1030) were respectively flush with the top and lower surfaces of the supporting matrix (1050).

The disc-shaped dipole magnet of the second magnetic-field generating device (1040) had a diameter (A5) of 25 mm and a thickness (A6) of 2 mm. The magnetic axis of the disc-shaped dipole magnet (1040) was substantially perpendicular to the axis of spinning and substantially parallel to the substrate (1020) surface. The disc-shaped dipole magnet was made of NdFeB N40.

As shown in FIG. 10B, the projection of the magnetic axis of the two bar dipole magnet (1031) of the first magnetic-field generating device (1030) and the projection of the magnetic axis of the disc-shaped dipole magnet of the second magnetic-field generating device (1040) along the axis of spinning onto a plane perpendicular to the axis of spinning formed an angle ($\Omega$) of about −30°.

The distance (d) between the lower surface of the supporting matrix (1050) of the first magnetic-field generating device (1030) and the upper surface of the disc-shaped dipole magnet of the second magnetic-field generating device (1040) was 0 mm, i.e. the supporting matrix and the disc-shaped dipole magnet were in direct contact. The distance (h) between the upper surface of the supporting matrix (1050) of the first magnetic-field generating device (1030) and the surface of the substrate (1020) facing the supporting matrix magnet was about 3.5 mm.

The magnetic assembly (1000) comprising the first and second magnetic-field generating devices (1030 and 1040) was spinning around the axis of spinning being substantially perpendicular to the substrate (1020) surface.

The resulting OEL produced with the magnetic assembly illustrated in FIG. 10A1 is shown in FIG. 6B at different viewing angles by tilting the substrate (1020) between −30° and +30°. The so-obtained OEL provides the optical impression of circularly moving comet-shaped spot rotating counterclockwise upon tilting said OEL.

The conoscopic scatterometry of the OEL shown in FIG. 10B allowed the measurement of the orientation pattern (see FIG. 10D) of the non-spherical platelet-shaped optically variable magnetic pigment particles. Over a distance ranging from −7.0 mm (A) to +6.0 mm (B) along the x direction, the zenithal deflection angle $\varphi'$ spans a range of values from 0° to about 60°, and the azimuth angle $\theta$ spans a range of values from about 150° to about 75° in the negative x branch, and symmetrically, from about 255° to about 330° in the locations where x is positive.

Example 7, E7 (FIG. 11)

The spinneable magnetic assembly (1100) used to prepare the optical effect layer (1110) of Example 7 on the substrate (1120) is illustrated in FIG. 11A1.

The magnetic assembly (1100) comprised a first magnetic-field generating device (1130) consisting of a centered arrangement of three collinear bar dipole magnets (1131) and a second magnetic-field generating device (1140) consisting of a disc-shaped dipole magnet embedded in a supporting matrix (1150), wherein the first magnetic-field generating device (1130) was placed on top of the second magnetic-field generating device (1140).

Each of the three bar dipole magnets (1131) of the first magnetic-field generating device (1130) was a cubic block having a length (A3) of about 3 mm.

The three bar dipole magnets (1131) were disposed symmetrically around the center of the supporting matrix (1150) at a distance (A4) of about 2 mm from each other along the diameter of the supporting matrix (1050). The magnetic axis of the three bar dipole magnets (1131) was substantially perpendicular to the axis of spinning and substantially to the substrate (1120) surface, with the North pole of said three bar dipole magnets (1131) pointing in the same direction. The two bar dipole magnets (1131) were made of NdFeB N45.

The three bar dipole magnets (1131) were embedded in a supporting matrix (1150) comprising a three voids having the same shape as the bar dipole magnets (1131). The supporting matrix (1150) had a diameter (A1) of about 25 mm and a thickness (A2) of about 3 mm. The supporting matrix (1150) was made of POM (polyoxymethylene). The top and lower surfaces of the three bar dipole magnets (1131) of the first magnetic-field generating device (1130) were respectively flush with the top and lower surfaces of the supporting matrix (1150).

The disc-shaped dipole magnet of the second magnetic-field generating device (1140) was diametrically magnetized and had a diameter (A5) of about 25 mm and a thickness (A6) of about 2 mm. The magnetic axis of the disc-shaped dipole magnet (1140) was substantially perpendicular to the axis of spinning and substantially parallel to the substrate (1120) surface. The disc-shaped dipole magnet was made of NdFeB N40.

As shown in FIG. 11B, the projection of the magnetic axis of the three bar dipole magnet (1131) of the first magnetic-field generating device (1130) and the projection of the magnetic axis of the disc-shaped dipole magnet of the second magnetic-field generating device (1140) along the axis of spinning onto a plane perpendicular to the axis of spinning formed an angle ($\Omega$) of about −120°.

The distance (d) between the lower surface of the supporting matrix (1150) of the first magnetic-field generating device (1130) and the upper surface of the disc-shaped dipole magnet of the second magnetic-field generating device (1140) was 0 mm, i.e. the supporting matrix and the disc-shaped dipole magnet were in direct contact. The distance (h) between the upper surface of the supporting matrix (1150) of the first magnetic-field generating device (1130) and the surface of the substrate (1120) facing the supporting matrix magnet was about 2.5 mm.

The magnetic assembly (1100) comprising the first and second magnetic-field generating devices (1130 and 1140) was spinning around the axis of spinning being substantially perpendicular to the substrate (1120) surface.

The resulting OEL produced with the magnetic assembly illustrated in FIG. 11A1 is shown in FIG. 6B at different viewing angles by tilting the substrate (1120) between −30° and +30°. The so-obtained OEL provides the optical impression of a double circularly moving comet-shaped spots (i.e. two circularly moving comets) rotating counterclockwise upon tilting said OEL.

The conoscopic scatterometry of the OEL shown in FIG. 11C allowed the measurement of the orientation pattern (see FIG. 3A, Example 7) of the non-spherical platelet-shaped optically variable magnetic pigment particles. Over a distance ranging from −5.5 mm (A) to +5.0 mm (B) along the x direction, the zenithal deflection angle φ' spans a range of values from 0° to about 60°, and the azimuth angle θ spans a range of values from about 180° to about 270° in the negative x branch, and symmetrically, from about 90° to 360° in the locations where x is positive.

Example 8, E8 (FIG. 15)

The spinneable magnetic assembly (1500) used to prepare the optical effect layer (1510) of Example 8 on the substrate (1520) is illustrated in FIG. 15A1.

The magnetic assembly (1500) comprised a first magnetic-field generating device (1530) consisting of two bar dipole magnets (1531) and a second magnetic-field generating device (1540) consisting of a disc-shaped dipole magnet embedded in a supporting matrix (1550), wherein the first magnetic-field generating device (1530) was placed on top of the second magnetic-field generating device (1540).

Each of the two bar dipole magnet (1531) of the first magnetic-field generating device (1530) was a cubic block having a length (A3) of about 3 mm. The center of each of the two bar dipole magnets (1531) was disposed symmetrically around the center of the supporting matrix (1550) at a distance (A4) of about 6 mm between the centers of the top face of the two bar dipole magnets (1531) along a diameter of the supporting matrix (1550). The magnetic axis of the two bar dipole magnets (1531) was substantially perpendicular to the axis of spinning and substantially parallel to the substrate (1520) surface, with the North pole of said two bar dipole magnets (1531) pointing in the same direction. The two bar dipole magnets (1531) of the first magnetic-field generating device (1530) had their magnetic axis parallel to each other and were tilted by an angle β of about 30° (FIG. 1561) from the diameter of the supporting matrix (1550) crossing the center of the top face of the two bar dipole magnets (1531). The two bar dipole magnets (1531) were made of NdFeB N45.

The two bar dipole magnets (1531) were embedded in a supporting matrix (1550) comprising two voids having the same shape as the bar dipole magnets (1531). The supporting matrix (1550) had a diameter (A1) of about 25 mm and a thickness (A2) of about 3 mm. The supporting matrix (1550) was made of POM (polyoxymethylene). The top and lower surfaces of the bar dipole magnets (1531) of the first magnetic-field generating device (1530) were respectively flush with the top and lower surfaces of the supporting matrix (1550).

The disc-shaped dipole magnet of the second magnetic-field generating device (1540) had a diameter (A5) of 25 mm and a thickness (A6) of 3 mm. The magnetic axis of the disc-shaped dipole magnet (1540) was substantially perpendicular to the axis of spinning and substantially parallel to the substrate (1520) surface. The disc-shaped dipole magnet was made of NdFeB N40.

As shown in FIG. 15A2, the projection of the magnetic axis of the two bar dipole magnet (1531) of the first magnetic-field generating device (1530) and the projection of the magnetic axis of the disc-shaped dipole magnet of the second magnetic-field generating device (1540) along the axis of spinning onto a plane perpendicular to the axis of spinning formed an angle ($\Omega$) of about 150°.

The distance (d) between the lower surface of the supporting matrix (1550) of the first magnetic-field generating device (1530) and the upper surface of the disc-shaped dipole magnet of the second magnetic-field generating device (1540) was 0 mm, i.e. the supporting matrix and the disc-shaped dipole magnet were in direct contact. The distance (h) between the upper surface of the supporting matrix (1550) of the first magnetic-field generating device (1530) and the surface of the substrate (1520) facing the supporting matrix magnet was about 2.5 mm.

The magnetic assembly (1500) comprising the first and second magnetic-field generating devices (1530 and 1540) was spinning around the axis of spinning being substantially perpendicular to the substrate (1520) surface.

The resulting OEL produced with the magnetic assembly illustrated in FIG. 15A1 is shown in FIG. 15C at different viewing angles by tilting the substrate (1520) between −30° and +30°. The so-obtained OEL provides the optical impression of circularly moving comet-shaped spot rotating counterclockwise upon tilting said OEL.

The conoscopic scatterometry of the OEL shown in FIG. 15C allowed the measurement of the orientation pattern (see FIG. 15D) of the non-spherical platelet-shaped optically variable magnetic pigment particles. Over a distance ranging from −6.9 mm (A) to +7.1 mm (B) along the x direction, the zenithal deflection angle $\varphi'$ spans a range of values from 0° to about 60°, and the azimuth angle $\theta$ spans a range of values from about 60° to about 165° in the negative x branch, and symmetrically, from about 345° to about 250° in the locations where x is positive.

Examples 9-11, E9-11 (FIG. 16A-C)

The optical effect layers of Examples E9-E11 were independently prepared by using the spinneable magnetic assembly in FIG. 5A1, except that
a) for Example 9 (E9), the distance (d) between the lower surface of the ring-shaped dipole magnet of the first magnetic-field generating device and the upper surface of the disc-shaped dipole magnet of the second magnetic-field generating device was about 4 mm.
b) for Example 10 (E10), the distance (d) between the lower surface of the ring-shaped dipole magnet of the first magnetic-field generating device and the upper surface of the disc-shaped dipole magnet of the second magnetic-field generating device was about 7 mm and the distance (h) between the upper surface of the ring-shaped dipole magnet of the first magnetic-field generating device and the surface of the substrate facing the ring-shaped dipole magnet was about 9.5 mm, and
c) for Example 11 (E11), the distance (d) between the lower surface of the ring-shaped dipole magnet of the first magnetic-field generating device and the upper surface of the disc-shaped dipole magnet of the second magnetic-field generating device was about 4 mm and the distance (h) between the upper surface of the ring-shaped dipole magnet of the first magnetic-field generating device and the surface of the substrate facing the ring-shaped dipole magnet was about 8 mm.

The resulting OELs produced with the magnetic assembly illustrated in FIG. 5A with the distance (d) and (h) provided hereabove are shown in FIGS. 16A-C (A: E9, B: E10, and C: E11) at different two viewing angles.

FIGS. 3C and 3F illustrate the non-spherical platelet-shaped optically variable magnetic pigment particle orientation properties of circular symmetric OEL of the prior art wherein the oriented particles deflected incident light substantially within the plane of incidence (x14, 214 in FIG. 2B) at essentially all locations $x_i$ along any selected diameter (x12, 212 in FIG. 2A-B) of the OEL.

FIGS. 5C, 6C, 7C, 8C, 9D, 10D, 11D and 15D illustrate the characterizing property of the OEL of the present invention wherein the oriented non-spherical platelet-shaped optically variable magnetic pigment particles within the corresponding OEL are oriented according to a circularly symmetrical pattern and deflect incident light substantially away from the plane of incidence (x14, 214 in FIG. 2B). At a plurality of locations $x_i$ along any selected diameter (x12, 212 in FIG. 2A-B) of the OEL, the plural particles at location $x_i$ have, an average zenithal deflection angle $\varphi'$ and an average azimuth angle $\theta$ with respect to the selected diameter (x12, 212 in FIG. 2A-B) through $x_i$ that satisfy the condition:

$$|\varphi' \cdot \sin(\theta)| \geq 10°, \text{ preferably } |\varphi' \cdot \sin(\theta)| \geq 15°,$$

such that incident light at point $x_i$ is reflected respectively at an angle equal to or greater than 10°, preferably equal to or greater than 15°, away from the normal plane of incidence (x14).
a) As successive data points in FIGS. 5C, 6C, 7C, 8C, 9D, 10D, 11D and 15D correspond to successive locations $x_i$ in the OEL separated by 0.5 mm along the diameter, a series of n successive points on the graph correspond to a distance of (n+1)/2 millimeters between corresponding locations on the OEL.
b) The distance along the diameter over which the OEL satisfies said characterizing conditions $|\varphi' \cdot \sin(\theta)| \geq 10°$, preferably $|\varphi' \cdot \sin(\theta)| \geq 15°$ can therefore be determined by counting the number of points on the graph that fall into the shaded areas shown in FIGS. 14A and 14B respectively.
c) In all the exemplary embodiments described herein, the non-spherical platelet-shaped optically variable magnetic pigment particle satisfy the condition $|\varphi' \cdot \sin(\theta)| \geq 15°$, over a distance of 2.5 mm (four points or more in FIGS. 5C, 6C, 7C, 8C, 9D, 10D, 11D and 15D) along each side of the selected diameter.
d) In the exemplary embodiments described herein as example 1, 2, 3, 4, 5 and 6, the non-spherical platelet-shaped optically variable magnetic pigment particles satisfy the condition $|\varphi' \cdot \sin(0)| \geq 15°$, over a distance of at least 5 mm (nine points or more in FIGS. 5C, 6C, 7C, 8C, 9D, 10D and 15D) along each side of the selected diameter.
e) In the exemplary embodiments describe as example 1, 2, 3, 4 and 6, the non-spherical platelet-shaped optically variable magnetic pigment particles satisfy the condition $|\varphi' \cdot \sin(\theta)| \geq 15°$ over a distance of at least 6.5 mm (12 points or more in FIGS. 5C, 6C, 7C, 8C, 10D and 15D) along each side of the selected diameter.

The invention claimed is:

1. An optical effect layer (OEL) comprising a radiation cured coating composition comprising non-spherical oblate magnetic or magnetizable pigment particles, said non-spherical oblate magnetic or magnetizable pigment particles being oriented according to an orientation pattern,
   wherein the orientation pattern is circularly symmetric around a center of rotation,
   wherein the non-spherical oblate magnetic or magnetizable pigment particles at at least two, distinct locations $x_i$ along any selected diameter of the OEL have an average zenithal deflection angle $\varphi'$ at location $x_i$ and an average azimuth angle $\theta$ with respect to the selected diameter at the same location $x_i$ that satisfy the condition $|(\varphi' \sin(\theta)| \geq 10°$,
   and said optical effect layer providing an optical impression of at least one circularly moving spot or at least one spot having a tail section rotating around said center of rotation upon tilting said OEL.

2. The optical effect layer according to claim 1, wherein at least a part of the plurality of non-spherical oblate magnetic or magnetizable particles is constituted by non-spherical oblate optically variable magnetic or magnetizable pigment particles.

3. The optical effect layer according to claim 2, wherein the optically variable magnetic or magnetizable pigments are selected from the group consisting of magnetic thin-film interference pigments, magnetic cholesteric liquid crystal pigments and mixtures thereof.

4. The optical effect layer according to claim 1, wherein the radiation cured coating composition is a UV-Vis radiation cured coating composition.

5. A security document or a decorative element or object comprising one or more optical effect layers (OELs) recited in claim 1.

6. A printing apparatus for producing on a substrate the optical effect layer (OEL) recited in claim 1, wherein the non-spherical oblate magnetic or magnetizable pigment particles are oriented with a magnetic field from at least one spinning magnetic assembly comprised in the apparatus, the spinning magnetic assembly having an axis of spinning, wherein a surface of the substrate provided with the OEL is substantially perpendicular to the axis of spinning of the magnet assembly, and comprising at least a) first magnetic-field generating device and b) a second magnetic-field generating device, wherein said first magnetic-field generating device and said second magnetic-field generating device have mutually skewed magnetic axes, wherein said first magnetic- field generating device has its magnetic axis substantially perpendicular to the axis of spinning and said second magnetic-field generating device has its magnetic axis substantially perpendicular to the axis of spinning and wherein a projection of the magnetic axis of the first magnetic-field generating device and a projection of the magnetic axis of the second magnetic-field generating device along the axis of spinning onto a plane perpendicular to the axis of spinning form an angle either in a range from about 5° to about 175° or in a range from about −5° to about −175°, and wherein
  a) the first magnetic-field generating device comprises
    a bar dipole magnet having its North-South magnetic axis substantially perpendicular to the axis of spinning, or
    two or more bar dipole magnets, each of said two or more bar dipole magnets having its North-South magnetic axis substantially perpendicular to the axis of spinning and all of said two or more bar dipole magnets having a same magnetic field direction, or
    a loop-shaped dipole magnet having its North-South magnetic axis substantially perpendicular to the axis of spinning, or
    a disc-shaped dipole magnet being nested inside a loop-shaped dipole magnet, each of the disc-shaped dipole magnet and the loop-shaped dipole magnets having their North-South magnetic axis substantially perpendicular to the axis of spinning and having a same magnetic field direction, or
    two or more nested loop-shaped dipole magnets, each of said two or more nested loop-shaped dipole magnets, having its North-South magnetic axis substantially perpendicular to the axis of spinning and all of said two or more nested ring-shaped magnets having a same magnetic field direction; and wherein
  b) the second magnetic-field generating device comprises
    a disc-shaped dipole magnet having its North-South magnetic axis substantially perpendicular to the axis of spinning, or
    a loop-shaped dipole magnet having its North-South magnetic axis substantially perpendicular to the axis of spinning, or
    a bar dipole magnet having its North-South magnetic axis substantially perpendicular to the axis of spinning.

7. The apparatus according to claim 6,
  wherein the first magnetic-field generating device comprises a loop-shaped dipole magnet having its North-South magnetic axis substantially perpendicular to the axis of spinning and the second magnetic-field generating device (x40) comprises a disc-shaped dipole magnet having its North-South magnetic axis substantially perpendicular to the axis of spinning; or
  wherein the first magnetic-field generating device comprises a loop-shaped dipole magnet having its North-South magnetic axis substantially perpendicular to the axis of spinning and the second magnetic-field generating device (x40) comprises a loop-shaped dipole magnet having its North-South magnetic axis substantially perpendicular to the axis of spinning; or
  wherein the first magnetic-field generating device comprises a bar dipole magnet having its North-South magnetic axis substantially perpendicular to the axis of spinning and the second magnetic-field generating device comprises a disc-shaped dipole magnet having its North-South magnetic axis perpendicular to the axis of spinning; or
  wherein the first magnetic-field generating device comprises two or more bar dipole magnets, each of said two or more bar dipole magnets having its North-South magnetic axis substantially perpendicular to the axis of spinning and all of said two or more bar dipole magnets having a same magnetic field direction and the second magnetic-field generating device comprises a disc-shaped dipole magnet having its North-South magnetic axis substantially perpendicular to the axis of spinning; or
  wherein the first magnetic-field generating device comprises a disc-shaped dipole magnet being nested inside a loop-shaped dipole magnet, each of the disc-shaped dipole magnet and the loop-shaped dipole magnet having their North-South magnetic axis substantially perpendicular to the axis of spinning and having a same magnetic field direction and the second magnetic-field generating device comprises a disc-shaped dipole magnet having its North-South magnetic axis substantially perpendicular to the axis of spinning; or
  wherein the first magnetic-field generating device comprises two or more nested ring-shaped magnets, each of said two or more nested ring-shaped magnets having its North-South magnetic axis substantially perpendicular to the axis of spinning and all of said two or more nested ring-shaped magnets having a same magnetic field direction and the second magnetic-field generating device comprises a disc-shaped dipole magnet having its North-South magnetic axis perpendicular to the axis of spinning.

8. The apparatus according to claim 7, where the loop shaped dipole magnets are ring-shaped.

9. The apparatus according to claim 6 further comprising a rotating magnetic cylinder or a flatbed printing unit, wherein the at least one spinning magnetic assembly is comprised in the rotating magnetic cylinder or the flatbed printing unit.

10. The apparatus according to claim 6, wherein the projection of the magnetic axis of the first magnetic-field generating device and the projection of the magnetic axis of the second magnetic-field generating device along the axis of spinning onto a plane perpendicular to the axis of spinning form an angle either in a range from about 15° to about 165° or in a range from about −15° to about −165°.

11. The apparatus according to claim 6, where the loop shaped dipole magnets are ring-shaped.

12. A process for producing the optical effect layer (OEL) recited in claim 1 on a substrate, said process comprising the steps of:
  i) applying on a substrate surface a radiation curable coating composition comprising non-spherical oblate magnetic or magnetizable pigment particles, said radiation curable coating composition being in a first state;
  ii) exposing the radiation curable coating composition to a magnetic field of a printing apparatus wherein the non-spherical oblate magnetic or magnetizable pigment particles are oriented with the magnetic field from at least one spinning magnetic assembly comprised in the apparatus, the spinning magnetic assembly having an axis of spinning, wherein the surface of the substrate provided with the OEL is substantially perpendicular to the axis of spinning of the magnet assembly, and comprising at least a) first magnetic-field generating device and b) a second magnetic-field generating device, wherein said first magnetic-field generating device and said second magnetic-field generating device have mutually skewed magnetic axes, wherein said first magnetic-field generating device has its magnetic axis substantially perpendicular to the axis of spinning and said second magnetic-field generating device has its magnetic axis substantially perpendicular to the axis of spinning and wherein a projection of the magnetic axis of the first magnetic-field generating device and a projection of the magnetic axis of the second magnetic-field generating device along the axis of spinning onto a plane perpendicular to the axis of spinning form an angle either in a range from about 5° to about 175° or in a range from about −5° to about −175°,
  and wherein
  a) the first magnetic-field generating device comprises
    a bar dipole magnet having its North-South magnetic axis substantially perpendicular to the axis of spinning, or
    two or more bar dipole magnets, each of said two or more bar dipole magnets having its North-South magnetic axis substantially perpendicular to the axis of spinning and all of said two or more bar dipole magnets having a same magnetic field direction, or
    a loop-shaped dipole magnet having its North-South magnetic axis substantially perpendicular to the axis of spinning, or
    a disc-shaped dipole magnet being nested inside a loop-shaped dipole magnet, each of the disc-shaped dipole magnet and the loop-shaped dipole magnets having their North-South magnetic axis substantially perpendicular to the axis of spinning and having a same magnetic field direction, or
    two or more nested loop-shaped dipole magnets, each of said two or more nested loop-shaped dipole magnets, having its North-South magnetic axis substantially perpendicular to the axis of spinning and all of said two or more nested ring-shaped magnets having a same magnetic field direction; and wherein
  b) the second magnetic-field generating device comprises
    a disc-shaped dipole magnet having its North-South magnetic axis substantially perpendicular to the axis of spinning, or
    a loop-shaped dipole magnet having its North-South magnetic axis substantially perpendicular to the axis of spinning, or
    a bar dipole magnet having its North-South magnetic axis substantially perpendicular to the axis of spinning,
  so as to orient at least a part of the non-spherical oblate magnetic or magnetizable pigment particles; and
  iii) at least partially curing the radiation curable coating composition of step ii) to a second state so as to fix the non-spherical oblate magnetic or magnetizable pigment particles in their adopted positions and orientations.

13. The process according to claim 12, wherein step iii) is carried out by UV-Vis light radiation curing.

14. The process according to claim 12, wherein step iii) is carried out partially simultaneously with the step ii).

15. The optical effect layer according to claim 1, wherein the non-spherical oblate magnetic or magnetizable pigment particles at at least two distinct locations $x_i$ along any selected diameter of the OEL have an average zenithal deflection angle $\varphi'$ at location $x_i$ and an average azimuth angle $\theta$ with respect to the selected diameter at the same location $x_i$ that satisfy the condition $|(\varphi' \sin(\theta)| \geq 15°$.

16. The optical effect layer according to claim 1, wherein the non-spherical oblate magnetic or magnetizable pigment particles at four distinct locations $x_i$ along any selected diameter of the OEL have an average zenithal deflection angle $\varphi'$ at location $x_i$ and an average azimuth angle $\theta$ with respect to the selected diameter at the same location $x_i$ that satisfy the condition $|(\varphi' \sin(\theta)| \geq 10°$.

17. The optical effect layer according to claim 1, wherein the non-spherical oblate magnetic or magnetizable pigment particles at four distinct locations $x_i$ along any selected diameter of the OEL have an average zenithal deflection angle $\varphi'$ at location $x_i$ and an average azimuth angle $\theta$ with respect to the selected diameter at the same location $x_i$ that satisfy the condition $|(\varphi' \sin(\theta)| \geq 15°$.

* * * * *